United States Patent
Fuji et al.

(10) Patent No.: US 10,048,150 B2
(45) Date of Patent: Aug. 14, 2018

(54) STRAIN DETECTION ELEMENT, PRESSURE SENSOR, MICROPHONE, BLOOD PRESSURE SENSOR, AND TOUCH PANEL

(71) Applicant: KABUSHIKI KAISHA TOSHIBA, Tokyo (JP)

(72) Inventors: Yoshihiko Fuji, Kanagawa (JP); Hideaki Fukuzawa, Kanagawa (JP); Akio Hori, Kanagawa (JP); Shiori Kaji, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 14/755,633

(22) Filed: Jun. 30, 2015

(65) Prior Publication Data
US 2016/0009545 A1    Jan. 14, 2016

(30) Foreign Application Priority Data
Jul. 2, 2014   (JP) .................................. 2014-136936

(51) Int. Cl.
*G01L 9/16*   (2006.01)
*G01L 9/00*   (2006.01)

(52) U.S. Cl.
CPC .............. *G01L 9/16* (2013.01); *G01L 9/0042* (2013.01); *G01L 9/0044* (2013.01)

(58) Field of Classification Search
CPC ........ G01L 9/0042; G01L 9/0044; G01L 9/16
See application file for complete search history.

(56) References Cited

U.S. PATENT DOCUMENTS

| | | | |
|---|---|---|---|
| 6,335,081 B1 | 1/2002 | Araki et al. | |
| 6,483,675 B1 | 11/2002 | Araki et al. | |
| 6,815,098 B2 | 11/2004 | Matsunuma et al. | |
| 2002/0008016 A1 | 1/2002 | Hayashi et al. | |
| 2002/0009616 A1 | 1/2002 | Kamiguchi et al. | |

(Continued)

FOREIGN PATENT DOCUMENTS

| | | |
|---|---|---|
| JP | 2000-156530 | 6/2000 |
| JP | 2001-36164 | 2/2001 |

(Continued)

OTHER PUBLICATIONS

Kim et al. "A novel method to prepare Cu@ Ag core-shell nanoparticles for printed flexible electronics." Powder Technology 263 (Available online on Apr. 26, 2014): 1-6.*

(Continued)

*Primary Examiner* — Harshad R Patel
*Assistant Examiner* — Punam Roy
(74) *Attorney, Agent, or Firm* — Finnegan, Henderson, Farabow, Garrett & Dunner, L.L.P.

(57) ABSTRACT

A strain detection element is provided above a deformable membrane. Moreover, this strain detection element includes an electrode and a stacked body, the stacked body including: a first magnetic layer whose magnetization direction is variable according to a deformation of the membrane; a second magnetic layer provided facing the first magnetic layer; and an intermediate layer provided between these first magnetic layer and second magnetic layer, and at least part of the first magnetic layer is amorphous, and the electrode includes a metal layer configured from a Cu—Ag alloy.

19 Claims, 52 Drawing Sheets

(56) References Cited

U.S. PATENT DOCUMENTS

| | | | |
|---|---|---|---|
| 2004/0045402 A1* | 3/2004 | Boily | B22F 1/0044 75/252 |
| 2011/0295128 A1 | 12/2011 | Yuasa et al. | |
| 2012/0079887 A1 | 4/2012 | Giddings et al. | |
| 2013/0255393 A1 | 10/2013 | Fukuzawa et al. | |
| 2014/0090486 A1 | 4/2014 | Fuji et al. | |
| 2015/0088008 A1 | 3/2015 | Fuji et al. | |

FOREIGN PATENT DOCUMENTS

| | | | |
|---|---|---|---|
| JP | 2001-36165 | | 2/2001 |
| JP | 2001-325704 | | 11/2001 |
| JP | 2002-148132 | | 5/2002 |
| JP | 2002-260219 | | 9/2002 |
| JP | 2003101099 A | * | 4/2003 |
| JP | 2011-244938 | | 12/2011 |
| JP | 2012-78186 | | 4/2012 |
| JP | 2013-205403 | | 10/2013 |
| JP | 2014-74606 | | 4/2014 |
| JP | 2015-59927 | | 3/2015 |

OTHER PUBLICATIONS

Peng, Yu-hsien, et al. "Study on synthesis of ultrafine Cu—Ag core-shell powders with high electrical conductivity." Applied Surface Science 263 (2012): 38-44.*

Meyners et al.; "Pressure Sensor Based on Magnetic Tunnel Junctions", Journal of Applied Physics, vol. 105, pp. 07C914-1 to 07C914-3, (2009).

Löhndorf et al.; "Highly Sensitive Strain Sensors Based on Magnetic Tunneling Junctions", Applied Physics Letters, vol. 81, No. 2, pp. 313-315, (2002).

* cited by examiner

FIG. 1
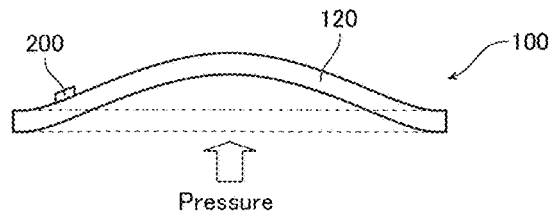
FIG. 2
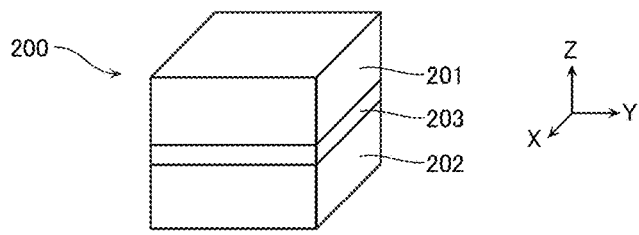
FIG. 3A  FIG. 3B  FIG. 3C
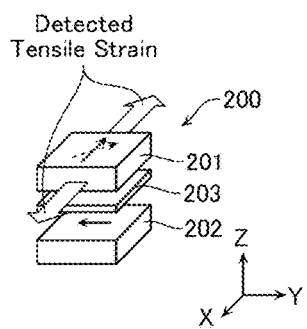 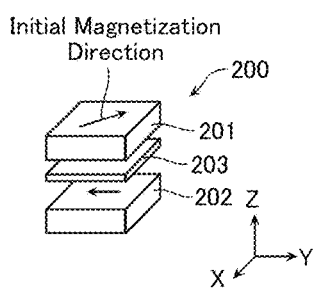 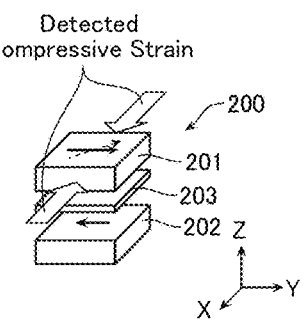
FIG. 3D  FIG. 3E
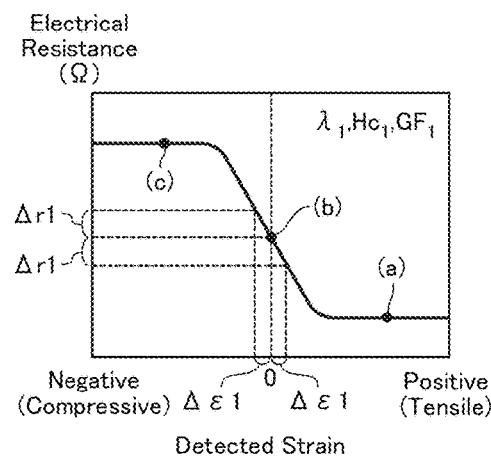 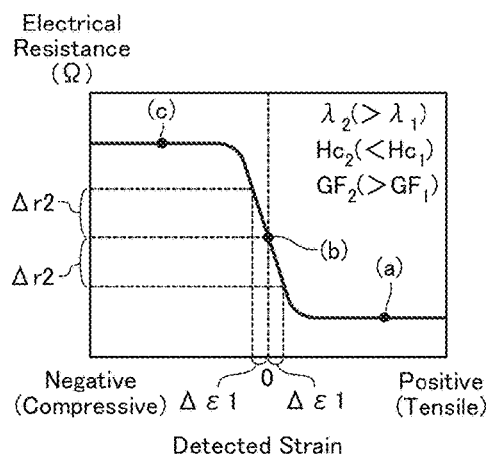

A-A' Cross-Section

STRAIN DETECTION ELEMENT, PRESSURE SENSOR, MICROPHONE, BLOOD PRESSURE SENSOR, AND TOUCH PANEL

CROSS REFERENCE TO RELATED APPLICATION

This application is based upon and claims the benefit of priority from Japanese Patent Application No. 2014-136936, filed on Jul. 2, 2014, the entire contents of which are incorporated herein by reference.

FIELD

The present embodiments relate to a strain detection element, a pressure sensor, a microphone, a blood pressure sensor, and a touch panel.

BACKGROUND

A pressure sensor employing MEMS (Micro Electro Mechanical Systems) technology includes, for example, a piezoresistance change type and an electrostatic capacitance type. On the other hand, a pressure sensor employing spitronics technology has been proposed. In the pressure sensor employing spitronics technology, a resistance change corresponding to a strain is detected. In the pressure sensor employing spitronics technology, a pressure sensor of high sensitivity is desired.

BRIEF DESCRIPTION OF THE DRAWINGS

FIG. 1 is a schematic cross-sectional view for explaining operation of a pressure sensor according to a first embodiment.

FIG. 2 is a schematic perspective view showing a configuration of a strain detection element according to the same embodiment.

FIGS. 3A-3E are schematic views for explaining operation of the same strain detection element.

DETAILED DESCRIPTION

Figure 4:
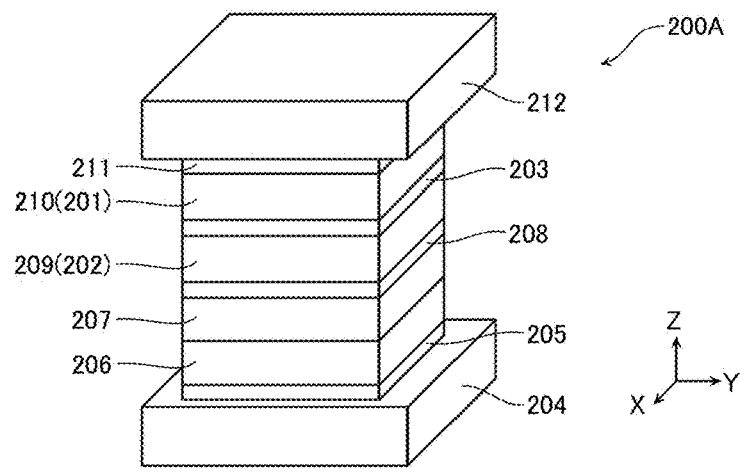
FIG. 4 is a schematic perspective view showing a configuration example of the same strain detection element.

A strain detection element according to an embodiment is provided above a deformable membrane. Moreover, this strain detection element includes: an electrode; and a stacked body provided on the electrode and including a first magnetic layer, a second magnetic layer, and an intermediate layer, the first magnetic layer having its magnetization direction changed depending on a deformation of the membrane, the second magnetic layer provided facing the first magnetic layer, and the intermediate layer being provided between the first magnetic layer and the second magnetic layer, at least part of the first magnetic layer being amorphous, and the electrode including a metal layer configured from a Cu—Ag alloy.

Moreover, a crystal grain size of the metal, layer configured from the Cu—Ag alloy is 50 nm or less.

The metal layer may be configured from a $Cu_{1-x}Ag_x$ alloy (1 at. %≤x≤20 at. %).

A strain detection element according to another embodiment is provided above a deformable membrane. Moreover, this strain detection element includes: an electrode; and a stacked body provided on the electrode and including a first magnetic layer, a second magnetic layer, and an intermediate layer, the first magnetic layer having its magnetization direction changed depending on a deformation of the membrane, the second magnetic layer provided facing the first magnetic layer, and the intermediate layer being provided between the first magnetic layer and the second magnetic layer, at least part of the first magnetic layer being amorphous, the electrode including a metal layer that includes at least one element selected from the group consisting of Cu, Al, Au, Ag, Ni, Fe, and Co, and a crystal grain size of the metal layer being 50 nm or less.

Note that in each of the embodiments exemplified above, if it is assumed, for example, that a direction in which the first magnetic layer, the second magnetic layer, and the intermediate layer are stacked is a height direction, and that an interface between the intermediate layer and the first magnetic layer is a first interface, then an Ra value of the first interface expressed by the following formulas (1) and (2) may be less than 0.3 nm.

$$Z_C = \frac{1}{n} \sum_i^n Z(i) \qquad \text{Formula (1)}$$

$$Ra = \frac{1}{n} \sum_i^n |Z(i) - Z_C| \qquad \text{Formula (2)}$$

This is provided that Zc is a mean value of a position of the first interface in the height direction, and Z(i) is the position of the first interface in the height direction.

Each of the embodiments will be described below with reference to the drawings. Note that the drawings are schematic and conceptual, and that a relationship of thickness and width of each of the portions, a ratio of size between portions, and so on, are not necessarily identical to those in reality. In addition, even when expressing the same portions, those portions are also sometimes expressed with mutually different dimensions or ratios depending on the drawing. Moreover, in the specification and each of the drawings of the present application, an element similar to that previously mentioned regarding an already-described drawing will be assigned with a reference symbol identical to that previously assigned, and a detailed description of that element will be appropriately omitted. Furthermore, in the specification of the present application, a state of "being provided on", in addition to including a state of being provided directly contacting, includes also a state of being provided with another element inserted between.

1. First Embodiment

[1-1. Configurations of Strain Detection Element and Pressure Sensor Installed Therewith According to First Embodiment]

First, operation of a strain detection element and a pressure sensor installed therewith according to a first embodiment, will be described with reference to FIG. 1. FIG. 1 is a schematic cross-sectional view for explaining operation of the pressure sensor according to the first embodiment.

As shown in FIG. 1, a pressure sensor 100 includes: a membrane 120; and a strain detection element 200 provided above the membrane 120. The membrane 120 is deformed in response to a pressure from external. The strain detection element 200 strains in response to deforming of the membrane 120, and changes its electrical resistance value according to this strain. Therefore, by detecting a change in the electrical resistance value of the strain detection element, the pressure from external is detected. Note that the strain detection element 200 may be attached directly above the membrane 120, or may be attached indirectly by another element not illustrated. It is only required that a positional relationship between the strain detection element 200 and the membrane 120 is fixed.

Next, a configuration of the strain detection element 200 will be described with reference to FIG. 2. FIG. 2 is a schematic perspective view showing the configuration of the strain detection element 200 according to the first embodiment. Hereafter, a direction from a first magnetic layer 201 toward a second magnetic layer 202 is assumed to be a Z direction (stacking direction). Moreover, a certain direction perpendicular to this Z direction is assumed to be an X direction, and a direction perpendicular to the Z direction and the X direction is assumed to be a Y direction.

As shown in FIG. 2, the strain detection element 200 according to the present embodiment includes the first magnetic layer 201, the second magnetic layer 202 provided facing the first magnetic layer 201, and an intermediate layer 203 provided between the first magnetic layer 201 and the second magnetic layer 202. As will be mentioned later, electrodes not illustrated are respectively connected to the first magnetic layer 201 and the second magnetic layer 202. Moreover, a current can be passed through the strain detection element 200 in, for example, the Z direction (stacking direction) via these electrodes. Now, when a strain occurs in the strain detection element 200, a relative magnetization direction of the magnetic layer 201 and the magnetic layer 202 changes. Accompanying this, an electrical resistance value between the magnetic layer 201 and the magnetic layer 202 changes. Therefore, by detecting this change in the electrical resistance value, the strain that has occurred in the strain detection element 200 can be detected.

In the present embodiment, a ferromagnetic material is used for the first magnetic layer 201 and the first magnetic layer 201 functions as, for example, a magnetization free layer. Moreover, a ferromagnetic material is also used for the second magnetic layer 202 and the second magnetic layer 202 functions as, for example, a reference layer. The second magnetic layer 202 may be a magnetization fixed layer or may be a magnetization free layer. When the second magnetic layer 202 is a magnetization fixed layer, the magnetization direction of the first magnetic layer 201 more easily changes compared to the magnetization direction of the second magnetic layer 202.

Next, operation of the strain detection element 200 according to the present embodiment will be described with reference to FIGS. 3A-3E. FIGS. 3A, 3B, and 3C are schematic perspective views respectively expressing situations of a state where a tensile strain occurs, a state where a strain does not occur, and a state where a compressive strain occurs, in the strain detection element 200. Note that in the description below, the magnetization direction of the second magnetic layer 202 of the strain detection element 200 is assumed to be a −Y direction, and a direction of the strain occurring in the strain detection element 200 is assumed to be the X direction. Moreover, the second magnetic layer 202 is assumed to function as a magnetization fixed layer.

As shown in FIG. 3B, in the case of the state where a strain does not occur (unstrained state) in the strain detection element 200 according to the present embodiment, a relative angle between the magnetization direction of the first magnetic layer 201 and the magnetization direction of the second magnetic layer 202 is set to a certain angle at which the magnetization directions intersect each other. This certain angle can be set to greater than 0° and less than 180°. In the example shown in FIG. 3B, the magnetization direction of the first magnetic layer 201 is 135° with respect to the magnetization direction of the second magnetic layer 202 and is 45° (135°) with respect to the direction in which the strain occurs. However, the angle of 135° here is merely an example, and the certain angle may also be set to another angle. Hereafter, as shown in FIG. 3B, the magnetization direction of the first magnetic layer 201 in the case where a strain does not occur is called an "initial magnetization direction". Note that the initial magnetization direction of the first magnetic layer 201 is set by a hard bias or a magnetic shape anisotropy of the first magnetic layer 201.

Now, as shown in FIGS. 3A and 3C, when a strain occurs in the X direction in the strain detection element 200, a "reverse magnetostriction effect" occurs in the first magnetic layer 201, and the magnetization directions of the first magnetic layer 201 and the second magnetic layer 202 change relatively.

The "reverse magnetostriction effect" is a phenomenon that a magnetization direction of a ferromagnetic material changes due to a strain. For example, when a ferromagnetic material employed in a magnetization free layer has a positive magnetostriction constant, the magnetization direction of the magnetization free layer comes closer to being parallel to a direction of a tensile strain, and comes closer to being perpendicular to a direction of a compressive strain. On the other hand, when the ferromagnetic material employed in the magnetization free layer has a negative magnetostriction constant, said magnetization direction comes closer to being perpendicular to a direction of a tensile strain, and comes closer to being parallel to a direction of a compressive strain.

In the example shown in FIG. 3, the first magnetic layer 201 of the strain detection element 200 employs a ferromagnetic material having a positive magnetostriction constant. Therefore, as shown in FIGS. 3A and 3C, the magnetization direction of the first magnetic layer 201 comes closer to being parallel to a direction of a tensile strain, and comes closer to being perpendicular to a direction of a compressive strain. Note that the magnetostriction constant of the first magnetic layer 201 may be negative.

FIGS. 3D and 3E are schematic graphs showing a relationship between electrical resistance of the strain detection element 200 and strain occurring in the strain detection element 200. Note that in FIGS. 3D and 3E, a strain in a tensile direction is assumed to be a strain in a positive direction, and a strain in a compressive direction is assumed to be a strain in a negative direction. Furthermore, in FIG. 3D, the magnetostriction constant of the first magnetic layer 201 is assumed to be $\lambda_1$, coercivity is assumed to be $Hc_1$, and a later-mentioned gauge factor is assumed to be $GF_1$, and in FIG. 3E, the magnetostriction constant of the first magnetic layer 201 is assumed to be $\lambda_2$ ($\lambda_1$), coercivity is assumed to be $Hc_2$ ($<Hc_1$), and the later-mentioned gauge factor is assumed to be $GF_2$ ($>GF_1$).

When the magnetization directions of the first magnetic layer 201 and the second magnetic layer 202 change relatively as shown in FIGS. 3A and 3C, the electrical resistance value between the first magnetic layer 201 and the second magnetic layer 202 changes due to a "magnetoresistance effect (MR effect)" as shown in FIG. 3D.

The MR effect is a phenomenon that when magnetization directions between fellow magnetic layers change relatively, electrical resistance between these magnetic layers changes. The MR effect includes, for example a GMR (Giant magnetoresistance) effect or a TMR (Tunneling magnetoresistance) effect, and so on. Moreover, the MR effect is expressed in, for example, a stacked film configured from the first magnetic layer 201, the intermediate layer 203, and the second magnetic layer 202.

Note that in the case where the first magnetic layer 201, the second magnetic layer 202, and the intermediate layer 203 have a positive magnetoresistance effect, the electrical resistance decreases when a relative angle between the first magnetic layer 201 and the second magnetic layer 202 is small. On the other hand, in the case where the first magnetic layer 201, the second magnetic layer 202, and the intermediate layer 203 have a negative magnetoresistance effect, the electrical resistance increases when the relative angle between the first magnetic layer 201 and the second magnetic layer 202 is small.

Figure 30:
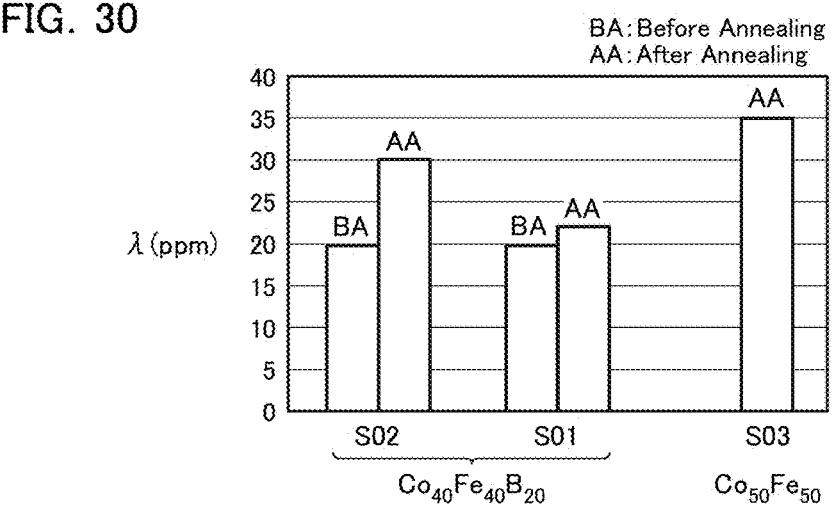
FIG. 30 is a graph showing another result of the same experiment.

The strain detection element 200 has, for example, a positive magnetoresistance effect. Therefore, when a tensile strain has occurred in the strain detection element 200 and the magnetization direction of the first magnetic layer 201 and the second magnetic layer 202 has approached 90° from 135° as shown in FIG. 3A, the electrical resistance between the first magnetic layer 201 and the second magnetic layer 202 becomes smaller as shown in FIG. 3D. On the other hand, when a compressive strain has occurred in the strain detection element 200 and the magnetization direction of the first magnetic layer 201 and the second magnetic layer 202 has approached 180° from 135° as shown in FIG. 3C, the electrical resistance between the first magnetic layer 201 and the second magnetic layer 202 becomes larger as shown in FIG. 30. Note that the strain detection element 200 may have a negative magnetoresistance effect.

Now, as shown in FIG. 3D, a minute strain is assumed to be $\Delta\varepsilon 1$, and a resistance change in the strain detection element 200 when applied with the minute strain $\Delta\varepsilon 1$ is assumed to be $\Delta r1$, for example. Furthermore, an amount of change of the electrical resistance value per unit strain is called a gauge factor GF. When manufacturing the strain detection element 200 of high sensitivity, the gauge factor is desirably set high. The gauge factor GF is expressed by (dR/R)/de.

As shown in FIG. 3E, when the magnetostriction constant of the first magnetic layer 201 is larger and coercivity of the first magnetic layer 201 is smaller, the reverse magnetostriction effect is expressed more prominently in the first magnetic layer 201 and the gauge factor increases. This is because the magnetostriction constant expresses a magnitude of a force rotating the magnetization direction with respect to the strain and coercivity expresses a magnitude of a force attempting to maintain the magnetization direction. Therefore, in order to increase the gauge factor, it is conceivable to make the magnetostriction constant of the first magnetic layer 201 larger and coercivity of the first magnetic layer 201 smaller.

Next, a configuration example 200A of the strain detection element 200 according to the present embodiment will be described with reference to FIGS. 4 and 5. Note that below, a description of "material A/material B" indicates a state where a layer of material B is provided on a layer of material A.

FIG. 4 is a schematic perspective view showing one configuration example 200A of the strain detection element 200. As shown in FIG. 4, the strain detection element 200A is configured from: a lower electrode 204; a stacked body provided on this lower electrode 204; and an upper electrode 212 provided on this stacked body. The stacked body is configured having the following stacked sequentially therein in order of closeness to the lower electrode 204, namely: a under layer 205; a pinning layer 206; a second magnetization fixed layer 207; a magnetic coupling layer 208; a first magnetization fixed layer 209 (the second magnetic layer 202); the intermediate layer 203; a magnetization free layer 210 (the first magnetic layer 201); and a cap layer 211. The first magnetization fixed layer 209 corresponds to the second magnetic layer 202. The magnetization free layer 210 corresponds to the first magnetic layer 201.

Employed in the under layer 205 is, for example, Ta/Ru. A thickness (length in a Z axis direction) of a Ta layer thereof is, for example, 3 nanometers (nm). A thickness of a Ru layer thereof is, for example, 2 nm. Employed in the pinning layer 206 is, for example, an IrMn layer having a thickness of 7 nm. Employed in the second magnetization fixed layer 207 is, for example, a $Co_{75}Fe_{25}$ layer having a thickness of 2.5 nm. Employed in the magnetic coupling layer 208 is, for example, a Ru layer having a thickness of 0.9 nm. Employed in the first magnetization fixed layer 209 is, for example, a $Co_{40}Fe_{40}B_{20}$ layer having a thickness of 3 nm. Employed in the intermediate layer 203 is, for example, a MgO layer having a thickness of 1.6 nm. Employed in the magnetization free layer 210 is, for example, $Co_{40}Fe_{40}B_{20}$/$Ni_{80}Fe_{20}$ having a thickness of 4 nm. Employed in the cap layer 211 is, for example, Ta/Ru. A thickness of a Ta layer thereof is, for example, 1 nm. A thickness of a Ru layer thereof is, for example, 5 nm. Employed in the lower electrode 204 and the upper electrode 212 is, for example, a metal.

Employable in the lower electrode 204 and the upper electrode 212 is, for example, a metal including at least one element selected from the group consisting of aluminum (Al), copper (Cu), silver (Ag), gold (Au), nickel (Ni), iron (Fe), and cobalt (Co). The metal including these elements has a comparatively small electrical resistivity. Employable are, for example, the likes of aluminum (Al), an aluminum copper alloy (Al—Cu), copper (Cu), a copper silver alloy (Cu—Ag), silver (Ag), gold (Au), and a nickel iron alloy (Ni—Fe). Employing such materials having a comparatively small electrical resistivity as the lower electrode 204 and the upper electrode 212 makes it possible to pass a current efficiently through the strain detection element 200A. A nonmagnetic material may be employed in the lower electrode 204 and the upper electrode 212.

The lower electrode 204 may include: a lower electrode 204-dedicated under layer (not illustrated); a lower electrode 204-dedicated cap layer (not illustrated); and a metal layer of the likes of Al, Al—Cu, Cu, Ag, Cu—Ag, Au, and a nickel iron alloy (Ni—Fe), provided between the under layer and cap layer. For example, employed in the lower electrode 204 is the likes of tantalum (Ta)/a copper silver alloy (Cu—Ag)/tantalum (Ta). Employing Ta as the lower electrode 204-dedicated under layer makes it possible to improve adhesion between the membrane 120 and the lower electrode 204, for example. Titanium (Ti) or titanium nitride (TiN) may be employed as the lower electrode 204-dedicated under layer.

Employing tantalum Ta as the lower electrode 204-dedicated cap layer makes it possible to avoid oxidation of the metal layer including at least one element selected from the group consisting of aluminum (Al), copper (Cu), silver (Ag), gold (Au), nickel (Ni), Iron (Fe), and cobalt (Co), that is below that cap layer. Titanium (Ti) or titanium nitride (TiN) may be employed as the lower electrode 204-dedicated cap layer. Moreover, employing a barrier metal of the likes of tantalum (Ta), titanium (Ti), and titanium nitride (Ti—N) as the cap layer makes it possible to suppress element diffusion with the stacked body of the strain detection element formed above the cap layer. Sometimes, deterioration of the gauge factor is caused when the likes of aluminum (Al), copper (Cu), silver (Ag), and gold (Au) diffuse to the stacked body of the strain detection element, hence a barrier metal is preferably employed as the cap layer. Generally employable as the barrier metal, besides tantalum (Ta), titanium (Ti), and titanium nitride (Ti—N) are a high melting point metal or a nitride or carbide of a high melting point metal.

In the present embodiment, unevenness of an upper surface of the lower electrode can be reduced. In order to reduce unevenness of the upper surface of the lower electrode, average roughness (mentioned in detail later) of unevenness of the upper surface of the low resistivity metal layer including at least one element selected from the group consisting of aluminum (Al), copper (Cu), silver (Ag), gold (Au), nickel (Ni), iron (Fe), and cobalt (Co), included in the lower electrode, can be set to 2 nanometers or less. In addition, maximum roughness (mentioned in detail later) of unevenness of the upper surface of the metal layer including at least one element selected from the group consisting of aluminum (Al), copper (Cu), silver (Ag), gold (Au), nickel (Ni), iron (Fe), and cobalt (Co), included in the lower electrode, can be set to 10 nanometers or less. Moreover, in another example of the present embodiment, a crystal grain size of the metal layer including at least one element selected from the group consisting of aluminum (Al), copper (Cu), silver (Ag), gold (Au), nickel (Ni), iron (Fe), and cobalt (Co), included in the lower electrode, can be set to 50 nanometers or less. In addition, when it is desired to make the lower electrode particularly low resistance, it is preferable to employ a low resistivity metal layer including at least one element selected from the group consisting of aluminum (Al), copper (Cu), silver (Ag), and gold (Au) that have a particularly low resistivity among the previously-mentioned element group. From a viewpoint of achieving a lower electrode 204 having the above-mentioned small crystal grain size, the lower electrode 204 desirably includes a Cu—Ag alloy as the low resistivity metal layer. Adding Ag to Cu makes it possible to reduce the crystal grain size and, moreover, makes it possible to reduce average roughness and maximum roughness of unevenness. Employable as the Cu—Ag alloy is, for example, $Cu_{100-x}Ag_x$ (1 at. %≤x≤20 at. %).

As will be mentioned later in a manufacturing method, in order to reduce an Ra value of unevenness of the upper surface of the lower electrode 204, it is preferable to perform chemical mechanical planarization (CMP) processing on a surface of the lower electrode 204. Now, in order to avoid oxidation of the metal layer including at least one element selected from the group consisting of aluminum (Al), copper (Cu), silver (Ag), gold (Au), nickel (Ni), iron (Fe), and cobalt (Co), of the low resistance metal layer, it is preferable to perform CMP processing on a surface of the cap layer formed on the metal layer.

Employable in the under layer 205 is, for example, a stacked structure including a buffer layer (not illustrated) and a seed layer (not illustrated). This buffer layer eases surface roughness of the lower electrode 204 or membrane 120, and so on, and improves crystallinity of a layer stacked on this buffer layer, for example. Employed as the buffer layer is, for example, at least one selected from the group consisting of tantalum (Ta), titanium (Ti), vanadium (V), tungsten (W), zirconium (Zr), hafnium (Hf), and chromium (Cr). An alloy including at least one material selected from these materials may be employed as the buffer layer.

A thickness of the buffer layer in the under layer 205 is preferably not less than 1 nm and not more than 10 nm. The thickness of the buffer layer is more preferably not less than 1 nm and not more than 5 nm. If the buffer layer is too thin, a buffer effect is lost. If the buffer layer is too thick, the strain detection element 200 becomes excessively thick. The seed layer is formed on the buffer layer, and that seed layer may have a buffer effect. In this case, the buffer layer may be omitted. Employed in the buffer layer is, for example, a Ta layer having a thickness of 3 nm.

The seed layer in the under layer 205 controls crystalline orientation of a layer stacked on the seed layer. The seed layer controls the crystal grain size of the layer stacked on the seed layer. Employed as the seed layer are the likes of a metal of fcc structure (face-centered cubic structure), hcp structure (hexagonal close-packed structure), or bcc structure (body-centered cubic structure).

Employing ruthenium (Ru) of hcp structure, or NiFe of fcc structure, or Cu of fcc structure as the seed layer in the under layer 205 makes it possible to set the crystalline orientation of a spin valve film on the seed layer to an fcc (111) orientation. Employed in the seed layer is, for example, a Cu layer having a thickness of 2 nm, or a Ru layer having a thickness of 2 nm. When raising crystalline orientation of the layer formed on the seed layer, a thickness of the seed layer is preferably not less than 1 nm and not more than 5 nm. The thickness of the seed layer is more preferably not less than 1 nm and not more than 3 nm. As a result, a function as a seed layer of improving crystalline orientation is sufficiently displayed.

On the other hand, when, for example, there is no need to cause crystalline orientation of the layer formed on the seed layer (when, for example, forming an amorphous magnetization free layer, and so on), the seed layer may be omitted. Employed as the seed layer is, for example, a Ru layer having a thickness of 2 nm.

The pinning layer 206 gives unidirectional anisotropy to the second magnetization fixed layer 207 (ferromagnetic layer) formed on the pinning layer 206, and thereby fixes magnetization of the second magnetization fixed layer 207. Employed in the pinning layer 206 is, for example, an antiferromagnetic layer. Employed in the pinning layer 206 is, for example, at least one selected from the group consisting of Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. It is also possible to employ an alloy having an additional element further added to the Ir—Mn, Pt—Mn, Pd—Pt—Mn, Ru—Mn, Rh—Mn, Ru—Rh—Mn, Fe—Mn, Ni—Mn, Cr—Mn—Pt, and Ni—O. A thickness of the pinning layer 206 is appropriately set to give sufficiently strong unidirectional anisotropy.

In order to perform fixing of magnetization of the ferromagnetic layer contacting the pinning layer 206, annealing during magnetic field application is performed. Magnetization of the ferromagnetic layer contacting the pinning layer 206 is fixed in a direction of the magnetic field applied during the annealing. Annealing temperature is set to, for example, a temperature greater than or equal to a magnetization fixing temperature of an antiferromagnetic material employed in the pinning layer 206. Moreover, when an antiferromagnetic layer including Mn is employed, Mn sometimes diffuses to a layer other than the pinning layer 206 to lower an MR ratio. Hence, the annealing temperature is desirably set to a temperature less than or equal to a temperature at which diffusion of Mn occurs. The annealing temperature may be set to, for example, not less than 200° C. and not more than 500° C. Preferably, it may be set to, for example, not less than 250° C. and not more than 400° C.

When PtMn or PdPtMn are employed as the pinning layer 206, the thickness of the pinning layer 206 is preferably not less than 8 nm and not more than 20 nm. The thickness of the pinning layer 206 is more preferably not less than 10 nm and not more than 15 nm. When IrMn is employed as the pinning layer 206, unidirectional anisotropy may be given by a pinning layer 206 which is thinner than when PtMn is employed as the pinning layer 206. In this case, the thickness of the pinning layer 206 is preferably not less than 4 nm and not more than 18 nm. The thickness of the pinning layer 105 is more preferably not less than 5 nm and not more than 15 nm. Employed in the pinning layer 206 is, for example, an $Ir_{22}Mn_{78}$ layer having a thickness of 7 nm.

A hard magnetic layer may be employed as the pinning layer 206. Employed as the hard magnetic layer is, for example, a hard magnetic material of comparatively high magnetic anisotropy and coercivity such as Co—Pt, Fe—Pt, Co—Pd, Fe—Pd, and so on. Moreover, an alloy having an additional element further added to Co—Pt, Fe—Pt, Co—Pd, and Fe—Pd may be employed. Employable as the hard magnetic layer is, for example, CoPt (where a percentage of Co is not less than 50 at. % and not more than 85 at. %), $(Co_xPt_{100-x})_{100-y}Cr_y$ (where x is not less than 50 at. % and not more than 85 at. %, and y is not less than 0 at. % and not more than 40 at. %), or FePt (where a percentage of Pt is not less than 40 at. % and not more than 60 at. %), and so on.

Employed in the second magnetization fixed layer 207 is, for example, a $Co_xFe_{100-x}$ alloy (where x is not less than 0 at. % and not more than 100 at. %), a $Ni_xFe_{100-x}$ alloy (where x is not less than 0 at. % and not more than 100 at. %), or a material having a nonmagnetic element added to these alloys. Employed as the second magnetization fixed layer 207 is, for example, at least one selected from the group consisting of Co, Fe, and Ni. It is also possible to employ as the second magnetization fixed layer 207 an alloy including at least one material selected from these materials. Also employable as the second magnetization fixed layer 207 is a $(Co_xFe_{100-x})_{100-y}B_y$ alloy (where x is not less than 0 at. % and not more than 100 at. %, and y is not less than 0 at. % and not more than 30 at. %). Employing an amorphous alloy of $(Co_xFe_{100-x})_{100-y}B_y$ as the second magnetization fixed layer 207 makes it possible to suppress variation of characteristics of the strain detection element 200A even when size of the strain detection element is small.

A thickness of the second magnetization fixed layer 207 is preferably not less than 1.5 nm and not more than 5 nm, for example. As a result, for example, intensity of a unidirectional anisotropic magnetic field due to the pinning layer 206 can be more greatly strengthened. For example, intensity of an antiferromagnetic coupling magnetic field between the second magnetization fixed layer 207 and the first magnetization fixed layer 209 can be more greatly strengthened, via the magnetic coupling layer formed on the second magnetization fixed layer 207. For example, magnetic film thickness (product (Bs·t) of saturation magnetization Bs and thickness t) of the second magnetization fixed layer 207 is preferably substantively equal to magnetic film thickness of the first magnetization fixed layer 209.

Saturation magnetization of $Co_{40}Fe_{40}B_{20}$ with a thin film is approximately 1.9 T (tesla). For example, when a $Co_{40}Fe_{40}B_{20}$ layer having a thickness of 3 nm is employed as the first magnetization fixed layer 209, the magnetic film thickness of the first magnetization fixed layer 209 is 1.9 T×3 nm, that is, 5.7 Tnm. On the other hand, saturation magnetization of $Co_{75}Fe_{25}$ is approximately 2.1 T. The thickness of the second magnetization fixed layer 207 at which a magnetic film thickness equal to that described above can be obtained is 5.7 Tnm/2.1 T, that is, 2.7 nm. In this case, a $Co_{75}Fe_{25}$ layer having a thickness of approximately 2.7 nm is preferably employed in the second magnetization fixed layer 207. Employed as the second magnetization fixed layer 207 is, for example, a $Co_{75}Fe_{25}$ layer having a thickness of 2.5 nm.

In the strain detection element 200A, a synthetic pin structure of the second magnetization fixed layer 207, the magnetic coupling layer 208, and the first magnetization fixed layer 209 is employed. Instead, a single pin structure configured from a single magnetization fixed layer may be employed. When the single pin structure is employed, a $Co_{40}Fe_{40}B_{20}$ layer having a thickness of 3 nm, for example, is employed as the magnetization fixed layer. The same material as the above-mentioned material of the second magnetization fixed layer 207 may be employed as the ferromagnetic layer employed in the single pin structure magnetization fixed layer.

The magnetic coupling layer 208 generates antiferromagnetic coupling between the second magnetization fixed layer 207 and the first magnetization fixed layer 209. The magnetic coupling layer 208 forms a synthetic pin structure. Employed as the magnetic coupling layer 208 is, for example, Ru. A thickness of the magnetic coupling layer 208 is preferably not less than 0.8 nm and not more than 1 nm, for example. A material other than Ru may be employed as the magnetic coupling layer 208, provided it is a material generating sufficient antiferromagnetic coupling between the second magnetization fixed layer 207 and the first magnetization fixed layer 209. The thickness of the magnetic coupling layer 208 may be set to a thickness of not less than 0.8 nm and not more than 1 nm corresponding to a second peak of RKKY (Ruderman-Kittel-Kasuya-Yosida) coupling. Furthermore, the thickness of the magnetic coupling layer 208 may be set to a thickness of not less than 0.3 nm and not more than 0.6 nm corresponding to a first peak of RKKY coupling. Employed as the magnetic coupling layer 208 is, for example, Ru having a thickness of 0.9 nm. As a result, highly reliable coupling can be more stably obtained.

A magnetic layer employed in the first magnetization fixed layer 209 contributes directly to the MR effect. Employed as the first magnetization fixed layer 209 is, for example, a Co—Fe—B alloy. Specifically, a $(Co_xFe_{100-x})_{100-y}B_y$ alloy (where x is not less than 0 at. % and not more than 100 at. %, and y is not less than 0 at. % and not more than 30 at. %) may be employed as the first magnetization fixed layer 209. When an amorphous alloy of $(Co_xFe_{100-x})_{100-y}B_y$ is employed as the first magnetization fixed layer 209, variation between elements due to crystalline particles can be suppressed even when, for example, size of the strain detection element 200 is small.

A layer formed on the first magnetization fixed layer 209 (for example, a tunnel insulating layer (not illustrated)) can be planarized. Planarization of the tunnel insulating layer makes it possible to reduce defect density of the tunnel insulating layer. As a result, a larger MR ratio can be obtained by a lower sheet resistivity. For example, when Mg—O is employed as a material of the tunnel insulating layer, employing an amorphous alloy of $(Co_xFe_{100-x})_{100-y}B_y$ as the first magnetization fixed layer 209 makes it possible to strengthen (100) orientation of an Mg—O layer formed on the tunnel insulating layer. More greatly raising the (100) orientation of the Mg—O layer enables an even larger MR ratio to be obtained. The $(Co_xFe_{100-x})_{100-y}B_y$ alloy crystallizes adopting a (100) surface of the Mg—O layer as a template during annealing. Therefore, good crystal conformity can be obtained between the Mg—O and the $(Co_xFe_{100-x})_{100-y}B_y$ alloy. Obtaining good crystal conformity enables an even larger MR ratio to be obtained.

An Fe—Co alloy, for example, may be employed as the first magnetization fixed layer 209, besides the Co—Fe—B alloy.

If the first magnetization fixed layer 209 is thicker, a larger MR ratio is obtained. In order to obtain a larger fixed magnetic field, it is more preferable for the first magnetization fixed layer 209 to be thin. There is a tradeoff relationship in the thickness of the first magnetization fixed layer 209 between the MN ratio and the fixed magnetic field. When a Co—Fe—B alloy is employed as the first magnetization fixed layer 209, the thickness of the first magnetization fixed layer 209 is preferably not less than 1.5 nm and not more than 5 nm. The thickness of the first magnetization fixed layer 209 is more preferably not less than 2.0 nm and not more than 4 nm.

Employed in the first magnetization fixed layer 209, besides the above-mentioned materials, is a $Co_{90}Fe_{10}$ alloy of fcc structure, or Co of hcp structure, or a Co alloy of hcp structure. Employed as the first magnetization fixed layer 209 is at least one selected from the group consisting of Co, Fe, and Ni. Employed as the first magnetization fixed layer 209 is an alloy including at least one material selected from these materials. Employing a bcc structure FeCo alloy material, a Co alloy including a cobalt composition of 50 at. % or more, or a material having a Ni composition of 50 at. % or more as the first magnetization fixed layer 209 results in, for example, a larger MR ratio being obtained.

It is also possible to employ as the first magnetization fixed layer 209 a Heusler magnetic alloy layer of the likes of, for example, $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, and $Co_2FeGa_{0.5}Ge_{0.5}$. For example, employed as the first magnetization fixed layer 209 is a $Co_{40}Fe_{40}B_{20}$ layer having a thickness of 3 nm.

The intermediate layer 203 decouples magnetic coupling between the first magnetic layer 201 and the second magnetic layer 202. Employed in the intermediate layer 203 is a metal or an insulator or a semiconductor. Employed as the metal is, for example, Cu, Au, or Ag, and so on. When a metal is employed as the intermediate layer 203, a thickness of the intermediate layer is, for example, about not less than 1 nm and not more than 7 nm. Employed as the insulator or semiconductor are, for example, the likes of a magnesium oxide (Mg—O, and so on), an aluminum oxide ($Al_2O_3$, and so on), a titanium oxide (Ti—O, and so on), a zinc oxide (Zn—O, and so on), or gallium oxide (Ga—O). When an insulator or semiconductor is employed as the intermediate layer 203, the thickness of the intermediate layer 203 is, for example, about not less than 0.6 nm and not more than 2.5 nm. Also employable as the intermediate layer 203 is, for example, a CCP (Current-Confined-Path) spacer layer. When a CCP spacer layer is employed as the spacer layer, a structure in which, for example, a copper (Cu) metal path is formed in the insulating layer of aluminum oxide ($Al_2O_3$), is employed. For example, employed as the intermediate layer is a Mg—O layer having a thickness of 1.6 nm.

A ferromagnetic material is employed in the magnetization free layer 210. Moreover, in the present embodiment, employing a ferromagnetic material of amorphous structure as the magnetization free layer 210 makes it possible to achieve a high gauge factor. Employable in the magnetization free layer 210 is, for example, an alloy including at least one element selected from the group consisting of Fe, Co, and Ni, and an amorphizing promotion element (for example, boron (B)). For example, employable in the magnetization free layer 210 are the likes of a Co—Fe—B alloy, an Fe—B alloy, or a Fe—Co—Si—B alloy. For example, a $Co_{40}Fe_{40}B_{20}$ layer having a thickness of 4 nm may be employed in the magnetization free layer 210.

The magnetization free layer 210 may have a multi-layer structure (for example, a two-layer structure). When a tunnel insulating layer of Mg—O is employed as the intermediate layer 203, a portion contacting the intermediate layer 203 in the magnetization free layer 210 is preferably provided with a layer of a Co—Fe—B alloy or an Fe—B alloy. As a result, a high magnetoresistance effect is obtained.

For example, the magnetization free layer 210 includes a first portion contacting or close to the intermediate layer 203 and a second portion contacting or close to the first portion. The first portion includes, for example, a portion contacting the intermediate layer 203 in the magnetization free layer 210. Employed in this first portion is a layer of the Co—Fe—B alloy. Moreover, employed in the second portion is, for example, the Fe—B alloy. That is, employed as the magnetization free layer 210 is, for example, a Co—Fe—B/Fe—B alloy. The thickness of this $Co_{40}Fe_{40}B_{20}$ layer is, for example, 0.5 nm. A thickness of the above-described Fe—B alloy layer employed as the magnetization free layer 210 is, for example, 6 nm.

In the present embodiment, employing a ferromagnetic material including an amorphous portion, as the magnetization free layer 210 allows a high gauge factor to be obtained. Examples of materials that can be employed in the magnetization free layer 210 will be mentioned later.

The cap layer 211 protects a layer provided below the cap layer 211. Employed in the cap layer 211 are, for example, a plurality of metal layers. Employed in the cap layer 211 is, for example, a two-layer structure (Ta/Ru) of a Ta layer and a Ru layer. A thickness of this Ta layer is, for example, 1 nm, and a thickness of this Ru layer is, for example, 5 nm. Another metal layer may be provided instead of the Ta layer or Ru layer, as the cap layer 211. There may be any configuration of the cap layer 211. For example, a nonmagnetic material may be employed in the cap layer 211. Another material may be employed as the cap layer 211, provided said material is capable of protecting the layer provided below the cap layer 211.

Examples of configurations and materials of the magnetization free layer 210 will be further described. A ferromagnetic material including an amorphous portion may be employed in the magnetization free layer 210. For example, it is possible to employ an alloy including at least one element selected from the group consisting of Fe, Co, and Ni, and an amorphizing promotion element (for example, boron (B)). Employable in the magnetization free layer 210 are, for example, the likes of a Co—Fe—B alloy or an Fe—B alloy. Employable in the magnetization free layer 210 is, for example, a $(Co_xFe_{100-x})_{100-y}B_y$ alloy (where x is not less than 0 at. % and not more than 100 at. %, and y is not less than 0 at. % and not more than 40 at. %). Employable in the magnetization free layer 210 is, for example, a $Co_{40}Fe_{40}B_{20}$ layer having a thickness of 4 nm.

When the alloy including at least one element selected from the group consisting of Fe, Co, and Ni, and boron (B) is employed in the magnetization free layer 210, at least one of Ga, Al, Si, and W may be added as an element promoting a large magnetostriction constant λ. Employable as the magnetization free layer 210 are, for example, an Fe—Ga—B alloy, an Fe—Co—Ga—B alloy, or an Fe—Co—Si—B alloy.

Employing $Fe_{1-y}B_y$ (where 0<y≤0.3) or $(Fe_aX_{1-a})_{1-y}B_y$ (where X is Co or Ni, 0.8≤a<1, and 0<y≤0.3) in at least part of the magnetization free layer 210 makes it easy to combine a large magnetostriction constant λ and low coercivity, hence is particularly preferable. For example, an $Fe_{80}Be_{20}$ layer having a thickness of 4 nm may be employed.

As mentioned above, the magnetization free layer 210 includes an amorphous portion. Part of the magnetization free layer 210 may be crystallized. The magnetization free layer 210 may include an amorphous portion while including a crystallized portion.

The magnetostriction constant λ and coercivity Hc in the magnetization free layer 210 are characteristics addable according to a volume ratio of the ferromagnetic material included in the magnetization free layer 210. Magnetic characteristics of the amorphous portion can be obtained even when a crystallized portion exists in the magnetization free layer 210, whereby a small coercivity Hc can be obtained. For example, when employing an insulator in the intermediate layer 203 and using a tunnel magnetoresistance effect, a portion including an interface with the intermediate layer 203 of the magnetization free layer 210 is preferably crystallized. This results in, for example, a high MR ratio being obtained.

A boron concentration (for example, a composition ratio of boron) in the magnetization free layer 210 is preferably not less than 5 at. % (atomic percent). This makes it easier to obtain an amorphous structure. The boron concentration in the magnetization free layer 210 is preferably not more than 35 at. %. If the boron concentration is too high, the magnetostriction constant decreases, for example. The boron concentration in the magnetization free layer is, for example, preferably not less than 5 at. % and not more than 35 at. %, and more preferably not less than 10 at. % and not more than 30 at. %.

For example, the magnetization free layer 210 includes a first portion contacting or close to the intermediate layer 203 and a second portion contacting or close to the first portion. The first portion includes, for example, a portion contacting the intermediate layer 203 in the magnetization free layer 210. Employed in the first portion is a layer of a Co—Fe—B alloy. Moreover, employed in the second portion is, for example, an Fe—Ga—B alloy. That is, employed as the magnetization free layer 210 is, for example, a Co—Fe—B/Fe—Ga—B alloy. A thickness of the $Co_{40}Fe_{40}B_{20}$ layer is, for example, 2 nm. A thickness of the Fe—Ga—B layer is, for example, 6 nm. Moreover, it is possible to employ a Co—Fe—B/Fe—B alloy. The thickness of $Co_{40}Fe_{40}B_{20}$ is, for example, 0.5 nm. A thickness of Fe—B is, for example, 4 nm. As has already been described, it is possible for a Co—Fe—B/Fe—B alloy, for example, to be employed as the magnetization free layer 210. In this case, the thickness of the $Co_{40}Fe_{40}B_{20}$ layer is, for example, 0.5 nm.

The thickness of the Fe—B layer is, for example, 4 nm. Employing a Co—Fe—B alloy in the first portion on an intermediate layer 203 side in this way makes it possible to obtain a high MR ratio.

Employable in the first portion including an interface with the intermediate layer 203 in the free magnetization layer 210 is $Fe_{50}Co_{50}$ (thickness 0.5 nm) that has been crystallized. Also employable in the first portion including an interface with the intermediate layer 203 in the free magnetization layer 210 is a two-layer structure of the likes of $Fe_{50}Co_{50}$ (thickness 0.5 nm)/$Co_{40}Fe_{40}B_{20}$ (thickness 2 nm), that has been crystallized.

Employable as the magnetization free layer 210 is a stacked film of $Fe_{50}Co_{50}$ (thickness 0.5 nm)/$Co_{40}Fe_{40}B_{20}$ (thickness 4 nm). Employable as the second magnetic layer 202 is a stacked film of $Fe_{50}Co_{50}$ (thickness 0.5 nm)/$Co_{40}Fe_{40}B_{20}$ (thickness 2 nm)/$Co_{35}Fe_{35}B_{30}$ (thickness 4 nm). In this stacked film, boron concentration rises as a distance from the intermediate layer 203 increases.

Figure 5:
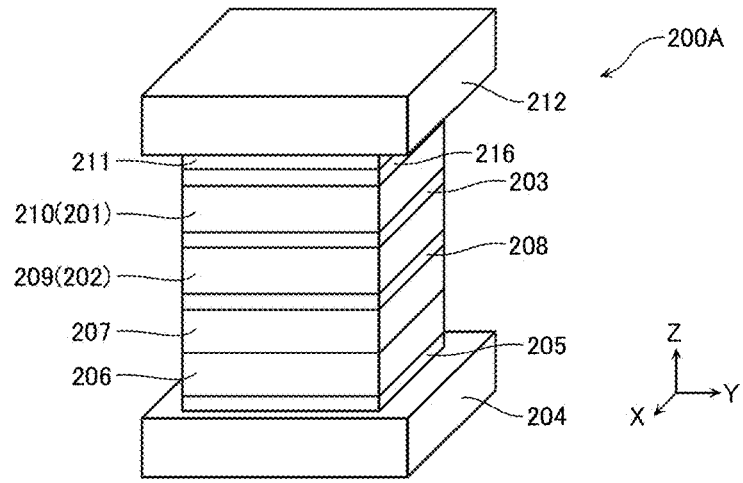
FIG. 5 is a schematic plan view showing another configuration example of the same strain detection element.

FIG. 5 is a schematic perspective view showing another configuration example of the strain detection element 200A. The strain detection element 200A shown in FIG. 5 is configured substantially similarly to the strain detection element 200A shown in FIG. 4, but differs in including a diffusion prevention layer 216 between the magnetization free layer 210 and the cap layer 211.

When a magnetic material including an amorphizing promotion element (for example, boron) is employed in the magnetization free layer 210, the diffusion prevention layer 216 prevents diffusion of the amorphizing promotion element and maintains the amorphous structure of the magnetization free layer 210. The diffusion prevention layer 216 is configured from the likes of an oxide or a nitride. Specifically, employable as an oxide material or nitride material employed in the diffusion prevention layer 216 is an oxide material or nitride material including an element such as Mg, Al, Si, Ti, V, Cr, Mn, Fe, Co, Ni, Cu, Zn, Zr, Nb, Mo, Ru, Rh, Pd, Ag, Hf, Ta, W, Sn, Cd, Ga, and so on. Now, in order to be a layer that does not contribute to the magnetoresistance effect, the diffusion prevention layer 216 preferably has a low sheet resistivity. For example, sheet resistivity of the diffusion prevention layer 216 is preferably set lower than sheet resistivity of the intermediate layer 203 contributing to the magnetoresistance effect. From a viewpoint of lowering sheet resistivity of the diffusion prevention layer, an oxide or a nitride of Mg, Ti, V, Zn, Sn, Cd, and Ga whose barrier heights are low, is preferable. An oxide having stronger chemical bonds as a function for suppressing diffusion of boron, is preferable. For example, MgO of 1.5 nm can be employed. Moreover, an oxynitride may be regarded as either an oxide or a nitride.

When an oxide material or nitride material is employed in the diffusion prevention layer 216, a film thickness of the diffusion prevention layer 216 is preferably not less than 0.5 nm from a viewpoint of sufficiently displaying a function of preventing boron diffusion, and is preferably not more than 5 nm from a viewpoint of lowering sheet resistivity. In other words, the film thickness of the diffusion prevention layer 216 is preferably not less than 0.5 nm and not more than 5 nm, and more preferably not less than 1 nm and not more than 3 nm.

Employable as the diffusion prevention layer 216 is at least one selected from the group consisting of magnesium (Mg), silicon (Si), and aluminum (Al). Employable as the diffusion prevention layer 216 is a material including these light elements. These light elements bond with boron to generate a compound. Formed in a portion including an interface between the diffusion prevention layer 216 and the magnetization free layer 210 is at least one of a Mg—B compound, an Al—B compound, and a Si—B compound, for example. These compounds suppress diffusion of boron.

The likes of another metal layer may be inserted between the diffusion prevention layer 216 and the magnetization free layer 210. However, if a distance between the diffusion prevention layer 216 and the magnetization free layer 210 becomes too large, boron diffuses between said layers whereby boron concentration in the magnetization free layer 210 ends up lowering, hence the distance between the diffusion prevention layer and the magnetization free layer 210 is preferably not more than 10 nm, and more preferably not more than 3 nm.

In the present embodiment, a magnetic layer not illustrated may be further provided between the diffusion prevention layer 216 and the magnetization free layer 210. This magnetic layer not illustrated has a magnetization direction which is variable. Applicable to the magnetic layer not illustrated is a material similar to a material applicable to the magnetization free layer 210. Moreover, the magnetic layer not illustrated may couple magnetically with the magnetization free layer 210 and may function in an integrated manner with the magnetization free layer 210.

The diffusion prevention layer 216 may be provided in the magnetization free layer 210. In this case, diffusion of boron in a portion positioned between the diffusion prevention layer 216 and the intermediate layer 203 of the magnetization free layer 210 (for example, diffusion of boron between the above-mentioned first portion and second portion) can be suppressed. This results in a small coercivity Hc being obtained. That is, coercivity Hc of the magnetization free layer 210 overall can be maintained small. When the diffusion prevention layer 216 is provided in the magnetization free layer 210, a plurality of the diffusion prevention layers 216 may be provided.

Figure 6:
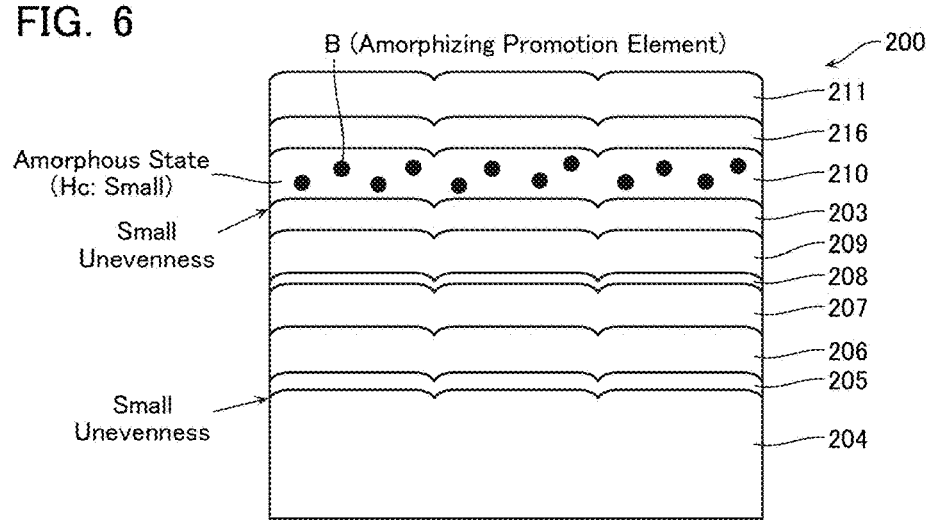
FIG. 6 is a schematic cross-sectional view for explaining characteristics of the same strain detection element.
Figure 7:
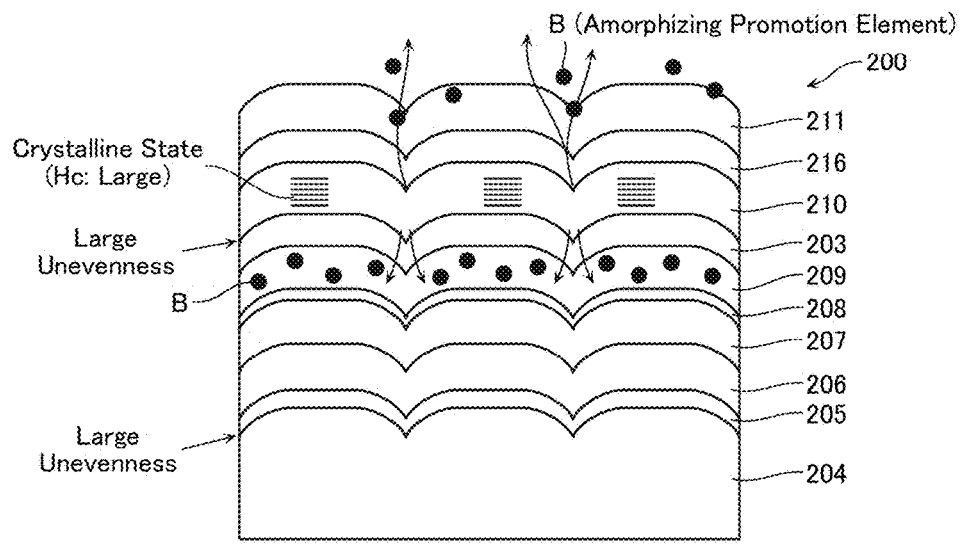
FIG. 7 is a schematic cross-sectional view for explaining characteristics of the same strain detection element.

Next, a relationship between unevenness of the lower electrode 204 and coercivity Hc of the magnetization free layer 210 will be described with reference to FIGS. 6 and 7. FIGS. 6 and 7 are schematic cross-sectional views for explaining the relationship between unevenness of an upper surface of the lower electrode 204 and coercivity Hc of the magnetization free layer 210, FIG. 6 exemplifying the case where unevenness of the upper surface of the lower electrode 204 is small, and FIG. 7 exemplifying the case where unevenness of the upper surface of the lower electrode 204 is large.

In the example shown in FIG. 6, the magnetization free layer 210 includes an amorphizing promotion element (in FIG. 6, boron (B)) and is in an amorphous state. Now, as a result of diligent investigation by the inventors, it was found that coercivity Hc of the magnetization free layer 210 is smaller when the magnetization free layer 210 is in an amorphous state compared to when the magnetization free layer 210 is in a crystalline state. Therefore, by including the amorphizing promotion element (in FIG. 6, boron (B)) in the magnetization free layer 210 and configuring the magnetization free layer 210 to be in an amorphous state, coercivity Hc of the magnetization free layer 210 can be decreased, and the gauge factor can be increased.

On the other hand, as shown in FIG. 7, sometimes, even when the amorphizing promotion element was included in the magnetization free layer 210, this amorphizing promotion element ended up diffusing to an adjacent layer during annealing treatment, crystallization of the magnetization free layer 210 ended up progressing accompanying this diffusion, and coercivity Hc of the magnetization free layer 210 ended up increasing. As a result of diligent investigation by the inventors, there was found to be a tendency that diffusion of the amorphizing promotion element and crystallization of the magnetization free layer 210 accompanying this diffusion occur more easily when unevenness of the upper surface of the lower electrode 204 is large. This is conceivably due to the following reasons.

That is, as shown in FIG. 6, when unevenness of the upper surface of the lower electrode 204 is small, unevenness in all of each layer from the under layer 205 to the first magnetization fixed layer 209, the intermediate layer 203, the magnetization free layer 210, and the diffusion prevention layer 216 that are deposited on that upper surface, becomes small. Therefore, it is conceivable that film thicknesses of the intermediate layer 203 or diffusion prevention layer 216 that prevent diffusion of the amorphizing promotion element are also comparatively uniform and diffusion of the amorphizing promotion element during annealing can be suitably prevented.

On the other hand, as shown in FIG. 7, when unevenness of the upper surface of the lower electrode 204 is large, unevenness in all of each layer from the under layer 205 to the first magnetization fixed layer 209, the intermediate layer 203, the magnetization free layer 210, and the diffusion prevention layer 216 that are deposited on that upper surface, becomes large. Therefore, a thin portion ends up occurring in the intermediate layer 203 or diffusion prevention layer 216. Therefore, it is conceivable that the amorphizing promotion element ends up diffusing via this thin portion during annealing.

Moreover, as a result of investigation by the inventors, it was found that this kind of diffusion of the amorphizing promotion element and progression of crystallization of the magnetization free layer 210 accompanying the diffusion occurs comparatively less readily when a crystal grain size of a material of the lower electrode 204 is small, and occurs comparatively more readily when the crystal grain size of the material of the lower electrode 204 is large.

Figure 8:
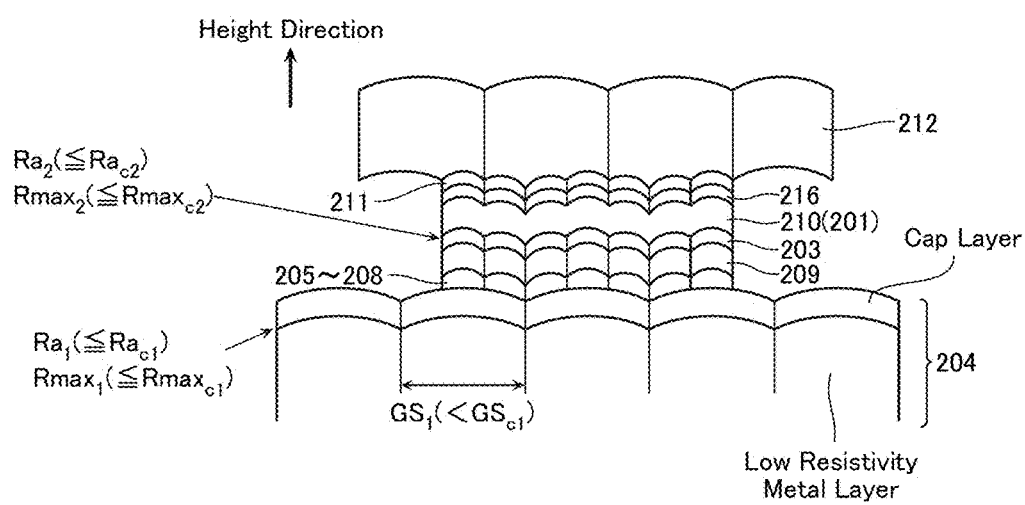
FIG. 8 is a schematic cross-sectional view showing the configuration of the same strain detection element.

Next, a mode of the strain detection element 200 according to the present embodiment will be described with reference to FIG. 8. FIG. 8 is a schematic cross-sectional view of the strain detection element 200 according to the present embodiment.

As shown in FIG. 8, in the strain detection element 200 according to the present embodiment, average roughness $Ra_2$ of an interface between the intermediate layer 203 and the first magnetic layer 201 is a certain value $Ra_{c2}$ or less. This value $Ra_{c2}$ is, for example, 0.3 nm. An Ra value is a numerical value indicating size of unevenness of a certain surface, and is also called average roughness. A calculation method of the Ra value will be described later with reference to parts (a) and (b) in FIG. 9. Note that average roughness $Ra_2$ is, for example, calculated by the Ra value described with reference to parts (a) and (b) in FIG. 9.

Moreover, as shown in FIG. 8, in the strain detection element 200 according to the present embodiment, maximum roughness $Rmax_2$ of the interface between the intermediate layer 203 and the first magnetic layer 201 is a certain value $Rmax_{c2}$ or less. This value $Rmax_{c2}$ is, for example, 2.5 nm. An Rmax value is a numerical value indicating size of unevenness of a certain surface, and is also called maximum roughness. A calculation method of the Rmax value will be described later with reference to part (c) in FIG. 9. Note that maximum roughness $Rmax_2$ is, for example, calculated by the Rmax value described with reference to part (c) in FIG. 9.

In addition, as shown in FIG. 8, the strain detection element 200 according to the present embodiment includes in the lower electrode 204 a metal layer of low resistivity including at least one element selected from the group consisting of aluminum (Al), copper (Cu), silver (Ag), gold (Au), nickel (Ni), iron (Fe), and cobalt (Co), and an Ra value $Ra_1$ of an upper surface of this metal layer is a certain value $Ra_{c1}$ or less. Moreover, this certain value $Ra_{c1}$ is, for example, 2 nm.

Moreover, as shown in FIG. 8, the strain detection element 200 according to the present embodiment includes in the lower electrode 204 the metal layer of low resistivity including at least one element selected from the group consisting of aluminum (Al), copper (Cu), silver (Ag), gold (Au), nickel (Ni), iron (Fe), and cobalt (Co), and an Rmax value $Rmax_1$ of the upper surface of this metal layer is a certain value $Rmax_{c1}$ or less. Moreover, this certain value $Rmax_{c1}$ is, for example, 10 nm.

Moreover, as shown in FIG. 8, the strain detection element 200 according to the present embodiment includes in the lower electrode 204 the metal layer of low resistivity including at least one element selected from the group consisting of aluminum (Al), copper (Cu), silver (Ag), gold (Au), nickel (Ni), iron (Fe), and cobalt (Co), and a crystal grain size $GS_1$ of this metal layer is a certain value $GS_{c1}$ or less. This certain value $GS_{c1}$ is, for example, 50 nm.

In addition, as mentioned above, the lower electrode 204 may include a Cu—Ag alloy as the metal layer of low resistivity. This makes it possible to reduce the crystal grain size $GS_1$ of the metal layer of low resistivity included in the lower electrode 204. Employable as the Cu—Ag alloy is, for example, $Cu_{100-x}Ag_x$ (1 at. %≤x≤20 at. %).

Such a configuration makes it possible to reduce unevenness of the interface between the intermediate layer 203 and the first magnetic layer 201 and the interface between the diffusion prevention layer 216 and the first magnetic layer 201 due to unevenness of the upper surface of the lower electrode 204, and makes it possible to prevent a thin portion being able to be formed in the intermediate layer 203 and the diffusion prevention layer 216. Therefore, it is made possible to suppress diffusion of the amorphizing promotion element and crystallization of the first magnetic layer 201 accompanying this diffusion, achieve a high MR by annealing while maintaining the first magnetic layer 201 in a low coercivity amorphous state, and increase the gauge factor of the pressure sensor, thereby providing the strain detection element 200 of high sensitivity, and the pressure sensor installed therewith.

Figure 9:
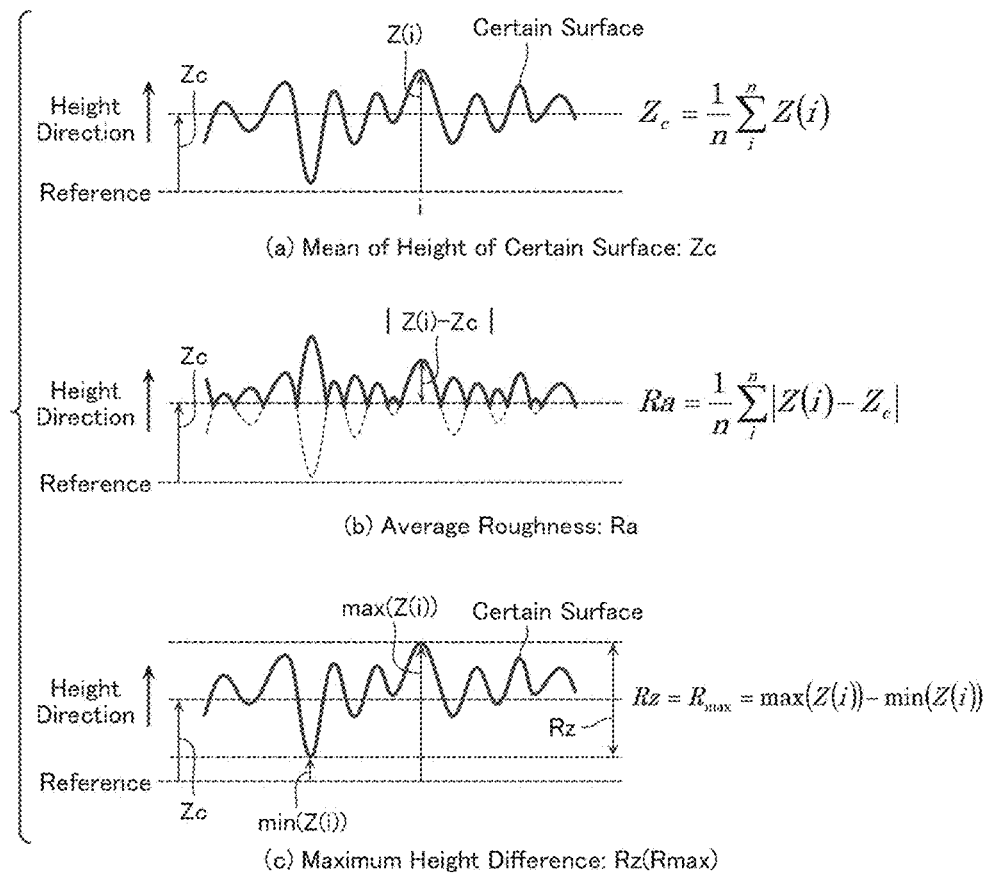
FIG. 9 is a schematic view for explaining the configuration of the same strain detection element.

Next, a calculation method of unevenness will be described with reference to FIG. 9. FIG. 9 is a schematic view for explaining the calculation method of unevenness in the present embodiment.

First, a calculation method of a mean value Zc of a position in a height direction in a certain surface will be described with reference to part (a) in FIG. 9. A curve in part (a) in FIG. 9 shows schematically a position in the height direction of the certain surface when the strain detection element 200 is viewed from a side surface. Moreover, "i" in part (a) in FIG. 9 indicates a certain position in a direction orthogonal to the height direction (a certain direction parallel to an xy plane), and "Z(i)" indicates a position (distance from a reference) in the height direction of the certain surface for the direction i. Furthermore, Zc in part (a) in FIG. 9 is a mean value of Z(i) for all i. As shown in part (a) in FIG. 9, Zc is expressed by the following formula (1).

$$Z_C = \frac{1}{n}\sum_{i}^{n} Z(i) \qquad \text{Formula (1)}$$

Note that when, for example, the actual strain detection element 200 is cut and has its cross-section observed by a TEM or the like, it is also possible to perform a fitting processing on, for example, the interface between the intermediate layer 203 or diffusion prevention layer 216 and the first magnetic layer 201 or second magnetic layer 202, in the acquired image, and thereby acquire Zc. Moreover, when, for example, Zc is acquired by this kind of means, this line may be employed as the "reference" in FIG. 9, and furthermore a direction perpendicular to this line may be specified as the height direct ion.

Next, a calculation method of unevenness (Ra value, average roughness) will be described with reference to part (b) in FIG. 9. In part (b) in FIG. 9, the position Z(i) in the height direction of the certain surface and the mean value Zc of Z(i) are indicated by a dotted line, and furthermore an absolute value of a difference between Z(i) and Zc is indicated by a solid line. The Ra value is a mean value of the absolute values of the differences between Z(i) and Zc for all i. As shown in part (b) in FIG. 9, Ra is expressed by the following formula (2).

$$Ra = \frac{1}{n}\sum_{i}^{n}|Z(i) - Z_C| \qquad \text{Formula (2)}$$

Next, another calculation method of unevenness (maximum height difference Rz (=Rmax)) will be described with reference to part (c) in FIG. 9. A curve in part (c) in FIG. 9 shows schematically the position in the height direction of the certain surface when the strain detection element 200 is viewed from a side surface. As shown in part (c) in FIG. 9, a maximum height difference Ez (=Rmax) is a differential between a maximum value max(Z(i)) of Z(i) and a minimum value min(Z(i)) of Z(i). As shown in part (c) in FIG. 9, Rz is expressed by the following formula (3).

$$Rz = R_{max} = \max(Z(i)) - \min(Z(i)) \qquad \text{Formula (3)}$$

[1-2. Investigation of Relationship Between Crystalline Structure and Magnetic Characteristics of Magnetization Free Layer]

Next, results of an experiment performed by the inventors will be described. First, the relationship between crystalline structure and magnetic characteristics of the magnetization free layer 210 will be described with reference to FIGS. 10 to 35.

Figure 10:
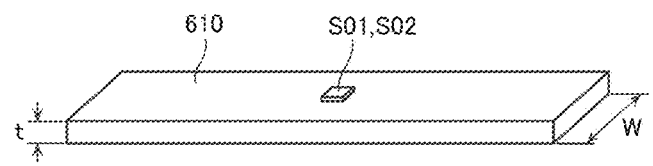
FIG. 10 is a schematic side view for explaining an environment of an experiment.
Figure 11:
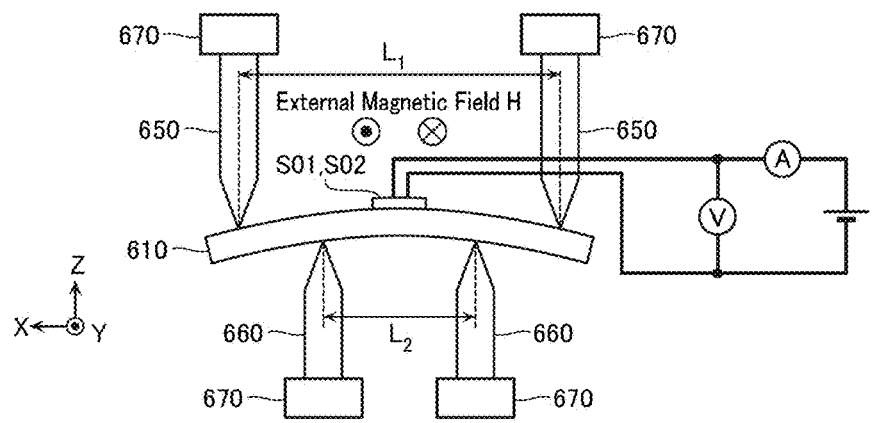
FIG. 11 is a schematic perspective view showing a configuration of an experiment sample of the same experiment.

First, a method of the present experiment will be described with reference to FIGS. 10 and 11. FIGS. 10 and 11 are schematic views for explaining the method of the present experiment. In the present experiment, a strain was provided to a first sample S01 or a second sample S02 that have a similar configuration to the strain detection element 200, by a substrate bending method that bends a substrate 610, and in this state, an external magnetic field H was applied to the first sample S01 or the second sample S02, and a resistance value of these samples was measured.

During the present experiment, first, as shown in FIG. 10, the first sample S01 or the second sample S02 was produced on the substrate 610, and next, the substrate 610 was cut into a strip shape. The first sample S01 and the second sample S02 were formed in a dot shape on the substrate 610. A size in the xy plane of the first sample S01 and the second sample S02 is 20 μm×20 μm.

Next, as shown in FIG. 11, the substrate 610 on which the first sample S01 or the second sample S02 were produced was bent in a direction (for example, the X direction) orthogonal to a magnetization direction (for example, the -Y direction) of the second magnetic layer 202, whereby a strain was provided to the first sample S01 or the second sample S02. Bending of the substrate 610 was performed by a four point bending method (substrate bending method) due to knife edges 650 and 660. A load cell 670 is incorporated into the knife edges 650 and 660, and a strain E provided to the first sample S01 or the second sample S02 was calculated by measuring a load of the knife edges 650 and 660 by this load cell 670. The following formula (4) relating to a two-sided support beam was employed in calculation of the strain ε.

$$\varepsilon = \frac{-3(L_1 - L_2)G}{2Wt^2 e_s} \qquad \text{Formula (4)}$$

In the above-described formula (4), "$e_s$" is the Young's modulus of the substrate 610. "$L_1$" is an inter-edge length of the outer-side knife edges 650. "$L_2$" is an inter-edge length of the inner-side knife edges 660. "W" is a width of the substrate 610. "t" is a thickness of the substrate 610. "G" is a load applied to the knife edges 650 and 660. The load applied to the knife edges 650 and 660 can be changed continuously by a motor not illustrated. Note that in experiments in the present specification, a Si substrate having a substrate thickness t of 0.6 mm was employed, substrate bending was performed in a (110) direction of the Si substrate, and the Young's modulus $e_s$ of the substrate 610 was configured to be 169 GPa.

Note that FIG. 11 describes an example where the substrate 610 is being bent in a convex shape, but in the present experiment, the substrate 610 was bent also in a concave shape. When the substrate 610 is bent in a convex shape as shown in, for example, FIG. 11, a strain occurs in a tensile direction (positive direction) in the first sample S01 or the second sample S02. On the other hand, when the substrate 610 is bent in a concave shape, a strain occurs in a compressive direction (negative direction) in the first sample S01 or the second sample S02.

Moreover, as shown in FIG. 11, the external magnetic field H was applied in a direction orthogonal to a direction in which the substrate 610 was bent (a direction of the strain provided to the first sample S01 or the second sample S02). Current perpendicular-to-plane characteristics of the first sample S01 or the second sample S02 were evaluated in this state. Note that regarding the direction of the external magnetic field H, a direction (for example, the Y direction) opposite to the magnetization direction of the second magnetic layer 202 was assumed to be a positive direction, and a direction (for example, the -Y direction) the same as the magnetization direction of the second magnetic layer 202 was assumed to be a negative direct ion.

Figure 12:
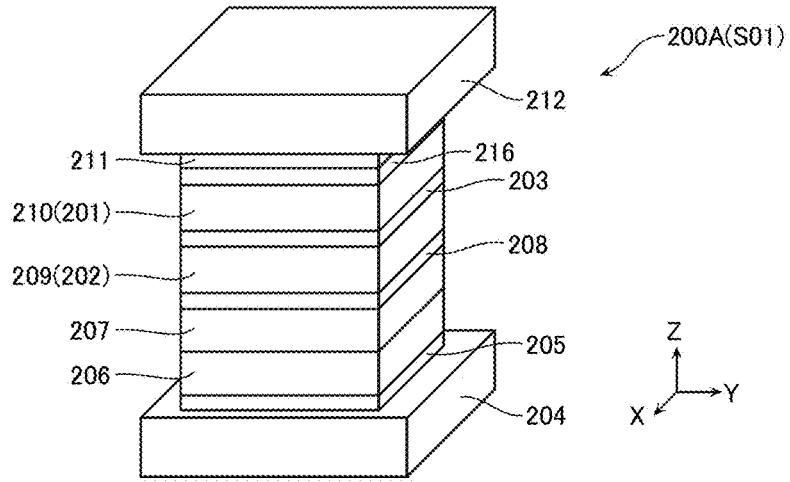
FIG. 12 is a schematic perspective view showing a configuration of another experiment sample of the same experiment.

Next, a description of the samples used in the present experiment will be given with reference to FIGS. 12 and 13. FIG. 12 is a schematic perspective view showing a configuration of the first sample S01. The first sample S01 is configured similarly to the strain detection element 200A shown in FIG. 5 and includes the diffusion prevention layer 216.

In the first sample S01, a Ta (5 nm)/$Cu_{95}Ag_5$ (240 nm)/Ta (50 nm) layer is employed as the lower electrode 204, Ta (1 nm)/Ru (2 nm) is employed as the under layer 205, an $Ir_{22}Mn_{78}$ layer having a thickness of 7 nm is employed as the pinning layer 206, a $Co_{75}Fe_{25}$ layer having a thickness of 2.5 nm is employed as the second magnetization fixed layer 207, a Ru layer having a thickness of 0.9 nm is employed as the magnetic coupling layer 208, a $Co_{40}Fe_{40}B_{20}$ layer having a thickness of 3 nm is employed as the first magnetization fixed layer 209, a MgO layer having a thickness of 1.6 nm is employed as the intermediate layer 203, a $Co_{40}Fe_{40}E_{20}$ layer having a thickness of 4 nm is employed as the magnetization free layer 210, a MgO layer having a thickness of 1.5 nm is employed as the diffusion prevention layer 216, Cu (1 nm)/Ta (20 nm)/Ru (50 nm) is employed as the cap layer 211, and Ta (5 nm)/Cu (200 nm)/Ta (35 nm)/Au (200 nm) is employed as the upper electrode 212.

The Mg—O layer employed in the intermediate layer 203 and the diffusion prevention layer 216 is formed by depositing a Mg layer having a thickness of 1.6 nm and then performing a surface oxidation by IAO (Ion beam-assisted Oxidation) processing. Oxidation conditions during production of the Mg—O layer for the diffusion prevention layer 216 are weaker than oxidation conditions during production of the Mg—O layer for the intermediate layer 203. Sheet resistivity of the Mg—O layer for the diffusion prevention layer 216 is lower than sheet resistivity of the Mg—O layer for the intermediate layer 203. If sheet resistivity of the Mg—O layer for the diffusion prevention layer 216 is higher than sheet resistivity of the Mg—O layer for the intermediate layer 203, then parasitic resistance increases due to that diffusion prevention layer 216, the MR ratio decreases, and the gauge factor lowers. By setting sheet resistivity of the Mg—O layer for the diffusion prevention layer 216 lower than sheet resistivity of the Mg—C layer for the intermediate layer 203, parasitic resistance can be reduced, a high MR ratio is obtained, and a high gauge factor is obtained.

Figure 13:
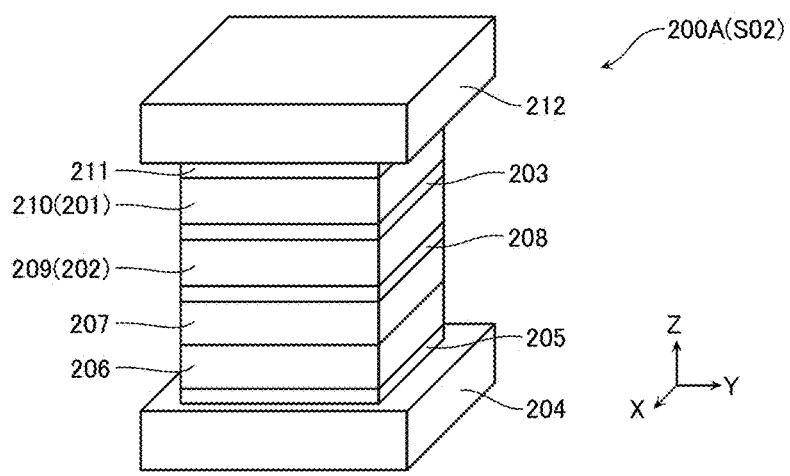
FIG. 13 is a graph showing a result of the same experiment.

FIG. 13 is a schematic perspective view showing a configuration of the second sample S02. The second sample S02 is configured similarly to the strain detection element 200A shown in FIG. 4 and does not include the diffusion prevention layer 216. Moreover, regarding layers other than the diffusion prevention layer 216, the second sample S02 is configured similarly to the first sample S01.

Figure 14:
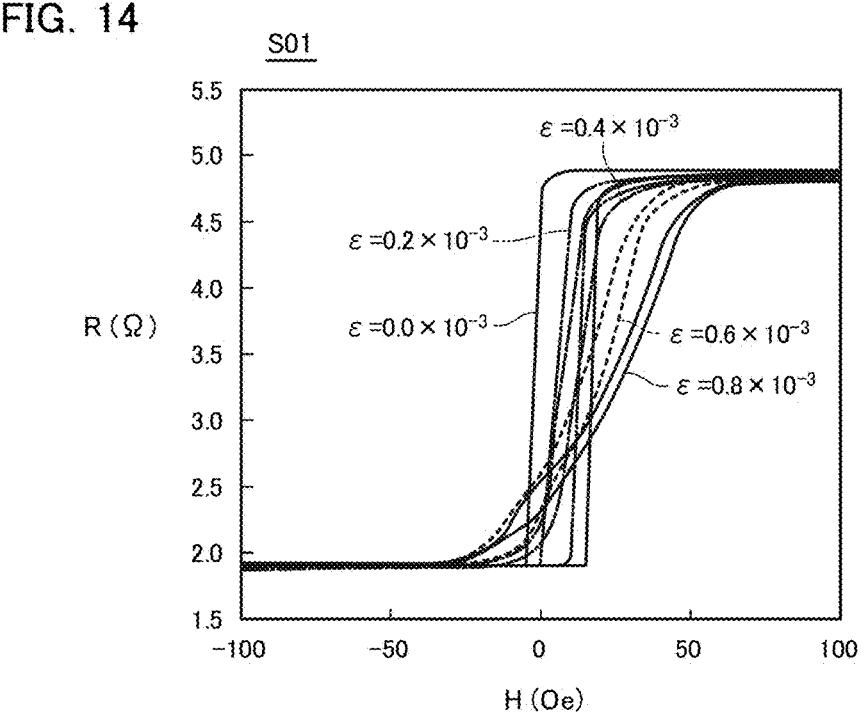
FIG. 14 is a graph showing another result of the same experiment.
Figure 15:
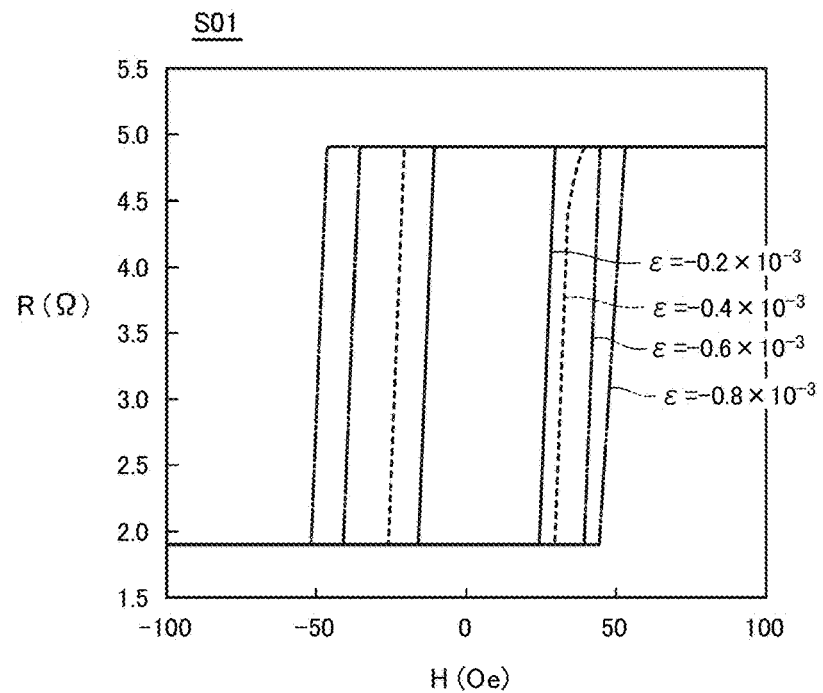
FIG. 15 is a graph showing another result of the same experiment.
Figure 16:
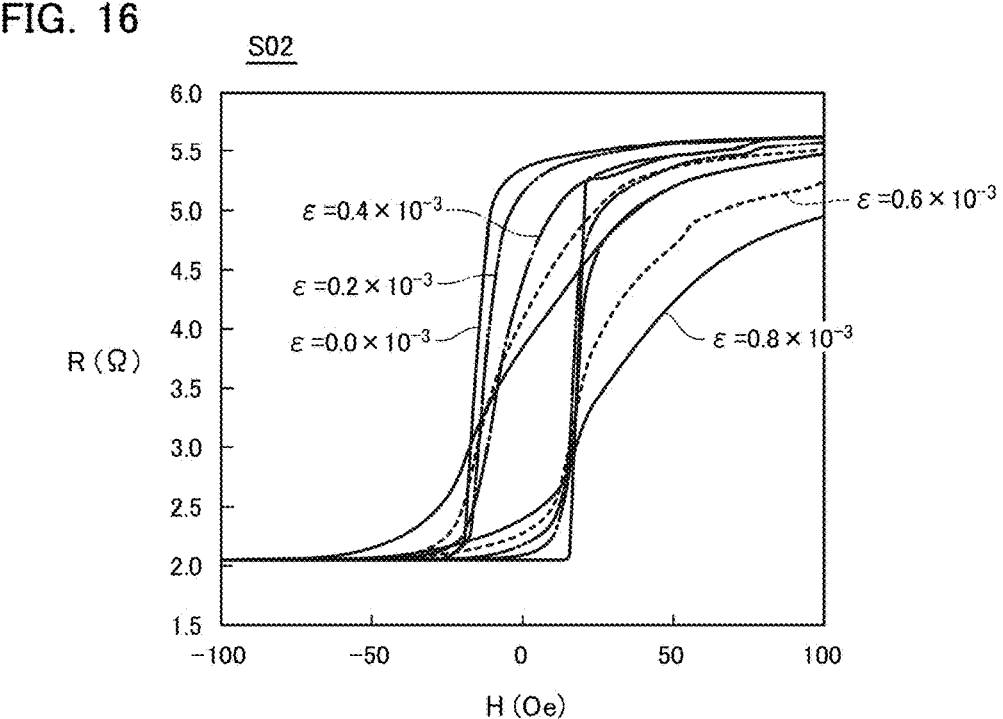
FIG. 16 is a graph showing another result of the same experiment.
Figure 17:
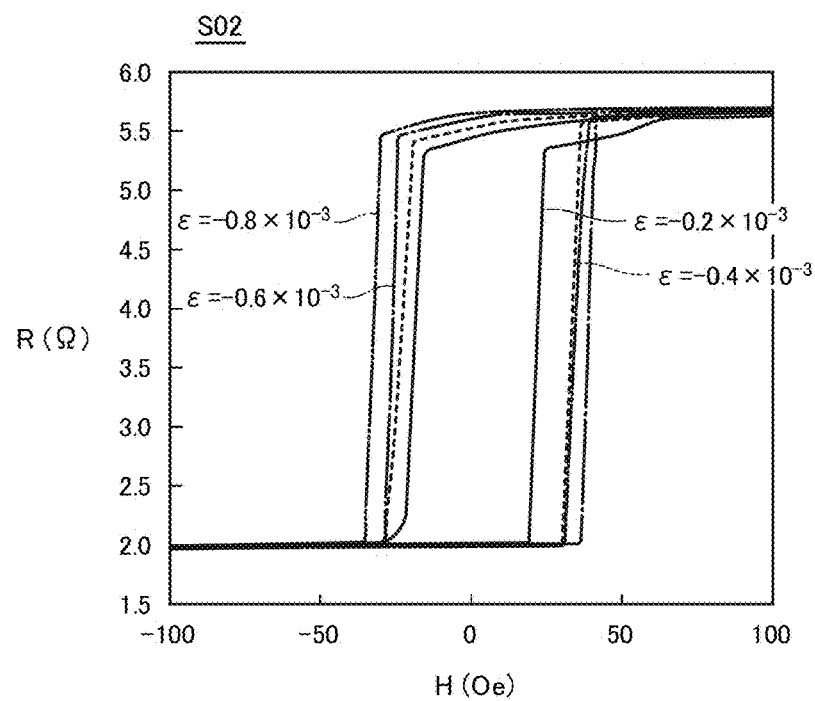
FIG. 17 is a graph showing another result of the same experiment.

Next, results of the present experiment will be described with reference to FIGS. 14 to 17. FIGS. 14 to 17 are graphs for explaining the results of the present experiment. FIGS. 14 and 15 show results for the case where the first sample S01 was provided on the substrate 610, and respectively show results when the substrate 610 was bent in a convex shape to provide a strain in the positive direction (tensile direction) to the first sample S01 and results when the substrate 610 was bent in a concave shape to provide a strain in the negative direction (compressive direction) to the first sample S01. On the other hand, FIGS. 16 and 17 show results for the case where the second sample S02 was provided on the substrate 610, and respectively show results when the substrate 610 was bent in a convex shape to provide a strain in the positive direction (tensile direction) to the second sample S02 and results when the substrate 610 was bent in a concave shape to provide a strain in the negative direction (compressive direction) to the second sample S02. Moreover, in FIGS. 14 to 17, the horizontal axis indicates a magnitude of the external magnetic field H (oersted: Oe), and the vertical axis indicates an electrical resistance value R (ohm: Ω) between the lower electrode 204 and the upper electrode 212. Furthermore, in FIGS. 14 to 17, a relationship between the external magnetic field H and the electrical resistance value R is shown for each strain $\varepsilon$ provided to the first sample S01 or the second sample S02. Moreover, values of magnetostriction $\lambda$ and coercivity Hc of the first sample S01 and the second sample S02 were found by M (magnetization)-H (magnetic field) measurement in a state of a continuous film that has not undergone element processing. The magnetostriction $\lambda$ was calculated by a change in anisotropic magnetic field Hk in a difficult-to-magnetize axis direction of the magnetization free layer on applying a strain to the substrate. Note that in the results shown in FIGS. 14 to 17, M-H measurement was performed by a loop tracer employing a magnetic field sweep of 50 Hz.

FIGS. 14 and 16 show measurement results of magnetic field dependency of the electrical resistance when strain $\varepsilon$ is $0.8 \times 10^{-3}$, $0.6 \times 10^{-3}$, $0.4 \times 10^{-3}$, $0.2 \times 10^{-3}$, and $0.0 \times 10^{-3}$. Moreover, FIGS. 15 and 17 show measurement results of magnetic field dependency of the electrical resistance when strain $\varepsilon$ is $-0.2 \times 10^{-3}$, $0.4 \times 10^{-3}$, $-0.6 \times 10^{-3}$, and $-0.8 \times 10^{-3}$. As shown in FIGS. 14 to 17, in the first sample S01 and the second sample S02, an R—H loop shape changes according to a value of the strain $\varepsilon$. This indicates that in-plane magnetic anisotropy of the first magnetic layer 201 (magnetization free layer) changes due to the reverse magnetostriction effect.

When characteristics of the first sample S01 were calculated from the results of the graphs shown in FIGS. 14 and 15 and the M-H measurements not illustrated, an MR ratio was 149% and coercivity was 3.2 Oe. On the other hand, when characteristics of the second sample S02 were calculated, the MR ratio was 188% and coercivity was 27 Oe. From the above, it was confirmed that the first sample S01 including the diffusion prevention layer 216 configured from Mg—O had its coercivity Hc significantly reduced over that of the second sample S02 not including the diffusion prevention layer 216.

Next, a relationship between the strain $\varepsilon$ and the electrical resistance value R in the first sample S01 and the second sample S02 under an environment of the kind shown in FIGS. 10 and 11, was investigated. In the present investigation, magnitude of the external magnetic field H was fixed, and the strain E in the first sample S01 and the second sample S02 was changed continuously from $-0.8 \times 10^{-3}$ to $0.8 \times 10^{-3}$, and then the strain $\varepsilon$ was changed continuously from $0.8 \times 10^{-3}$ to $-0.8 \times 10^{-3}$.

Figure 18:
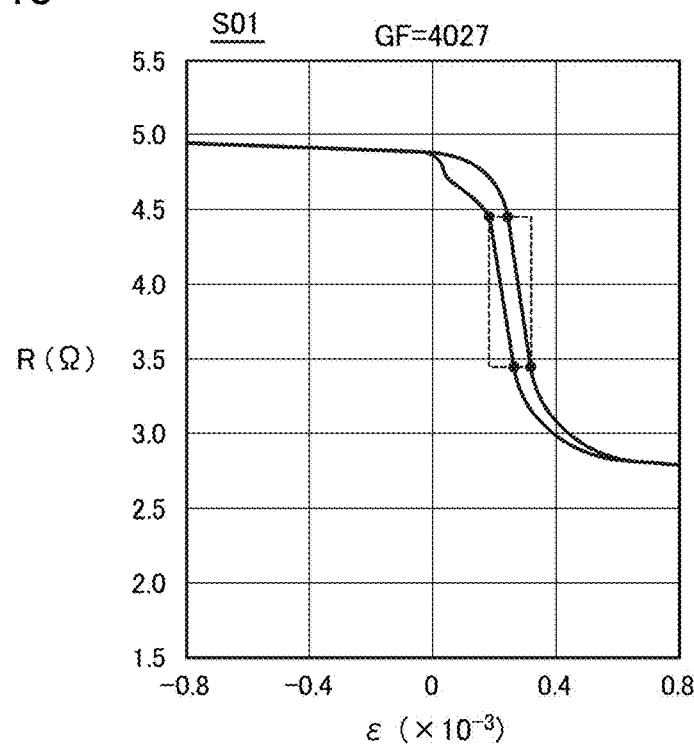
FIG. 18 is a graph showing another result of the same experiment.
Figure 19:
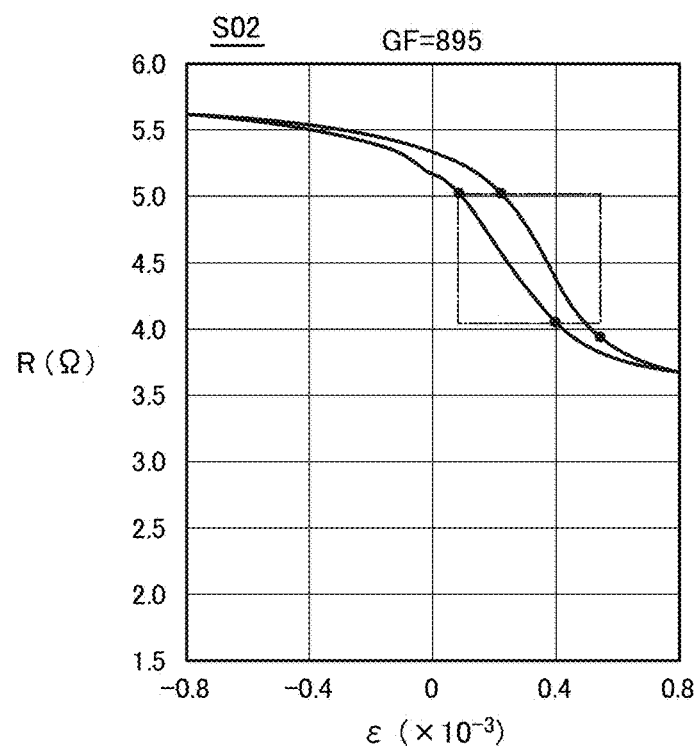
FIG. 19 is a graph showing another result of the same experiment.

Next, other results of the present experiment will be described with reference to FIGS. 18 and 19. FIGS. 18 and 19 respectively show the relationship between strain provided to the first sample S01 and the second sample S02 and the electrical resistance value R, the horizontal axis indicating the strain $\varepsilon$ and the vertical axis indicating the electrical resistance value R between the lower electrode 204 and the upper electrode 212. Moreover, when characteristics of the first sample S01 were calculated from these results, the magnetostriction constant $\lambda$ was 20 ppm and the gauge factor (GF=(dR/R)/d$\varepsilon$) was 4027. Similarly, when characteristics of the second sample S02 were calculated, the magnetostriction constant $\lambda$ was 30 ppm and the gauge factor (GF=(dR/R)/d$\varepsilon$) was 895.

From the above, it was confirmed that a larger gauge factor is obtained in the first sample S01 including the diffusion prevention layer 216 configured from Mg—O than in the second sample S02 not including the diffusion prevention layer 216, even when the same material (a magnetization free layer that is a $Co_{40}Fe_{40}B_{20}$ layer having a thickness of 4 nm) is employed as the first magnetic layer 201. Such a difference in gauge factor due to presence/absence of the diffusion prevention layer 216 is conceivably due to a difference in coercivity He of the first magnetic layer ($Co_{40}Fe_{40}B_{20}$).

That is, as described with reference to FIGS. 3D and 3E, when the magnetostriction constant of the first magnetic layer 201 is larger and coercivity of the first magnetic layer 201 is smaller, the reverse magnetostriction effect is expressed more prominently in the first magnetic layer 201 and the gauge factor increases. Now, the first sample S01 has values of the MR ratio and the magnetostriction constant $\lambda$ which are lower, but a coercivity Hc which is approximately 1/10, compared to those of the second sample S02. Therefore, it is conceivable that in the first sample S01, a contribution to gauge factor increase due to lowering of coercivity Hc is expressed more prominently compared to a contribution to gauge factor decrease due to lowering of the MR ratio and magnetostriction constant λ, thereby increasing the gauge factor.

Next, as shown in FIGS. 20 to 23, observation by a transmission electron microscope (TEN) was performed on the first sample S01 and the second sample S02. First, a crystalline structure of the first sample S01 and the second sample S02 will be described with reference to FIGS. 20 and 21. FIGS. 20A and 21A are cross-sectional transmission electron microscope (cross-sectional TEM) photographic images of the first sample S01 and the second sample S02. As shown in FIGS. 20A and 21A, a stacked structure from the pinning layer 206 to the cap layer 211 is photographed in the drawings.

Figure 20A:
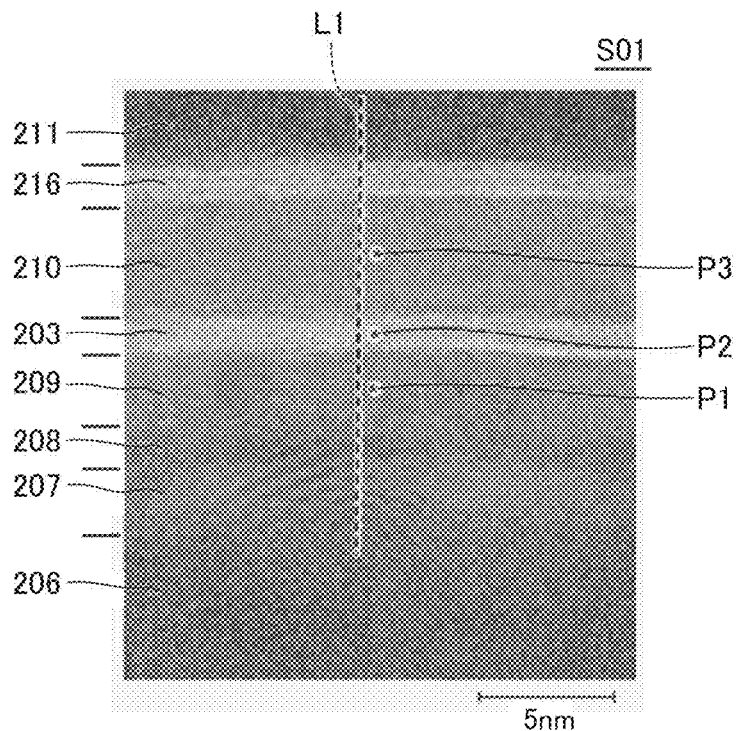
FIGS. 20A-20D are views showing another result of the same experiment.
Figure 20B:
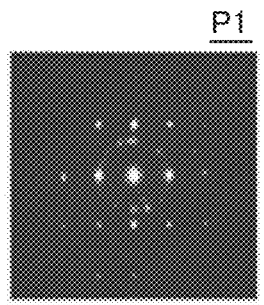
Figure 20C:
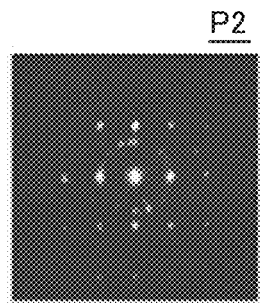
Figure 20D:
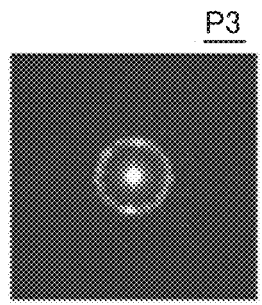

FIGS. 20B to 20D are crystal lattice diffraction images due to nanodiffraction of an electron beam at, respectively, point P1 (one point in the first magnetization fixed layer 209 of the first sample S01), point P2 (one point in the intermediate layer 203 of the first sample S01), and point P3 (one point in the magnetization free layer 210 of the first sample S01) in FIG. 20A. As shown in the drawings, a regular atomic arrangement is observed in FIGS. 20B and 20C. This indicates that portions at point P1 and point P2 are in a crystalline state. In contrast, a regular atomic arrangement is not observed in FIG. 20D, rather a ring-shaped diffraction image is observed. This indicates that a portion at point P3 is in an amorphous state.

Figure 21A:
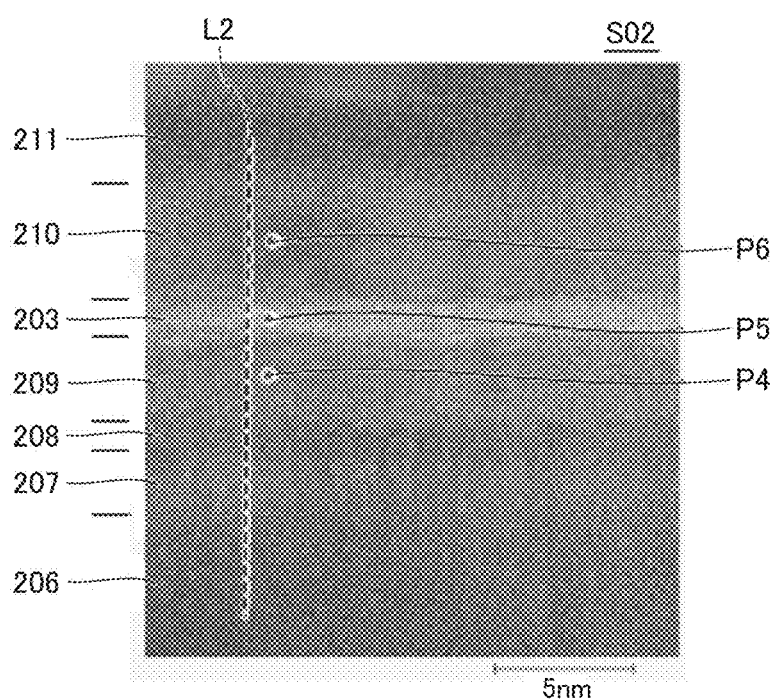
FIGS. 21A-21D are views showing another result of the same experiment.
Figure 21B:
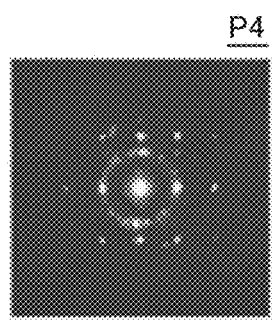
Figure 21C:
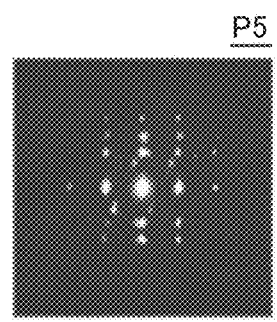
Figure 21D:
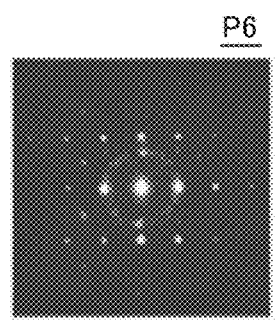

FIGS. 21B to 21D are crystal, lattice diffraction images due to nanodiffraction of an electron beam at point P4 (one point in the first magnetization fixed layer 209 of the second sample S02), point P5 (one point in the intermediate layer 203 of the second sample S02), and point P6 (one point in the magnetization free layer 210 of the second sample S02) in FIG. 21A. As shown in the drawings, a regular atomic arrangement is observed in FIGS. 21B to 21D. This indicates that portions at point P4, point P5, and point P6 are in a crystalline state.

From the above, it may be understood that the magnetization free layer 210 of the first sample S01 having the diffusion prevention layer 216 and showing a high gauge factor includes an amorphous structure, and the magnetization free layer 210 of the second sample S02 not having the diffusion prevention layer 216 and showing a low gauge factor includes a crystalline structure.

Figure 22:
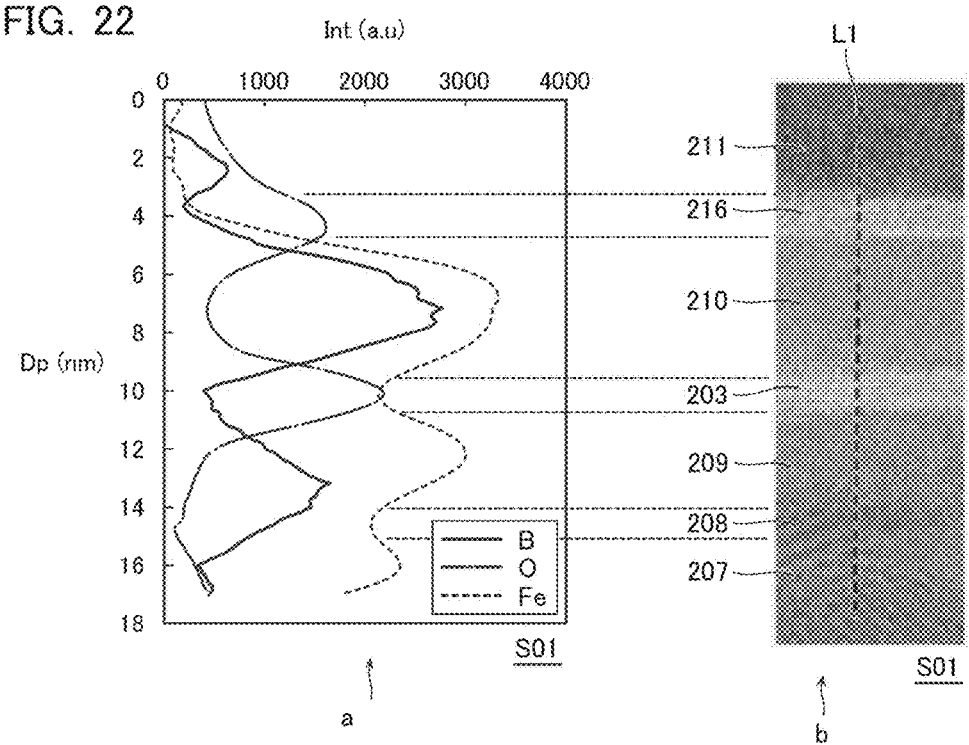
FIG. 22 is a graph showing another result of the same experiment.
Figure 23:
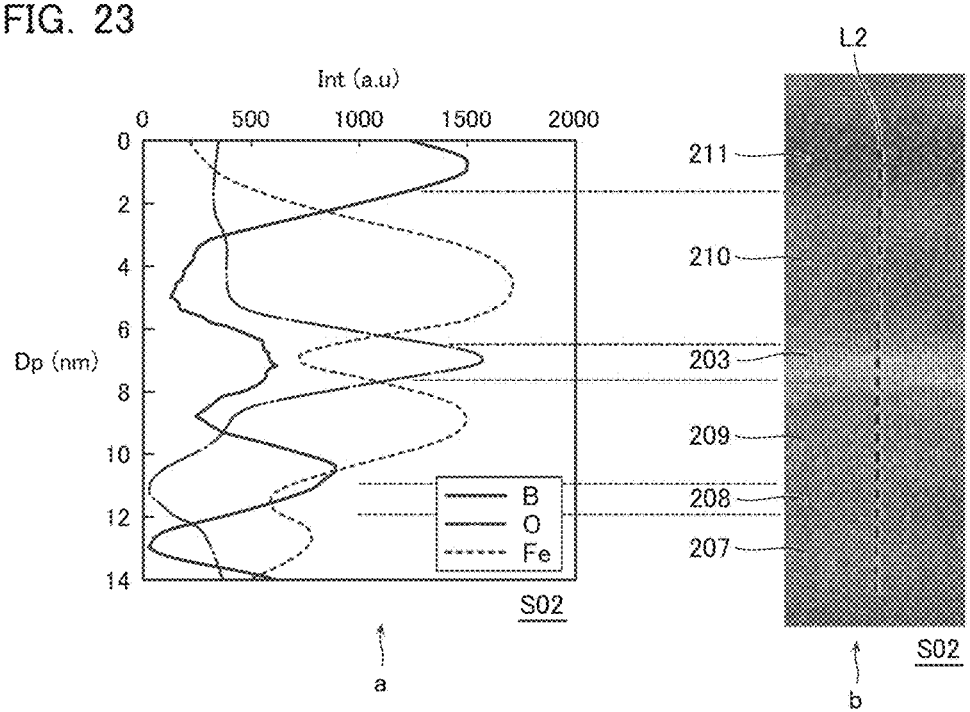
FIG. 23 is a graph showing another result of the same experiment.

Next, a description of composition of the first sample S01 and the second sample S02 will be given with reference to FIGS. 22 and 23. Parts (a) in FIGS. 22 and 23 are evaluation results of depth profiles of elements of the first sample S01 and the second sample S02 by an EELS (Electron Energy-Loss Spectroscopy) method. Moreover, parts (b) in FIGS. 22 and 23 are respective cut-out views of parts of FIGS. 20A and 21A, and illustrate portions L1 and L2 where the above-described depth profiles were performed.

In parts (a) in FIGS. 22 and 23, the vertical axis represents a depth Dp and the horizontal axis represents an intensity Int (arbitrary unit) of detection of an element. The depth Dp corresponds to a distance in a Z axis direction, for example. Moreover, in parts (a) in FIGS. 22 and 23, boron (B) is indicated by a solid line, oxygen (O) is indicated by a dotted-and-dashed line, and iron (Fe) is indicated by a dotted line.

As shown in part (a) in FIG. 23, in the second sample S02, the intensity Int of boron in the cap layer 211 is higher than the intensity of boron in the magnetization free layer 210 (Co—Fe—B layer). Moreover, in the magnetization free layer 210, the intensity Int of boron in a portion on a cap layer 211 side is higher than the Intensity Int of boron in a central portion of the magnetization free layer 210. It is therefore conceivable that in the second sample S02 not including the diffusion prevention layer 216, boron diffuses into the cap layer 211 from the magnetization free layer 210, and a concentration of boron in the magnetization free layer 210 lowers.

On the other hand, as shown in part (a) in FIG. 22, in the first sample S01, a peak of boron occurs in the central portion of the magnetization free layer 210 (Co—Fe—B layer). Moreover, a boron content of the cap layer 211 is small. That is, a boron concentration of the magnetization free layer 210 (Co—Fe—B layer) maintains an initial state at a time of deposition, hardly diffusing at all to another layer. This is conceivably because the first sample S01 includes the diffusion prevention layer 216, and this diffusion prevention layer 236 has an effect of a diffusion barrier that suppresses diffusion of boron from the magnetization free layer 210.

Now, as described with reference to FIGS. 20 and 21, in the first sample S01 including the diffusion prevention layer 216, the magnetization free layer 210 included a portion in an amorphous state. This is conceivably because in the first sample S01, diffusion of boron which is an amorphizing promotion element was prevented by the diffusion prevention layer 216. On the other hand, in the second sample S02 not including the diffusion prevention layer 216, crystallization of the magnetization free layer 210 progressed. This is conceivably due to the fact that the second sample S02 does not include the diffusion prevention layer 216 and boron which is an amorphizing promotion element ends up diffusing comparatively easily.

Figure 24:
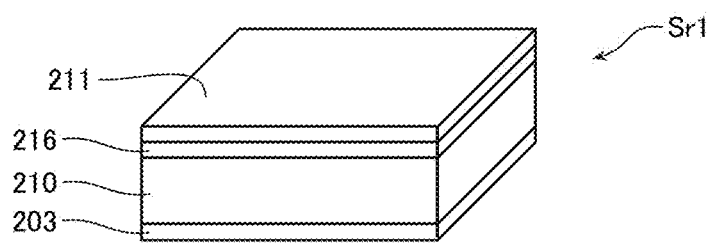
FIG. 24 is a schematic perspective view showing a configuration of an experiment sample of another experiment.
Figure 25:
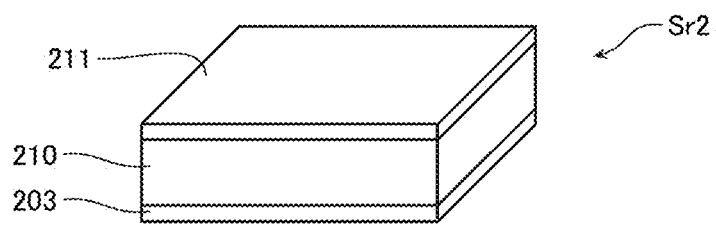
FIG. 25 is a schematic perspective view showing a configuration of another experiment sample of the same experiment.

Next, X-ray diffraction was employed to perform an evaluation of crystalline structure of the $Co_{40}Fe_{40}B_{20}$ layer. As shown in FIGS. 24 and 25, evaluation of crystalline structure was performed on a sample Sr1 that has a similar structure to part of the first sample S01 and a sample Sr2 that has a similar structure to part of the second sample S02.

FIG. 24 is a schematic perspective view showing a configuration of the sample Sr1. Similarly to the first sample S01, the sample Sr1 includes the diffusion prevention layer 216. That is, the sample Sr1 includes, stacked sequentially therein: the intermediate layer 203 configured from the Mg—O layer; the magnetization free layer 210 configured from the $Co_{40}Fe_{40}B_{20}$ layer; the diffusion prevention layer 216 configured from the Mg—O layer; and the cap layer 211 configured from Ta.

FIG. 25 is a schematic perspective view showing a configuration of the sample Sr2. Similarly to the second sample 302, the sample Sr2 does not include the diffusion prevention layer 216. That is, the sample Sr2 includes, stacked sequentially therein: the intermediate layer 203 configured from the Mg—O layer; the magnetization free layer 210 configured from the $Co_{40}Fe_{40}B_{20}$ layer; and the cap layer 211 configured from Ta.

Figure 26:
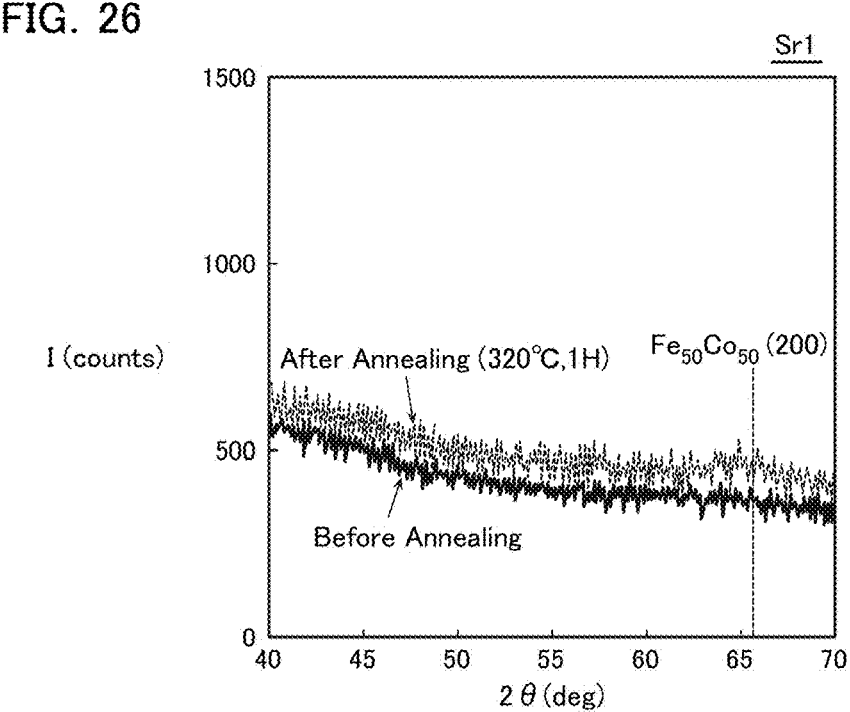
FIG. 26 is a graph showing a result of the same experiment.
Figure 27:
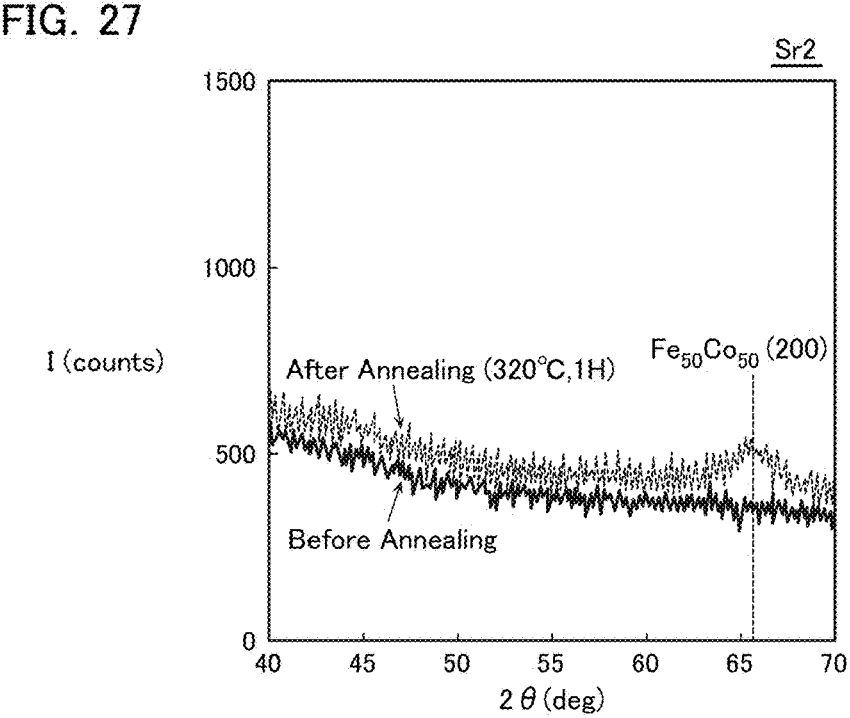
FIG. 27 is a graph showing another result of the same experiment.

Next, as shown in FIGS. 26 and 27, an evaluation by X-ray diffraction was performed on the magnetization free layer 210 of the sample Sr1 and the sample Sr2. During evaluation of crystalline structure, first, evaluation by X-ray diffraction was performed immediately after manufacturing of the sample Sr1 and the sample Sr2. Next, an annealing treatment for one hour at 320° C. was performed, and evaluation by X-ray diffraction was re-performed.

FIGS. 26 and 27 show results of evaluation by X-ray diffraction, of the magnetization free layer 210 of the sample Sr1 and the sample Sr2. The horizontal axis of these drawings is a rotation angle 2θ (°). The vertical axis is an intensity Int. Moreover, in the drawings, a result of evaluation before annealing treatment is indicated by a solid line, and a result of evaluation after annealing treatment is indicated by a dotted line.

As shown in FIG. 26, in the sample Sr1, an X-ray diffraction peak was not confirmed before or after annealing treatment. Therefore, the magnetization free layer 210 of the sample Sr1 including the diffusion prevention layer 216 was conceivably in an amorphous state both before and after annealing treatment.

On the other hand, as shown in FIG. 27, in the sample Sr2, an X-ray diffraction peak was not confirmed before annealing treatment, but a diffraction peak of $Co_{50}Fe_{50}$ was confirmed after annealing treatment. It is therefore conceivable that in the magnetization free layer 210 of the sample Sr2 not including the diffusion prevention layer 216, crystallization progressed due to the annealing treatment.

Next, as shown in FIGS. 28 to 31, a further investigation was performed regarding crystallinity of the magnetization free layer 210 and magnetic characteristics of the magnetization free layer 210. In the present investigation, a third sample S03 shown in FIG. 28 was newly produced in addition to the first sample S01 (FIG. 12) and the second sample S02 (FIG. 1.3), and magnetic characteristics of these three samples were measured. Evaluation (M-H measurement) of magnetic characteristics was performed by a loop tracer employing a magnetic field sweep of 50 Hz.

Figure 28:
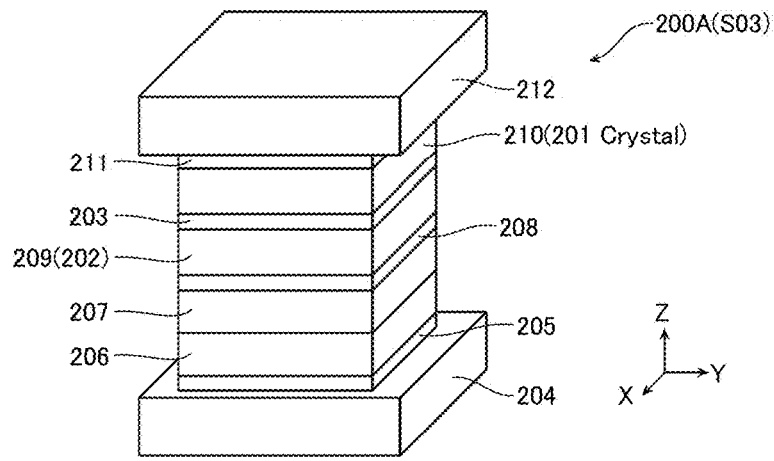
FIG. 28 is a schematic perspective view showing a configuration of an experiment sample of another experiment.

As shown in FIG. 28, the third sample S03 is configured substantially similarly to the second sample S02, but in the third sample S03, $Fe_{50}Co_{50}$ (thickness 4 nm) is used in the magnetization free layer 210. That is, the third sample S03 does not Include an amorphizing promotion element (for example, boron) in the magnetization free layer 210.

Figure 29:
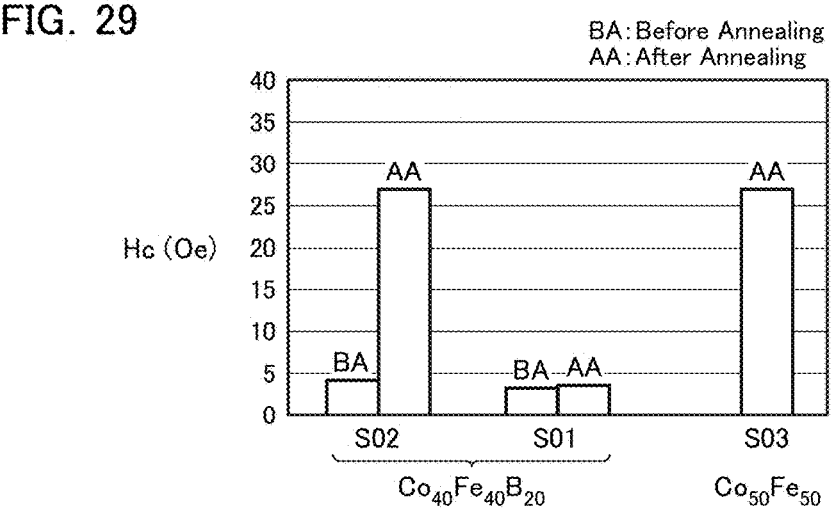
FIG. 29 is a graph showing a result of the same experiment.

FIGS. 29 and 30 are graphs showing coercivity Hc and the magnetostriction constant λ of the magnetization free layer 210 of the first sample S01, the second sample S02, and the third sample S03. Note that in the drawings, values before and after annealing treatment are shown for the first sample S01 and the second sample S02, and a value after annealing treatment is shown for the third sample S03.

As shown in FIG. 29, before annealing treatment, coercivities Hc of the first sample S01 and the second sample S02 are each about 3 to 4 Oe. In contrast, after annealing treatment, whereas the first sample S01 had coercivity Hc of about 4 Oe and showed good soft magnetic characteristics, coercivity Hc of the second sample S02 and the third sample S03 increased to 27 Oe. This is conceivably because whereas in the first sample S01, the magnetization free layer 210 maintains an amorphous state, in the second sample S02 and the third sample S03, crystallization of the magnetization free layer 210 has progressed.

As shown in FIG. 30, before annealing treatment, the magnetostriction constants λ of the first sample S01 and the second sample S02 are each about 20 ppm. After annealing treatment, the magnetostriction constant λ of the first sample SOI is about 22 ppm and has substantively maintained a value before annealing treatment. In contrast, the magnetostriction constants λ of the second sample S02 and the third sample S03 have increased to 30 to 35 ppm.

Figure 31:
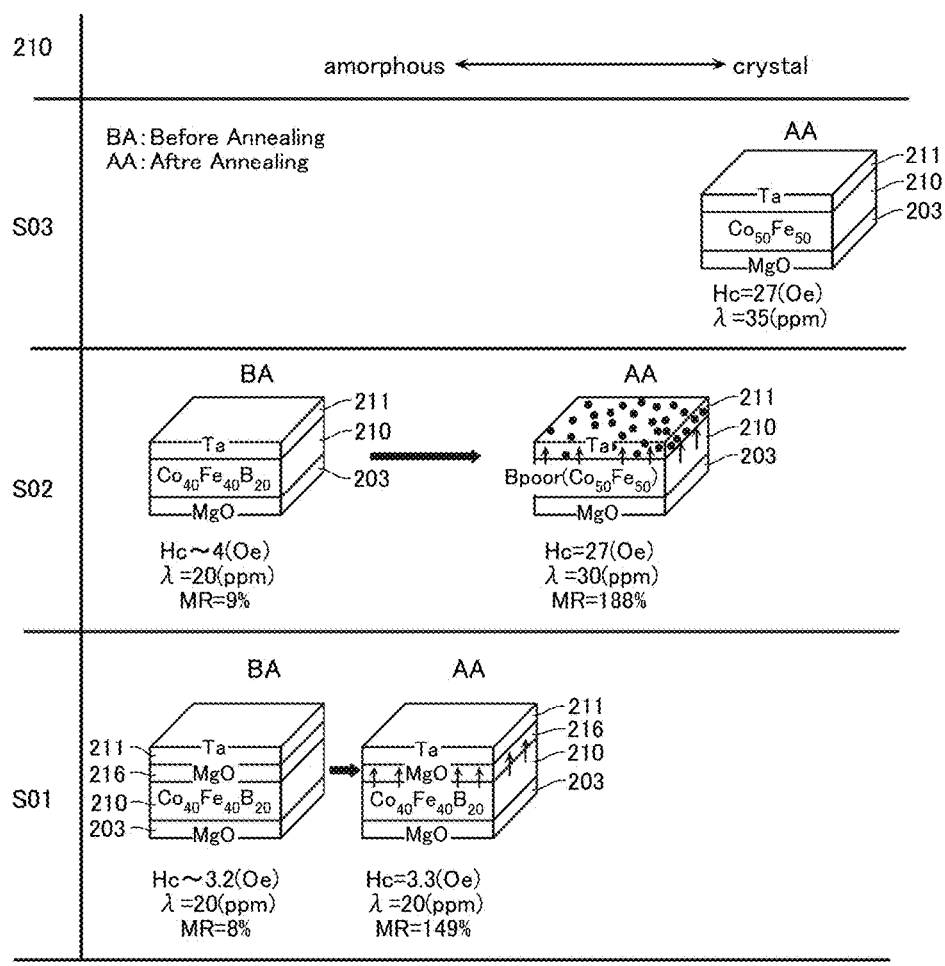
FIG. 31 is a schematic view showing another result of the same experiment.

FIG. 31 is a schematic view showing a crystalline state of the magnetization free layer 210 in the first sample S01, the second sample S02, and the third sample S03, and magnetic characteristics in each state.

As shown in FIG. 31, the third sample S03 has its magnetization free layer 210 configured from $Co_{50}Fe_{50}$ and does not include boron which is an amorphizing promotion element. It is therefore conceivable that the magnetization free layer 210 in the third sample S03 is substantially in a crystalline state. Note that the magnetization free layer 210 in the third sample S03 has a coercivity Hc of 27 (Oe) and a magnetostriction constant λ of 35 ppm.

As shown in FIG. 31, the magnetization free layer 210 of the second sample S02 is conceivably in an amorphous state before annealing treatment. The magnetization free layer 210 of the second sample S02 before annealing treatment has a coercivity Hc of 4 (Oe), a magnetostriction constant λ of 20 ppm, and an MR ratio of 9%.

Moreover, as shown in FIG. 31, the second sample S02, although having its magnetization free layer 210 configured from $Co_{40}Fe_{40}B_{20}$, does not include the diffusion prevention layer 216. It is therefore conceivable that in the annealing treatment, it is comparatively easy for boron which is an amorphizing promotion element to diffuse from the magnetization free layer 210 and it is comparatively easy for crystallization of the magnetization free layer 210 to progress. Note that the magnetization free layer 210 in the second sample S02 after annealing treatment has a coercivity Hc of 27 (Oe), a magnetostriction constant λ of 30 ppm, and an MR ratio of 188%.

As shown in FIG. 31, the magnetization free layer 210 of the first sample S01 is conceivably in an amorphous state before annealing treatment. The magnetization free layer 210 of the first sample S01 before annealing treatment has a coercivity Hc of 3.2 (Oe), a magnetostriction constant λ of 20 ppm, and an MR ratio of 8%.

Moreover, as shown in FIG. 31, the first sample S01 has its magnetization free layer 210 configured from $Co_4Fe_{40}B_{20}$ and includes the diffusion prevention layer 216. It is therefore conceivable that in the annealing treatment, it is comparatively difficult for boron to diffuse from the magnetization free layer 210, it is comparatively difficult for crystallization of the magnetization free layer 210 to progress, and the magnetization free layer 210 is maintained in an amorphous state. Note that the magnetization free layer 210 in the first sample S01 after annealing treatment has a coercivity Hc of 3.3 (Oe), a magnetostriction constant λ of 22 ppm, and an MR ratio of 149%.

Figure 32:
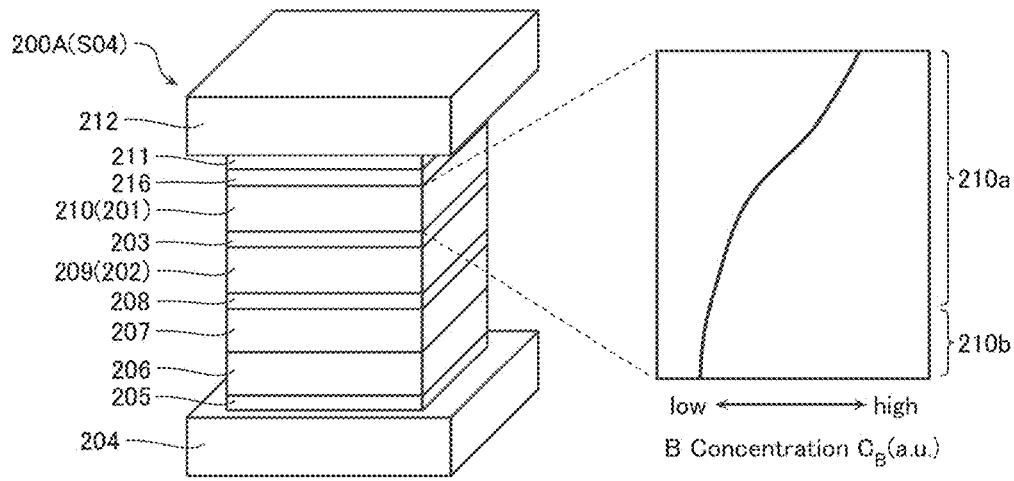
FIG. 32 is a schematic perspective view showing a configuration of an experiment sample of another experiment.
Figure 33:
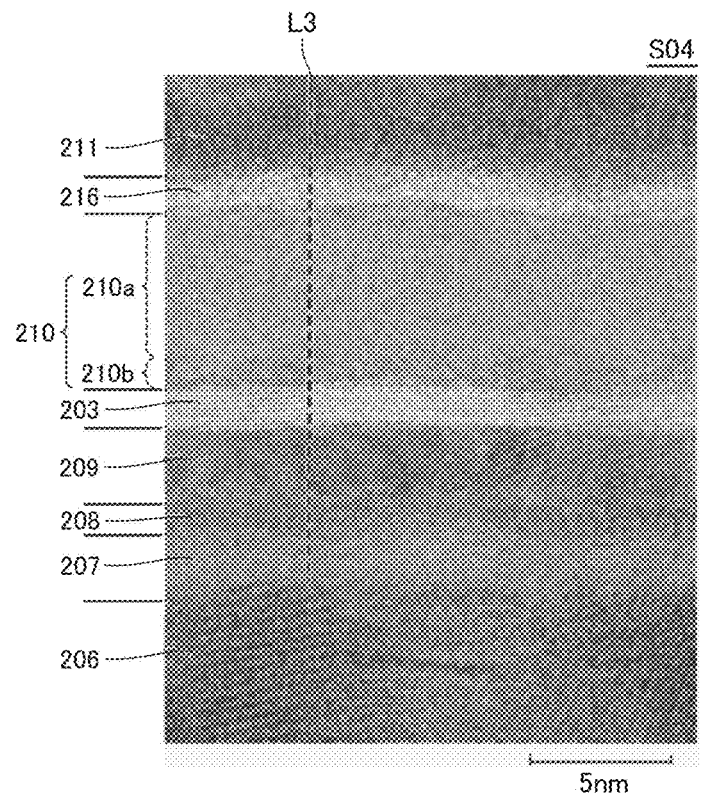
FIG. 33 is a view showing a result of the same experiment.
Figure 34:
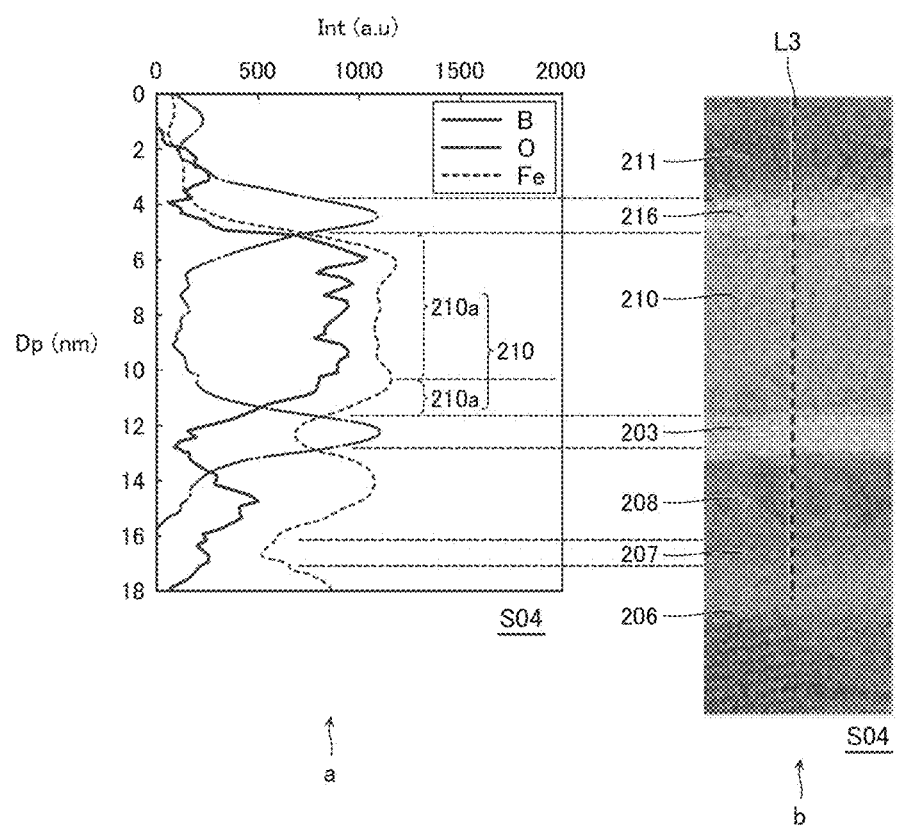
FIG. 34 is a graph showing another result of the same experiment.

Next, as shown in FIGS. 32 to 34, a fourth sample S04 was produced, and an evaluation of magnetic characteristics thereof was performed. The left drawing of FIG. 32 is schematic perspective view showing a configuration of the fourth sample 304. Moreover, the right drawing of FIG. 32 is a graph showing boron concentration $C_B$ in the magnetization free layer 210.

The fourth sample S04 is configured substantially similarly to the first sample S01, but has a configuration of the magnetization free layer 210 that differs. That is, in the fourth sample S04, the boron concentration $C_B$ in the magnetization free layer 210 is set higher the closer the diffusion prevention layer 216 is approached, and lower the closer the intermediate layer 203 is approached. Such a configuration can be achieved by, for example, configuring the magnetization free layer 210 from a first portion 210b contacting the intermediate layer 203 and having a low boron concentration $C_B$, and a second portion 210a provided between this first portion 210b and the diffusion prevention layer 216 and having a high boron concentration $C_B$. The first portion 210b can be formed from $Co_{50}Fe_{50}$ of 0.5 nm, for example. Moreover, the second portion 210a can be formed from $Co_{40}Fe_{40}B_{20}$ of 8 nm, for example.

The above-described first portion 210b has a boron concentration $C_B$ which is low. It is therefore conceivable that crystallization progresses due to the annealing treatment. Now, the MR ratio becomes larger when a portion close to the intermediate layer 203 (a portion approximately about 0.5 nm from an upper surface of the intermediate layer 203) of the magnetization free layer 210 is in a crystalline state. It is therefore conceivable that a configuration like that of the fourth sample S04 enables a high MR ratio to be secured.

Moreover, the above-described second portion 210a has a boron concentration $C_B$ which is high, and the fourth sample S04 includes the diffusion prevention layer 216. It is therefore conceivable that the second portion 210a maintains an amorphous state even after annealing treatment, and secures a low coercivity Hc. Now, regarding magnetic characteristics such as magnetostriction constant or coercivity in the case that the magnetization free layer 210 is a stacked film, for example, distinctive features of the thickest layer are most strongly reflected, according to thicknesses of each of the layers included in the stacked film. This is because a stacked body of magnetic materials included in the magnetization free layer undergoes exchange coupling, whereby magnetic characteristics are averaged. It is therefore conceivable that a configuration like that of the fourth sample S04 makes it possible to lower coercivity Hc while maintaining a high MR ratio, and makes it possible to manufacture a strain detection element having a high gauge factor.

Note that in the fourth sample S04, a film thickness of the first portion 210b is desirably set sufficiently smaller than a film thickness of the second portion 210a. This makes it easier to obtain a small coercivity Hc, for example. Thickness of the first portion 210b is, for example, ⅓ or less of thickness of the second portion 210a.

In addition, information relating to distribution of boron concentration $C_B$ such as shown in the right drawing of FIG. 32 is obtained by, for example, a means such as SIMS (Secondary Ion Mass Spectrometry) analysis, or a combination of cross-sectional TEM and EELS, EELS analysis, and three-dimensional atom probe analysis.

Next, as shown in FIGS. 33 and 34, observation by a transmission electron microscope (TEM) was performed on the fourth sample S04. FIG. 33 is a cross-sectional transmission electron microscope (cross-sectional TEM) photographic image of the fourth sample S04. As shown in FIG. 33, a stacked structure from the pinning layer 206 to the cap layer 211 is photographed in the drawings.

Next, a description of composition of the fourth sample S04 will be given with reference to FIG. 34. Part (a) in FIG. 34 is an evaluation result of a depth profile of elements of the fourth sample S04 by an EELS (Electron Energy-Loss Spectroscopy) method. Moreover, part (b) in FIG. 34 is a cut-out view of part of FIG. 33, and illustrates a portion L3 where the above-described depth profile was performed.

In part (a) in FIG. 34, the vertical axis represents a depth Dp and the horizontal axis represents an intensity Int (arbitrary unit; of detection of an element. The depth Dp corresponds to a distance in a Z axis direction, for example. Moreover, in part (a) in FIG. 34, boron (B) Is indicated by a solid line, oxygen (O) is indicated by a dotted-and-dashed line, and iron (Fe) is indicated by a dotted line.

As shown in part (a) in FIG. 34, in the fourth sample S04, boron B stays suitably within a range of the magnetization free layer 210, without diffusing to another layer. Moreover, an EELS intensity of boron in the first portion 210b is clearly lower than an EELS intensity of boron in the second portion 210a.

Note that when the MR ratio of the fourth sample S04 was measured, it was 187% which was higher than that of the first sample S01 (whose MR ratio was 149%). This is conceivably due to the fact that the first portion 210b which has crystallinity is provided close to the intermediate layer 203.

Moreover, when coercivity Hc and the magnetostriction constant λ of the fourth sample S04 were measured, coercivity Hc was 3.8 Oe and the magnetostriction constant λ was 20 ppm which were both substantially equal to those of the first sample S01 (whose coercivity Hc was 3.3 Oe and whose magnetostriction constant λ was 20 ppm). This is conceivably due to the fact that coercivity Hc and the magnetostriction constant λ are given by the sum of characteristics of the first portion 210b and the second portion 210a, and that in the fourth sample S04, the second portion 210a having an amorphous structure is sufficiently thick compared to the first portion 210b having a crystalline structure.

Figure 35:
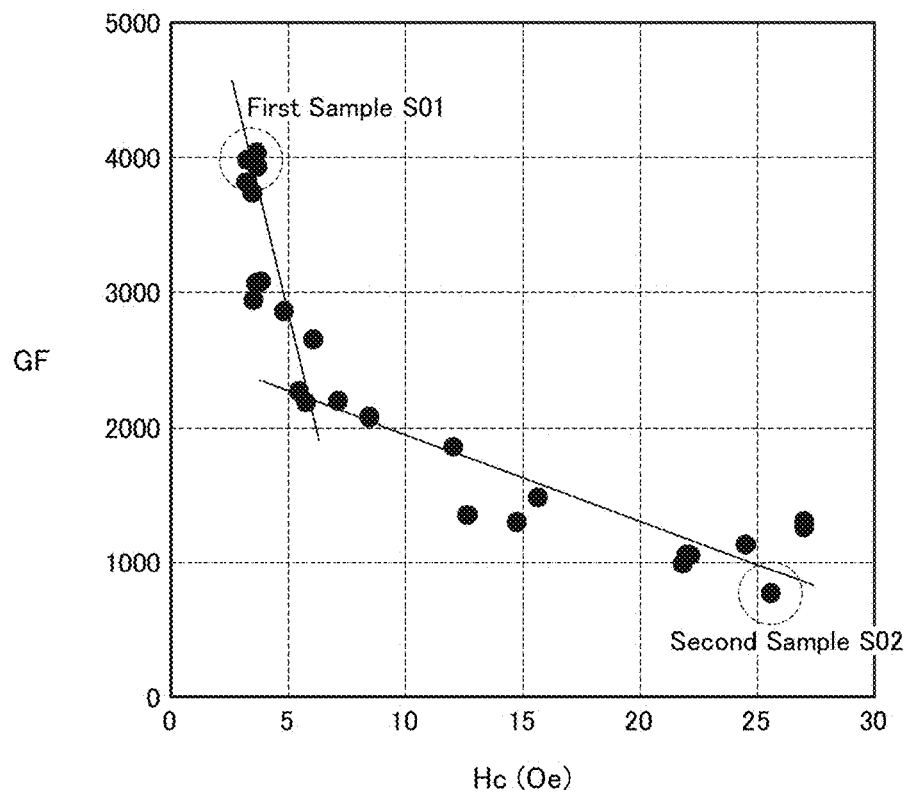
FIG. 35 is a graph showing another result of the same experiment.

Next, as shown in FIG. 35, a plurality of samples having different coercivities Hc were produced by changing the configurations of the magnetization free layer 210 or the diffusion prevention layer 216, and a relationship between coercivity Hc and gauge factor GF in these samples was investigated. In FIG. 35, the horizontal axis represents coercivity Hc and the vertical axis represents the gauge factor GF. Regarding evaluation of coercivity in a result shown in FIG. 35, M-H measurement was performed by a loop tracer employing a magnetic field sweep of 50 Hz.

As shown in FIG. 35, it is found that the lower the coercivity Hc, the higher the gauge factor GF obtained. Moreover, it is found that when coercivity Hc becomes 5 Oe or less, the gauge factor GF increases steeply. Therefore, in order to manufacture a strain detection element having a high gauge factor GF, coercivity Hc of the magnetization free layer 210 is preferably set to 5 Oe or less. Note that coercivity of the magnetization free layer 210 attains a different value according to a magnetic field sweep speed of M-H measurement and attains a lower value the slower the magnetic field sweep speed. For example, in the case of coercivity obtained when evaluating at a magnetic field sweep speed of 40 (Oe/min) by the likes of a Vibrating Sample Magnetometer (VSM), when Hc becomes 4 Oe or less, the gauge factor GF increases steeply. When M-H measurement is made in a range of magnetic field sweep speed of 10 to 100 (Oe/min), coercivity is preferably set to 4 Oe or less in order to set a particularly high gauge factor GF.

[1-3. Investigation of Relationship Between Unevenness of Upper Surface of Lower Electrode and Magnetic Characteristics of Magnetization Free Layer]

Thus far, results of an experiment showing the relationship between crystalline structure and magnetic characteristics of the magnetization free layer 210 were described with reference to FIGS. 10 to 35. From here, results of an experiment showing a relationship between unevenness of the upper surface of the lower electrode 204 and magnetic characteristics of the magnetization free layer 210 will be described with reference to FIGS. 36 to 48.

Figure 36:
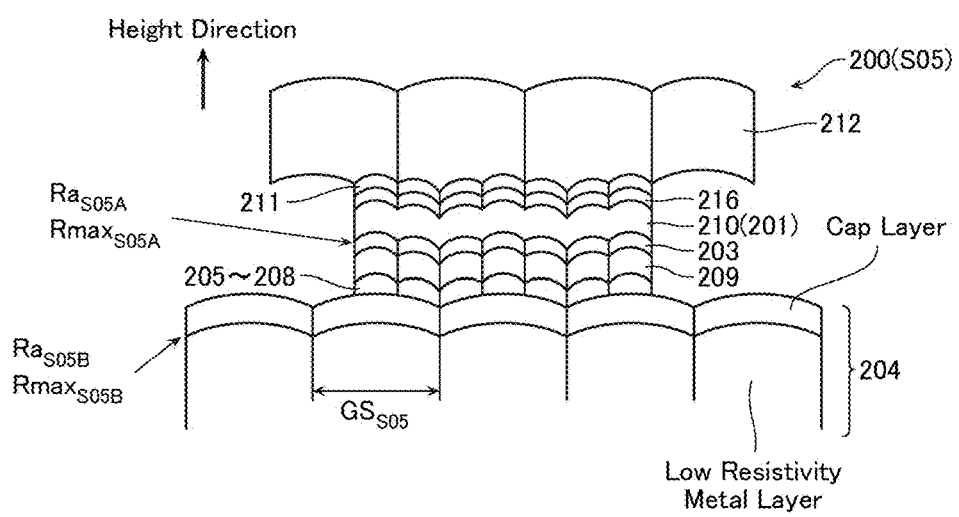
FIG. 36 is a schematic side view showing a configuration of an experiment sample of another experiment.
Figure 37:
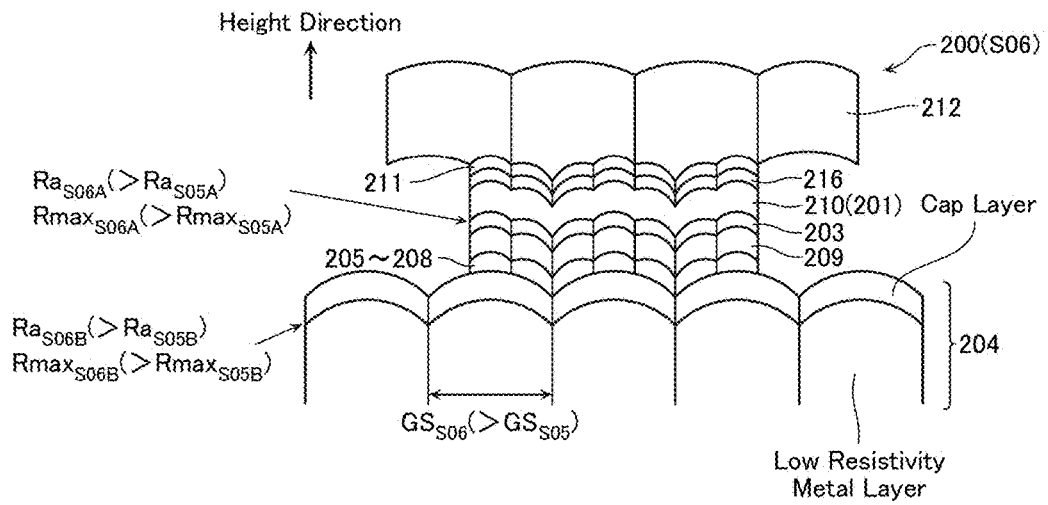
FIG. 37 is a schematic side view showing a configuration of another experiment sample of the same experiment.
Figure 38:
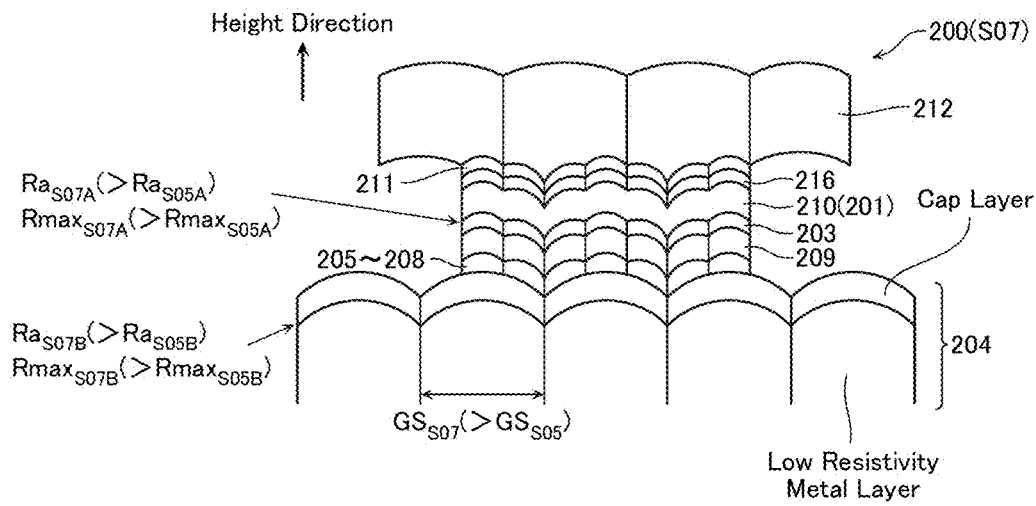
FIG. 38 is a schematic side view showing a configuration of another experiment sample of the same experiment.

First, a description of a fifth sample S05, a sixth sample S06, and a seventh sample S07 used in the present experiment will be given with reference to FIGS. 36 to 38. FIG. 36 is a schematic cross-sectional view showing a configuration of the fifth sample S05. FIG. 37 is a schematic cross-sectional view showing a configuration of the sixth sample S06. FIG. 38 is a schematic cross-sectional view showing a configuration of the seventh sample S07.

The fifth sample 305, the sixth sample S06, and the seventh sample S07 are configured similarly to the first sample S01 shown in FIG. 12, but have mutually different materials included in their lower electrodes 204 and mutually different production processes, and have different unevenness of their upper surfaces. As a result, unevenness of the interface between the first magnetic layer 201 and the intermediate layer 203 of the stacked body formed on the lower electrode 204 is also different.

That is, the lower electrode 204 of the fifth sample S05 is configured from Ta (5 nm)/Cu$_{95}$Ag$_5$ (240 nm)/Ta (50 nm). Moreover, in the fifth sample S05, CMP processing is performed after deposition of the lower electrode 204. On the other hand, the lower electrode 204 of the sixth sample S06 is configured from Ta (5 nm)/Cu (240 nm)/Ta (50 nm). Moreover, in the sixth sample S06, CMP processing is performed after deposition of the lower electrode 204. Furthermore, the lower electrode 204 of the seventh sample S07 is configured from Ta (5 nm)/Cu (240 nm)/Ta (50 nm). Moreover, in the seventh sample S07, surface smoothing processing by Ar ion irradiation is performed without CMP processing being performed, after deposition of the lower electrode 204.

After deposition of the stacked body, the fifth sample S05, the sixth sample S06, and the seventh sample S07 underwent annealing for 1 hour at 320° C. in a magnetic field of 6500 Oe, and then underwent element processing. In addition, the fifth sample S05, the sixth sample S06, and the seventh sample S07 underwent magnetic characteristics/MR evaluation (by CIPT) in a state of a continuous film that has not undergone element processing. The sample of the continuous film also underwent magnetic characteristics/MR evaluation in the case that in addition to 1 hour at 320° C., a low temperature annealing and high temperature annealing were performed immediately after deposition. Now, evaluation of magnetic characteristics was evaluated at a magnetic field sweep speed of 40 (Oe/min) employing VSM.

Figure 39:
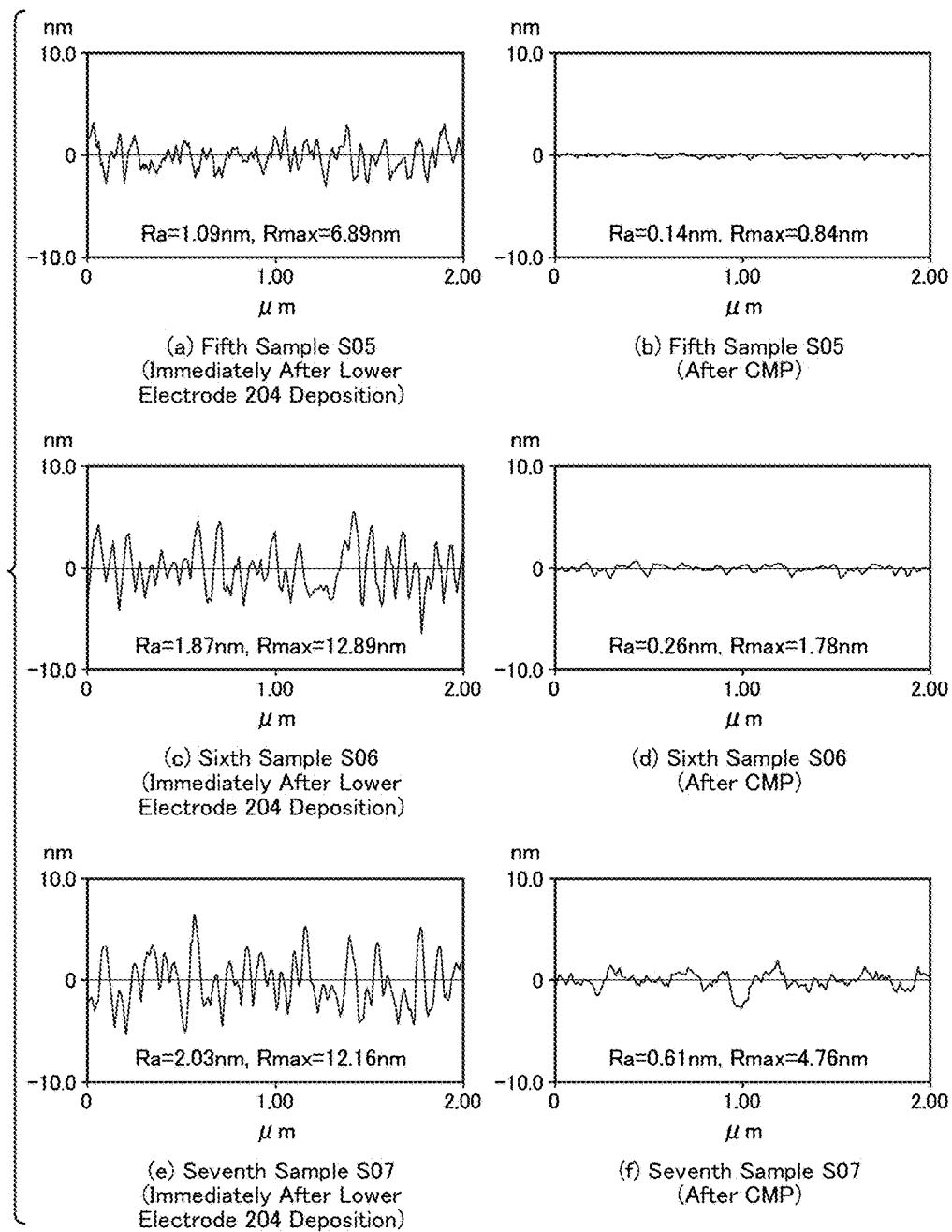
FIG. 39 is a graph showing a result of the same experiment.

Next, as shown in FIG. 39, surface unevenness of the lower electrode 204 of the fifth sample S05, the sixth sample S06, and the seventh sample S07 was evaluated by an atomic force microscope (AFM). FIG. 39 includes graphs showing a height before/after smoothing processing of the upper surface of the lower electrode 204 in the fifth sample S05, the sixth sample S06, and the seventh sample S07. Note that in parts (a) to (f) in FIG. 39, the horizontal axis represents a position in the upper surface of the lower electrode 204, and the vertical axis represents the height of the upper surface of the lower electrode 204.

Part (a) in FIG. 39 is a graph showing the height immediately after deposition of the lower electrode 204 of the fifth sample S05. Immediately after deposition, the upper surface of the lower electrode 204 of the fifth sample S05 had an Ra value of 1.09 nm and an Rmax value of 6.89 nm. Moreover, part (b) in FIG. 39 is a graph showing the height after smoothing processing of the lower electrode 204 of the fifth sample S0S. After smoothing processing, the upper surface of the lower electrode 204 of the fifth sample S05 had an Ra value of 0.14 nm and an Rmax value of 0.84 nm. Therefore, the Pa value and the Rmax value of the lower electrode 204 of the fifth sample S05 are found to have been suitably lowered by CMP processing.

Part (c) in FIG. 39 is a graph showing the height immediately after deposition of the lower electrode 204 of the sixth sample S06. Immediately after deposition, the upper surface of the lower electrode 204 of the sixth sample S06 had an Ra value of 1.87 nm and an Rmax value of 12.89 nm. Therefore, the Ra value and the Rmax value were found to be capable of being lowered more in the case where a Cu—Ag alloy was employed in the lower electrode 204, compared to in the case where Cu was employed in the lower electrode 204. Moreover, part (d) in FIG. 39 is a graph showing the height after smoothing processing of the lower electrode 204 of the sixth sample S06. After smoothing processing, the upper surface of the lower electrode 204 of the sixth sample S06 had an Ra value of 0.26 nm and an Rmax value of 1.78 nm. Therefore, the Ra value and the Rmax value of the lower electrode 204 of the sixth sample S06 are found to have been lowered by CMP processing.

Part (e) in FIG. 39 is a graph showing the height immediately after deposition of the lower electrode 204 of the seventh sample S07. Immediately after deposition, the upper surface of the lower electrode 204 of the seventh sample S07 had an Ra value of 2.03 nm and an Rmax value of 12.16 nm. Therefore, the Ra value was found to be capable of being lowered more in the case where a Cu—Ag alloy was employed in the lower electrode 204, compared to in the case where Cu was employed in the lower electrode 204. Moreover, FIG. 39(f) is a graph showing the height after smoothing processing of the lower electrode 204 of the seventh sample S07. After smoothing processing, the upper surface of the lower electrode 204 of the seventh sample S07 had an Ra value of 0.61 nm and an Rmax value of 4.76 nm. Therefore, the Pa value and the Rmax value of the lower electrode 204 of the seventh sample S07 are found to have been lowered by surface smoothing processing by Ar ion irradiation.

Figure 40:
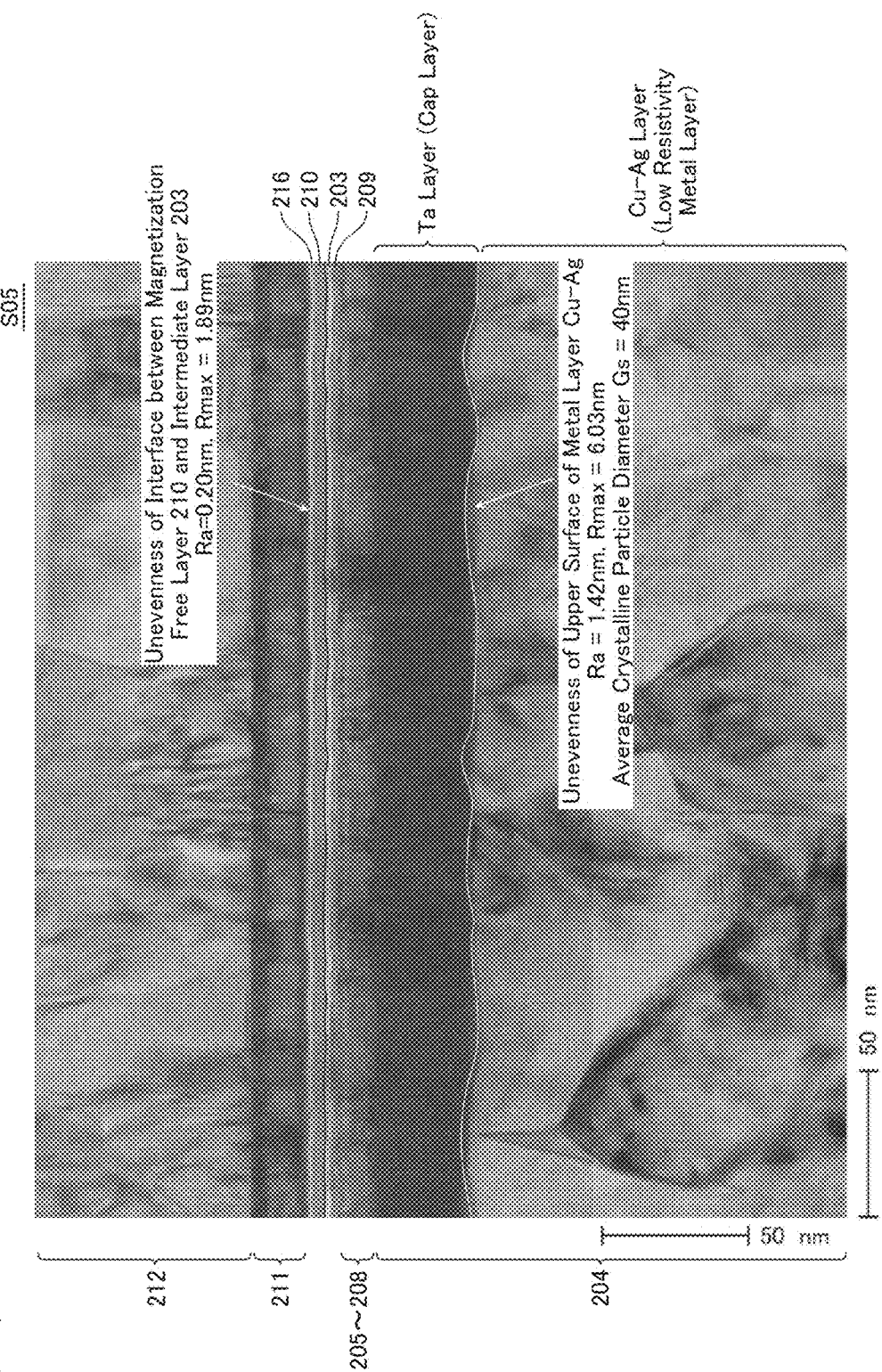
FIG. 40 is a view showing another result of the same experiment.
Figure 41:
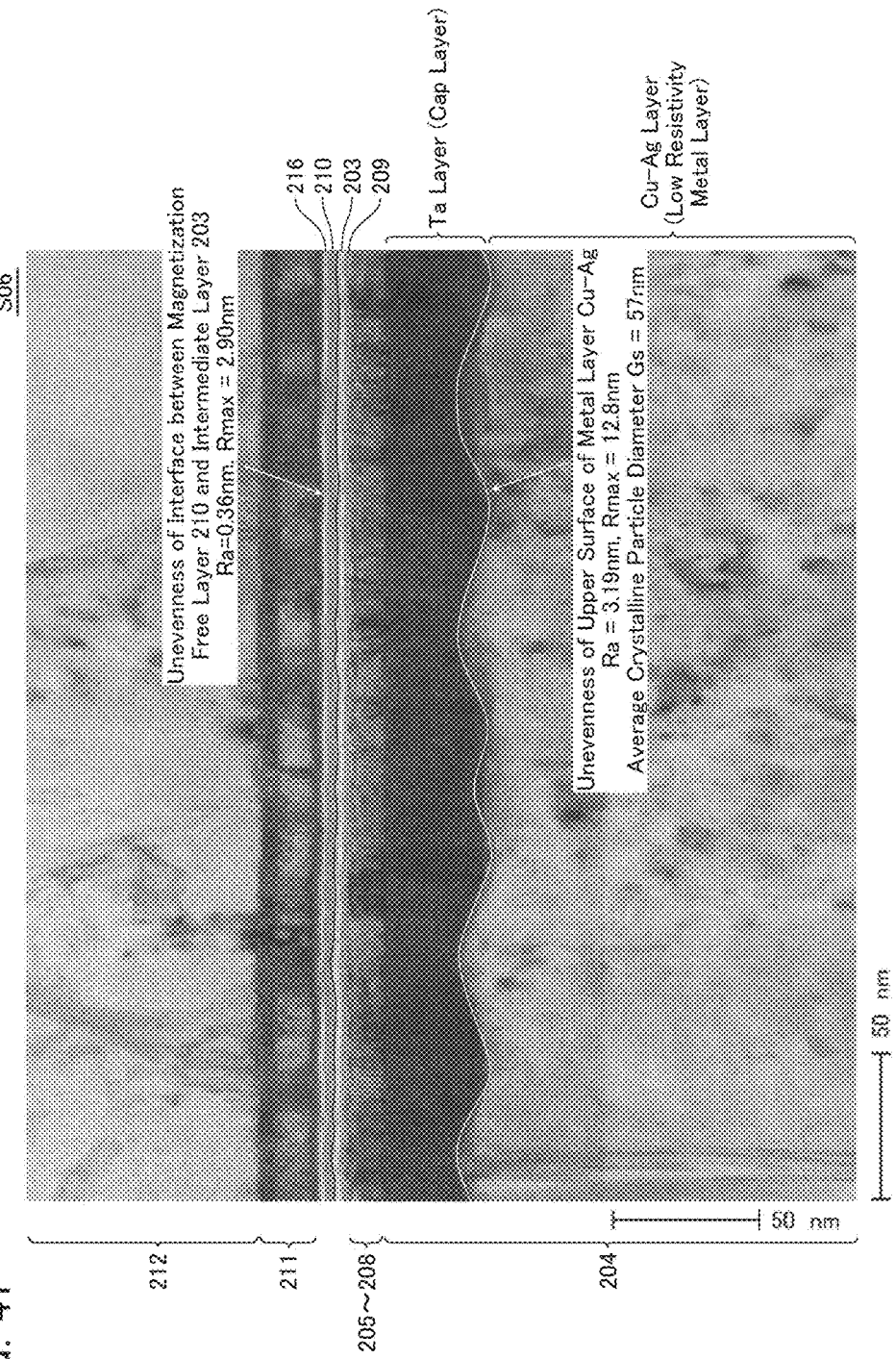
FIG. 41 is a view showing another result of the same experiment.
Figure 42:
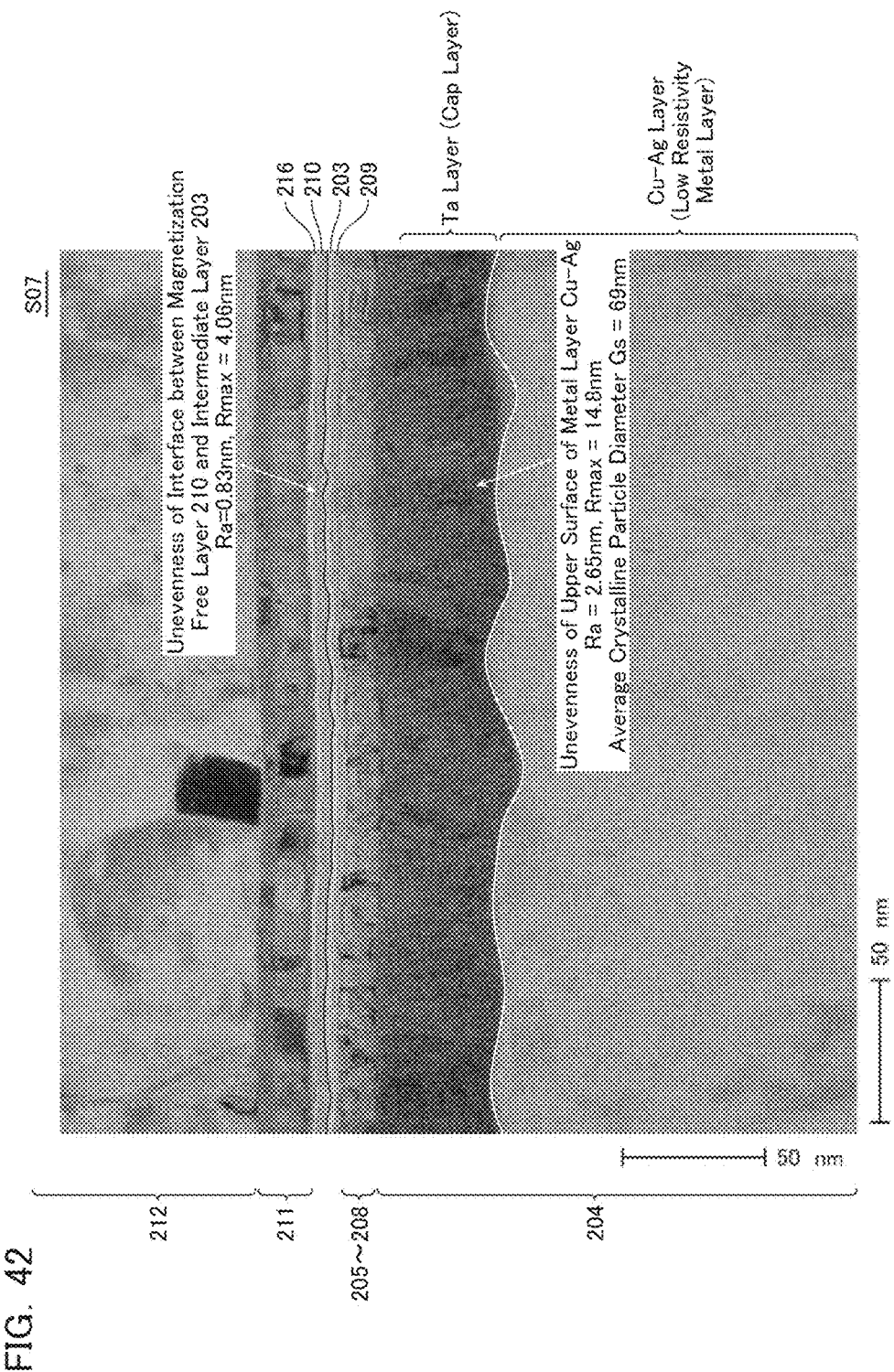
FIG. 42 is a view showing another result of the same experiment.

Next, as shown in FIGS. 40, 41, and 42, surface unevenness of the lower electrode 204 and the stacked body of the fifth sample S05, the sixth sample S06, and the seventh sample S07 was photographed by a transmission electron microscope.

As shown in FIG. 40, an interface unevenness between the first magnetic layer 201 and the intermediate layer 203 of the fifth sample S05 had an Ra value of 0.20 nm and an Rmax value of 1.89 nm. Moreover, as shown in FIG. 40, an interface unevenness of a Cu—Ag layer formed as a low resistivity metal layer and including at least one element selected from the group consisting of aluminum (Al), copper (Cu), silver (Ag), gold (Au), nickel (Ni), iron (Fe), and cobalt (Co), included in the lower electrode 204 of the fifth sample S05 had an Ra value of 1.42 nm and an Rmax value of 6.03 nm. Furthermore, as shown in FIG. 40, a crystal grain size Gs of the Cu—Ag layer formed as the low resistivity metal layer and included in the lower electrode 204 of the fifth sample S05 was 40 nm.

As shown in FIG. 41, an interface unevenness between the first magnetic layer 201 and the intermediate layer 203 of the sixth sample S06 had an Ra value of 0.36 nm and an Rmax value of 2.90 nm. Moreover, as shown in FIG. 41, an interface unevenness of a Cu layer formed as a low resistivity metal layer and including at least one element selected from the group consisting of aluminum (Al), copper (Cu), silver (Ag), gold (Au), nickel (Ni), iron (Fe), and cobalt (Co), included in the lower electrode 204 of the sixth sample S06 had an Pa value of 3.19 nm and an Rmax value of 12.8 nm. Furthermore, as shown in FIG. 41, a crystal grain size Gs of the Cu layer formed as the low resistivity metal layer and included in the lower electrode 204 of the sixth sample S06 was 57 nm.

As shown in FIG. 42, an interface unevenness between the first magnetic layer 201 and the intermediate layer 203 of the seventh sample S07 had an Ra value of 0.83 nm and an Rmax value of 4.06 nm. Moreover, as shown in FIG. 42, an interface unevenness of a Cu layer formed as a low resistivity metal layer and including at least one element selected from the group consisting of aluminum (Al), copper (Cu), silver (Ag), gold (Au), nickel (Ni), iron (Fe), and cobalt (Co), included in the lower electrode 204 of the seventh sample S07 had an Ra value of 2.65 nm and an Rmax value of 14.8 nm. Furthermore, as shown in FIG. 42, a crystal grain size Gs of the Cu layer formed as the low resistivity metal layer and included in the lower electrode 204 of the seventh sample S07 was 69 nm.

Next, an evaluation of magnetic characteristics was performed on the fifth sample S05, the sixth sample S06, and the seventh sample S07, in a state of a continuous film that has not undergone element processing. Now, evaluation of magnetic characteristics was evaluated at a magnetic field sweep speed of 40 (Oe/min) employing VSM. As a result, coercivity of the fifth sample S05 was 3.2 Oe, coercivity of the sixth sample S06 was 4.5 Oe, and coercivity of the seventh sample S07 was 5.0 Oe. For each of the fifth sample S05, the sixth sample S06, and the seventh sample S07, cross-sectional TEM analysis was performed on a plurality of samples, and a relationship between unevenness and coercivity was analyzed.

Figure 43A:
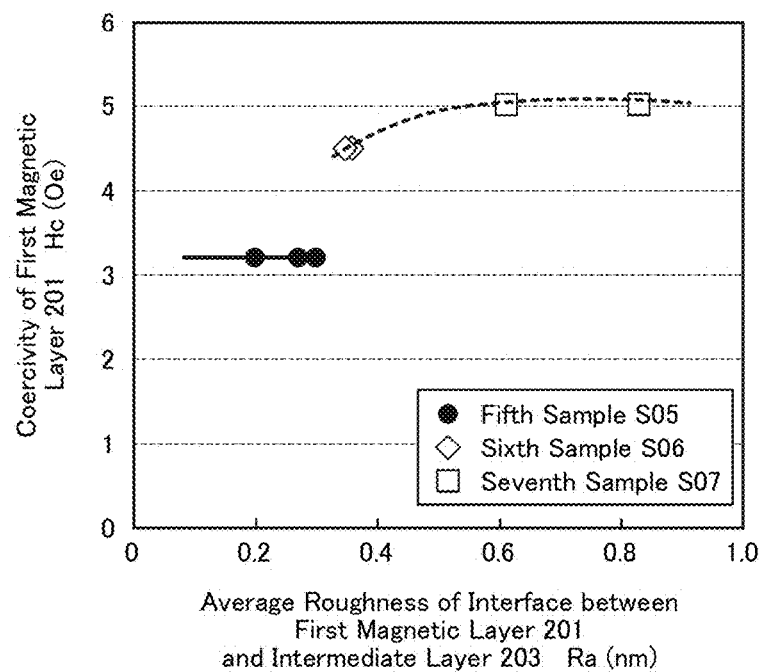
FIGS. 43A-43B are graphs showing another result of the same experiment.
Figure 43B:
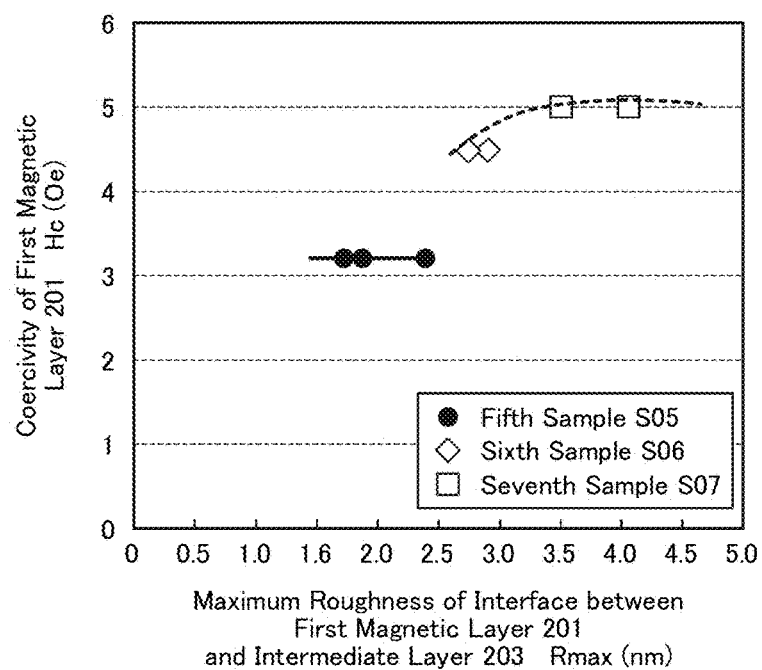

First, a result for a relationship between unevenness of the interface between the first magnetic layer 201 and the intermediate layer 203 and coercivity Hc of the first magnetic layer 201, is shown with reference to FIG. 43. FIG. 43A is a graph showing a relationship between average roughness Ra and coercivity He, and FIG. 43B is a graph showing a relationship between maximum roughness Rmax and coercivity Hc. As shown in FIG. 43A, it was found that when average roughness Ra of the interface between the first magnetic layer 201 and the intermediate layer 203 is 0.3 nm or less, a low coercivity He of 4 Oe or less can be achieved. Moreover, as shown in FIG. 43B, it was found that when maximum roughness Rmax of the interface between the first magnetic layer 201 and the intermediate layer 203 is 2.5 nm or less, a low coercivity He of 4 Oe or less can be achieved. Achieving a low coercivity Hc of 4 Oe or less makes it possible to achieve a high gauge factor GF as will be mentioned later.

Figure 44A:
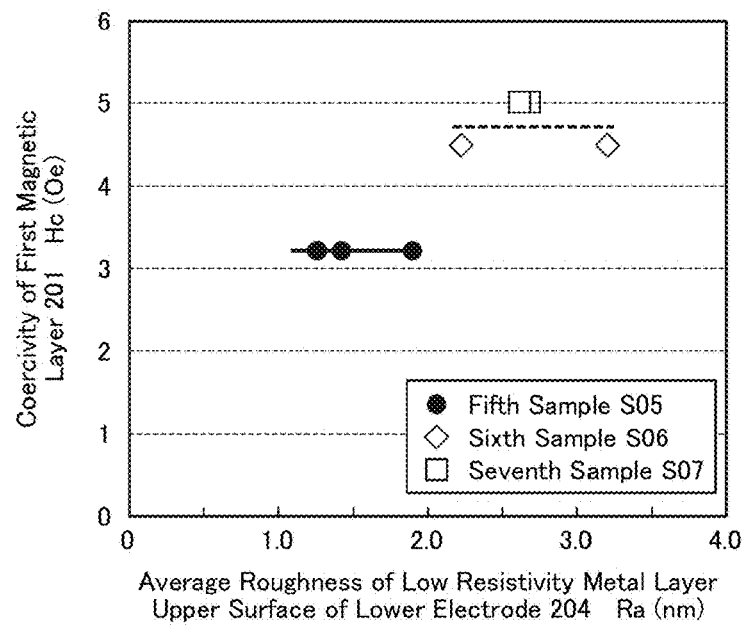
FIGS. 44A-44B are graphs showing another result of the same experiment.
Figure 44B:
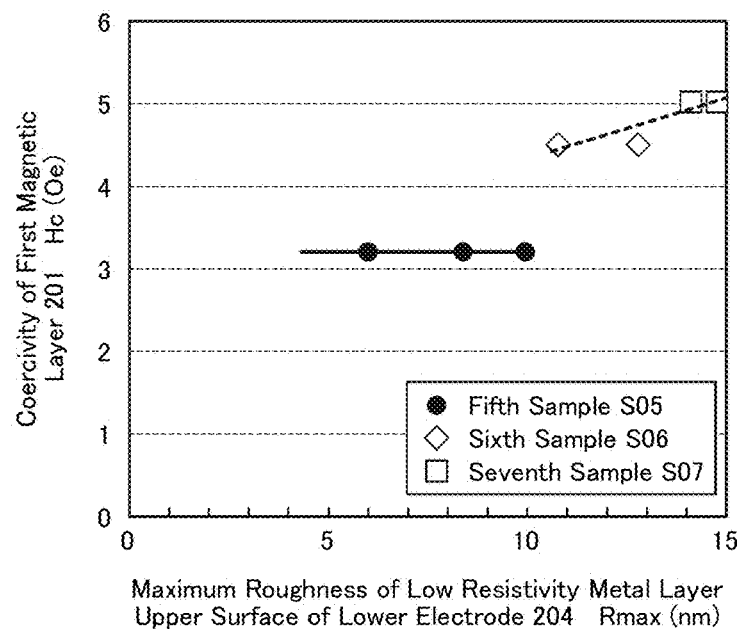

Next, a result for a relationship between unevenness of the upper surface of the low resistivity metal layer including at least one element selected from the group consisting of aluminum (Al), copper (Cu), silver (Ag), gold (Au), nickel (Ni), iron (Fe), and cobalt (Co), included in the lower electrode 204, and coercivity Hc of the first magnetic layer 201, is shown with reference to FIG. 44. FIG. 44A is a graph showing a relationship between average roughness Ra and coercivity He, and FIG. 43B is a graph showing a relationship between maximum roughness Rmax and coercivity Hc. As shown in FIG. 44A, it was found that when average roughness Ra of the upper surface of the low resistivity metal layer is 2 nm or less, a low coercivity Hc of 4 Oe or less can be achieved. Moreover, as shown in FIG. 44E, it was found that when maximum roughness Rmax of the upper surface of the low resistivity metal layer is 10 nm or less, a low coercivity Hc of 4 Oe or less can be achieved. Achieving a low coercivity Hc of 4 Oe or less makes it possible to achieve a high gauge factor GF as will be mentioned later.

Figure 45:
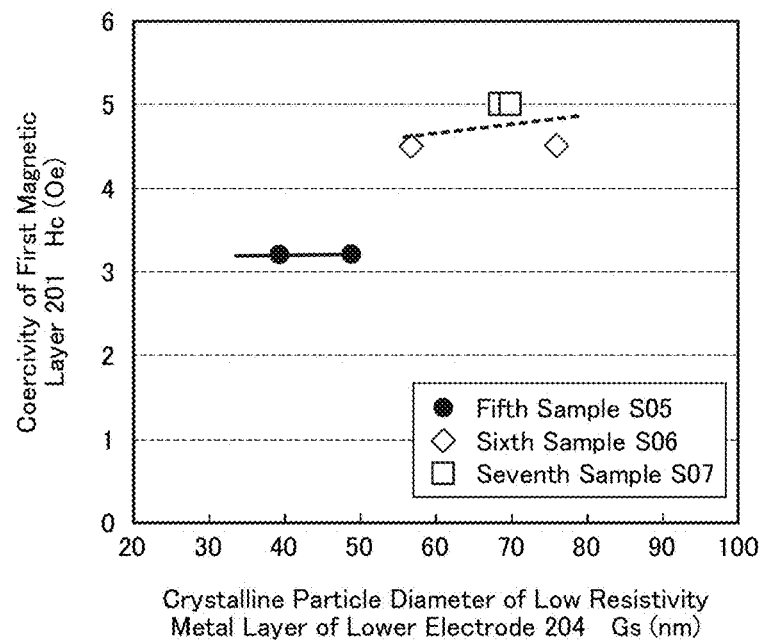
FIG. 45 is a graph showing another result of the same experiment.

Next, a result for a relationship between crystal grain size of the low resistivity metal layer including at least one element selected from the group consisting of aluminum (Al), copper (Cu), silver (Ag), gold (Au), nickel (Ni), iron (Fe), and cobalt (Co), included in the lower electrode 204, and coercivity He, is shown with reference to FIG. 45. As shown in FIG. 45, it was found that when crystal grain size Gs of the low resistivity metal layer is 50 nm or less, a low coercivity of 4 Oe or less can be achieved. Achieving a low coercivity Hc of 4 Oe or less makes it possible to achieve a high gauge factor GF as will be mentioned later.

Figure 46:
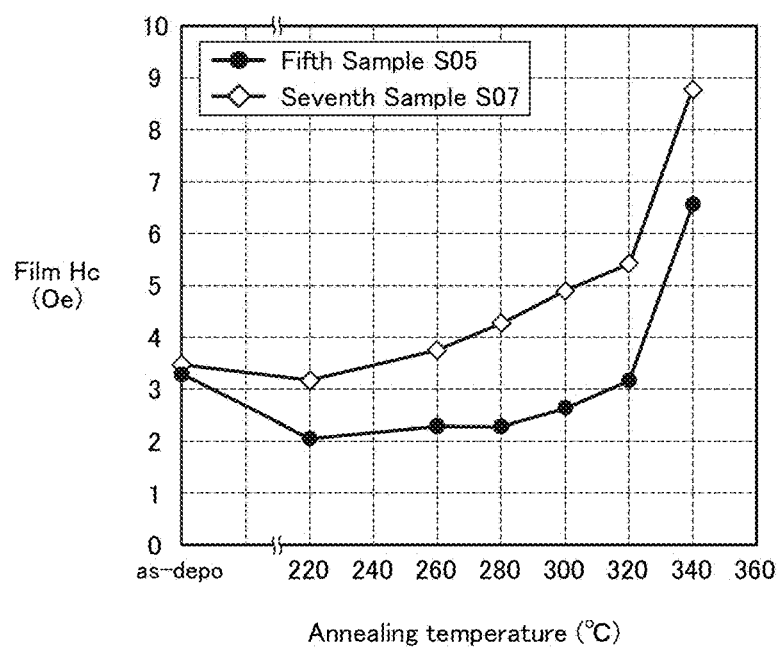
FIG. 46 is a graph showing another result of the same experiment.
Figure 47:
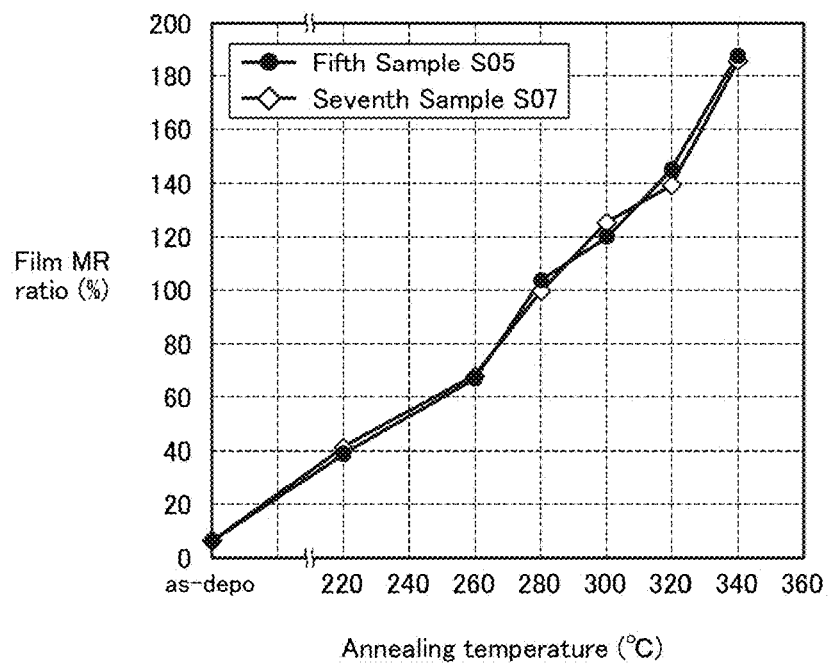
FIG. 47 is a graph showing another result of the same experiment.

Next, in order to understand in more detail a cause of a difference in coercivity confirmed by a difference in configuration of the lower electrode, annealing temperature dependency of coercivity and the MR ratio are investigated for the fifth sample S05 and the seventh sample S07 in a state of a continuous film that has not undergone element processing, as shown in FIGS. 46 and 47. During the present experiment, a plurality of the fifth samples S05 and the seventh samples S07 were produced, and these plurality of samples underwent annealing treatment at different temperatures (220° C., 260° C., 280° C., 300° C., 320° C., and 340° C.). Next, coercivity Hc and MR ratio of these samples were measured. Now, evaluation of coercivity was evaluated at a magnetic field sweep speed of 40 (Oe/min) employing VSM.

In FIG. 46, the horizontal axis indicates temperature of the annealing treatment, and the vertical axis indicates coercivity Hc of the magnetization free layer 210. As shown in FIG. 46, coercivities Hc of the fifth sample S05 and the seventh sample S07 in a pre-annealing (as-depo) state are equal at 3.3 Oe. Moreover, as shown in FIG. 46, in the fifth sample S05 in which surface unevenness of the magnetization free layer 210 and the low resistivity metal layer included in the lower electrode 204 is small, coercivity Hc increases gradually in a range of 2 Oe to 3 Oe while temperature of the annealing treatment rises from 220° C. to 320° C., and at a time point when temperature of the annealing treatment has reached 340° C., coercivity Hc increases steeply to about 6.5 Oe. On the other hand, as shown in FIG. 46, in the seventh sample S07 in which surface unevenness of the magnetization free layer 210 and the low resistivity metal layer included in the lower electrode 204 is large, coercivity Hc increases gradually in a range of 3 Oe to 5.5 Oe while temperature of the annealing treatment rises from 220° C. to 320° C., and at a temperature of the annealing treatment of 280° C. or more, coercivity Hc ends up exceeding 4 Oe.

In FIG. 47, the horizontal axis indicates temperature of the annealing treatment, and the vertical axis indicates magnitude of the MR ratio. As shown in FIG. 47, the MR ratios of the fifth sample S05 and the seventh sample S07 increase at substantially the same rate with respect to temperature of the annealing treatment.

As shown in FIG. 46, in the pre-annealing state, coercivity Hc of the magnetization free layer 210 is small, and the magnetization free layer 210 conceivably maintains an amorphous state. However, as shown in FIG. 47, in the pre-annealing state, the MR ratio takes an extremely small value of 10% or less, and a high gauge factor cannot be obtained.

Moreover, as shown in FIG. 47, the MR ratio is found to become larger as the temperature of the annealing treatment rises. This is conceivably due to crystallization of the intermediate layer 203 configured from MgO and the first magnetization fixed layer 209 configured from Co—Fe—B.

Moreover, as shown in FIG. 47, it is found that the MR ratios with respect to temperature of the annealing treatment of the fifth sample S05 and the seventh sample S07 are equal, and that a difference in surface unevenness of the magnetization free layer 210 and the low resistivity metal layer included in the lower electrode 204 does not exert an influence on the MR ratio. On the other hand, from FIG. 41, it is found that clearly different values of Hc of the heat-treated fifth sample S05 and seventh sample S07 are confirmed, and that increase in Hc due to the annealing treatment is more prominent in the seventh sample S07 in which surface unevenness of the magnetization free layer 210 and the low resistivity metal layer included in the lower electrode 204 is large, compared to in the fifth sample S05 in which surface unevenness of the magnetization free layer 210 and the low resistivity metal layer included in the lower electrode 204 is small.

From FIG. 46, in the fifth sample S05, Hc maintains 3.2 Oe or less to an annealing temperature of 320° C., and maintains a low Hc to a higher temperature compared to the seventh sample S07. In other words, the fifth sample S05 maintains an amorphous structure of the magnetization free layer 210 to a higher temperature compared to the seventh sample S07.

As shown in FIG. 47, at an annealing temperature of 280° C. or more, the fifth sample S05 and the seventh sample S07 can both obtain a high MR ratio of 100% or more, and the fifth sample S05 can maintain a low Hc of 4 Oe or less even at this annealing temperature of 280° C. or more at which the high MR ratio can be obtained, hence a high gauge factor can be obtained.

The difference in characteristics due to surface unevenness of the magnetization free layer 210 and the low resistivity metal layer included in the lower electrode 204 confirmed by such a comparison of the fifth sample S05 and the seventh sample S07 is conceivably due to the fact that as described with reference to FIG. 6, boron (an amorphizing element) included in the magnetization free layer 210 more readily stays in the magnetization free layer 210 without diffusing to an adjacent layer, hence an amorphous structure of the magnetization free layer 210 is more readily maintained.

Figure 48:
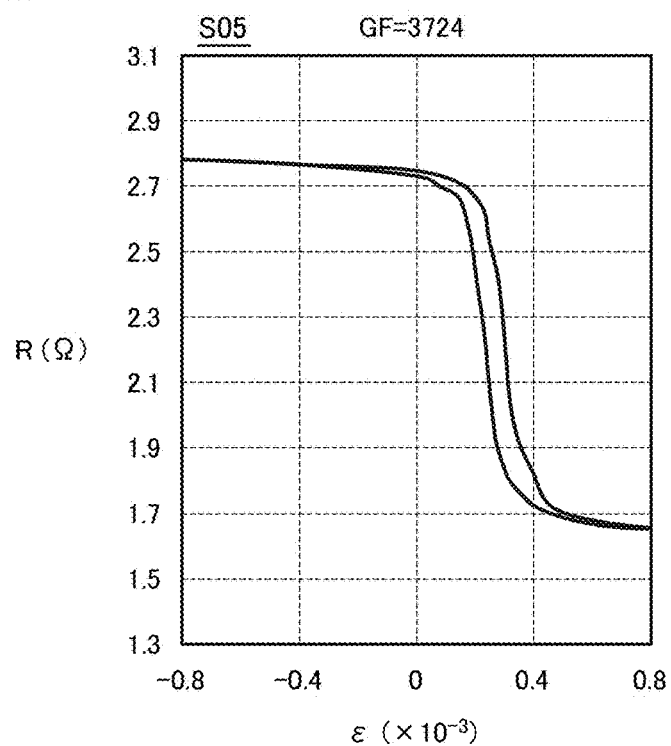
FIG. 48 is a graph showing another result of the same experiment.
Figure 49:
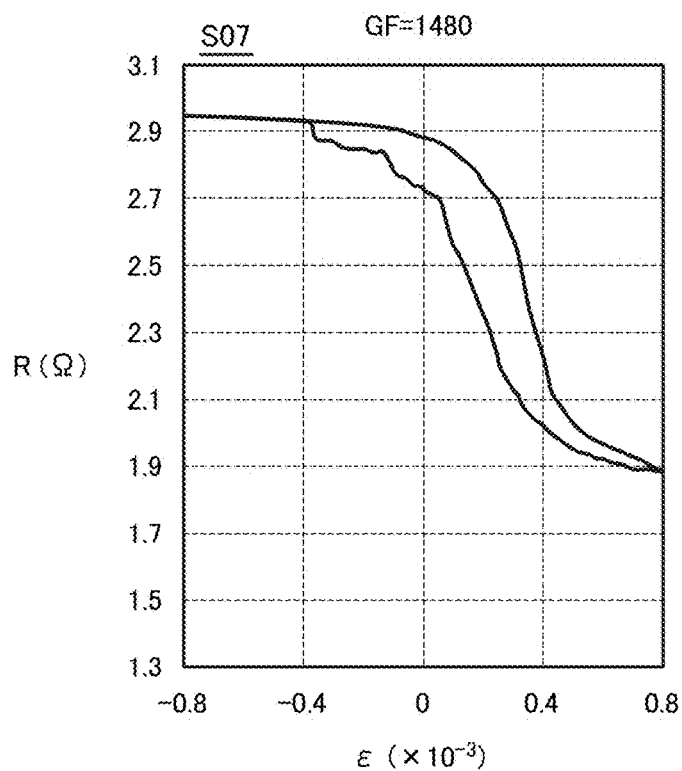
FIG. 49 is a graph showing another result of the same experiment.

FIGS. 48 and 49 respectively show a relationship between the strain ε provided to the fifth sample S05 and the seventh sample S07 and the electrical resistance value P, the horizontal axis indicating the strain r and the vertical axis indicating the electrical resistance value P between the lower electrode 204 and the upper electrode 212. FIGS. 48 and 49 show results of performing annealing treatment for 1 hour at 320° C. on samples respectively identical to the samples whose cross-sectional TEM images are shown in FIGS. 40 and 42, and performing measurement for these samples. When characteristics of the fifth sample S05 were calculated from these results, the gauge factor (GF=(dR/R)/dε) was 3724. Similarly, when characteristics of the seventh sample S07 were calculated, the gauge factor (GF=(dR/R)/dε) was 1.480. Such a difference in gauge factors is conceivably due to the difference in magnitude of coercivities Hc, as shown in FIG. 41.

Next, as shown in FIGS. 50 to 53, an eighth sample S08 and a ninth sample S09 that have mutually different unevenness of the magnetization free layer 210 and the low resistivity metal layer included in the lower electrode 204 and that do not include the diffusion prevention layer 216, were produced, and an evaluation of magnetic characteristics thereof was performed.

Figure 50:
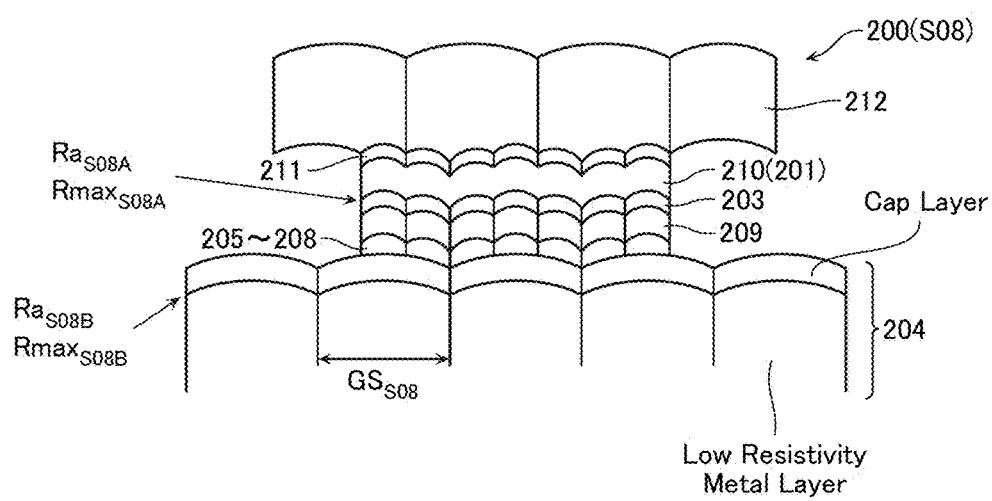
FIG. 50 is a schematic side view showing a configuration of an experiment sample of another experiment.
Figure 51:
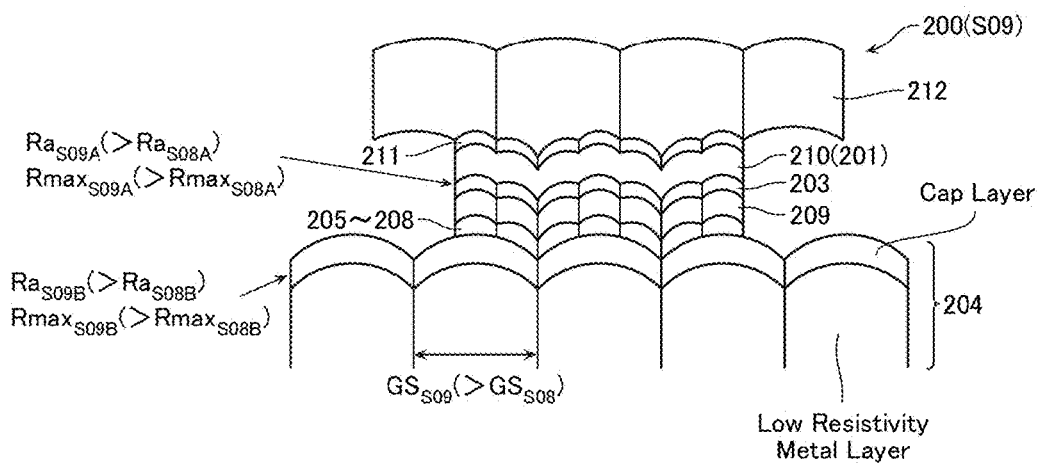
FIG. 51 is a schematic side view showing a configuration of another experiment sample of the same experiment.

FIG. 50 is a schematic cross-sectional view showing a configuration of the eighth sample S08. FIG. 51 is a schematic cross-sectional view showing a configuration of the ninth sample S09. The eighth sample S08 is configured substantially similarly to the fifth sample S05, but does not include the diffusion prevention layer 216. Moreover, the ninth sample S09 is configured substantially similarly to the seventh sample S07, but does not include the diffusion prevention layer 216.

Figure 52:
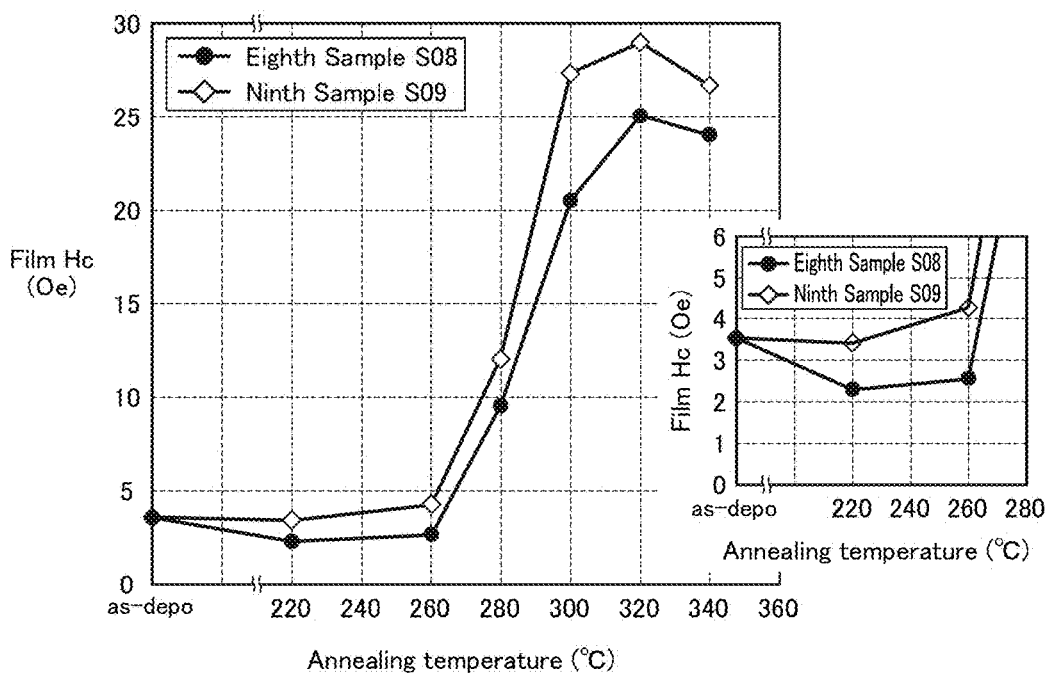
FIG. 52 is a graph showing a result of the same experiment.
Figure 53:
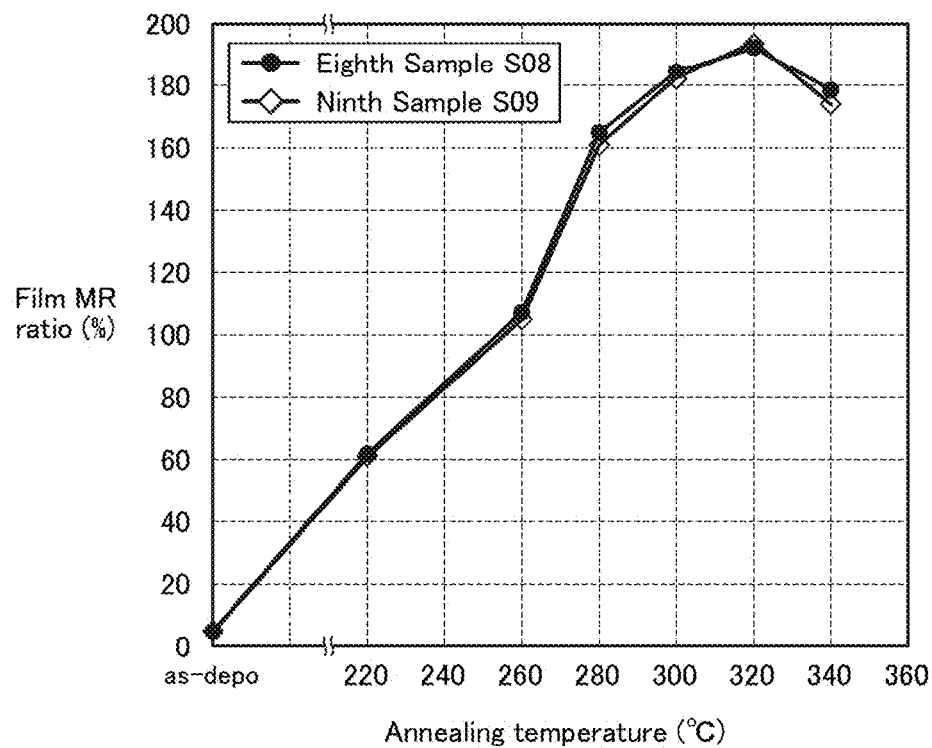
FIG. 53 is a graph showing another result of the same experiment.

Next, as shown in FIGS. 52 and 53, an evaluation of magnetic characteristics was performed on the eighth sample S08 and the ninth sample S09 in a state of a continuous film that has not undergone element processing. During the present experiment, a plurality of the eighth samples S08 and the ninth samples S09 were produced, and these plurality of samples underwent annealing treatment at different temperatures (220° C., 260° C., 280° C., 300° C., 320° C., and 340° C.). Next, coercivity He and MR ratio of these samples were measured. Now, evaluation of coercivity was evaluated at a magnetic field sweep speed of 40 (Oe/min) employing VSM.

In FIG. 52, the horizontal axis indicates temperature of the annealing treatment, and the vertical axis indicates coercivity Hc of the magnetization free layer 210. As shown in FIG. 52, coercivities Hc of the eighth sample S08 and the ninth sample S09 in a pre-annealing (as-depo) state are equal at 3.3 Oe. Moreover, as shown in FIG. 52, in the eighth sample S08 and the ninth sample S09, coercivity Hc increases gradually while temperature of the annealing treatment rises from 220° C. to 260° C., and at a time point when temperature of the annealing treatment has reached 280° C., coercivity Hc increases steeply.

In FIG. 53, the horizontal axis indicates temperature of the annealing treatment, and the vertical axis indicates magnitude of the MR ratio. As shown in FIG. 53, the MR ratios of the eighth sample S08 and the ninth sample S09 increase at substantially the same rate with respect to temperature of the annealing treatment.

As shown in FIG. 52, in the pre-annealing state, coercivity Hc of the magnetization free layer 210 is small, and the magnetization free layer 210 conceivably maintains an amorphous state. However, as shown in FIG. 53, in the pre-annealing state, the MR ratio takes an extremely small value of 10% or less, and a high gauge factor cannot be obtained.

Moreover, as shown in FIG. 53, the MR ratio is found to become larger as the temperature of the annealing treatment rises. This is conceivably due to crystallization of the intermediate layer 203 configured from MgO and the first magnetization fixed layer 209 configured from Co—Fe—B.

Moreover, as shown in FIG. 53, it is found that the MR ratios with respect to temperature of the annealing treatment of the eighth sample S08 and the ninth sample S09 are equal, and that a difference in surface unevenness of the magnetization free layer 210 and the low resistivity metal layer included in the lower electrode 204 does not exert an influence on the MR ratio. On the other hand, from FIG. 52, it is found that clearly different values of Hc of the heat-treated eighth sample S08 and ninth sample S09 are confirmed, and that Hc increases more easily in the ninth sample S09 than in the eighth sample S08.

From FIG. 52, in the eighth sample S08, Hc maintains 3 Oe or less to a annealing temperature of 260° C., and maintains a low Hc to a higher temperature compared to the ninth sample S09. In other words, the eighth sample S08 maintains an amorphous structure of the magnetization free layer 210 to a higher temperature compared to the ninth sample S09.

As shown in FIG. 53, at a annealing temperature of 260° C. or more, the eighth sample S08 and the ninth sample S09 can both obtain a high MR ratio of 100% or more, and the eighth sample S08 can maintain a low Hc of 4 Oe or less even at this annealing temperature of 260° C. or more at which the high MR ratio can be obtained, hence a high gauge factor can be obtained.

The difference in characteristics due to surface unevenness of the magnetization free layer 210 and the low resistivity metal layer included in the lower electrode 204 confirmed by such a comparison of the eighth sample S08 and the ninth sample S09 is due to the fact that as described with reference to FIG. 6, boron (an amorphizing element) included in the magnetization free layer 210 more readily stays in the magnetization free layer 210 without diffusing to an adjacent layer, hence an amorphous structure of the magnetization free layer 210 is more readily maintained.

It was found from the above that reducing surface unevenness of the magnetization free layer 210 and the low resistivity metal layer included in the lower electrode 204 makes it possible to combine the MR ratio and a low coercivity Hc and achieve a high gauge factor, even when the diffusion prevention layer 216 is not provided.

[1-4. Other Configuration Examples of Strain Detection Element According to First Embodiment]

Figure 54:
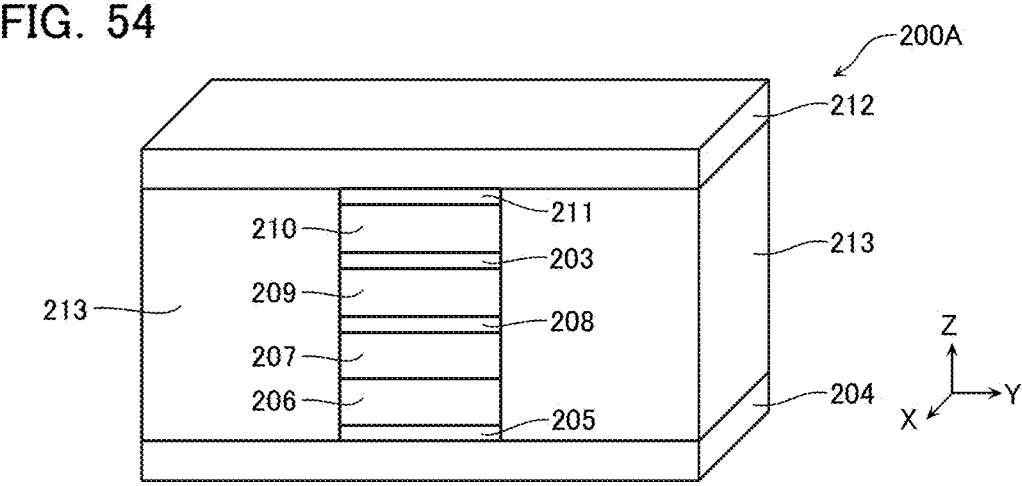
FIG. 54 is a schematic perspective view showing another configuration example of the same strain detection element.

Next, other configuration examples of the strain detection element 200 according to the first embodiment will be described. FIG. 54 is a schematic perspective view showing one configuration example of the strain detection element 200A. As shown in FIG. 54, the strain detection element 200A may include an insulating layer (insulating portion) 213 filled between the lower electrode 204 and the upper electrode 212.

Employable in the insulating layer 213 is, for example, an aluminum oxide (for example, $Al_2O_3$) or a silicon oxide (for example, $SiO_2$), and so on. A leak current of the strain detection element 200A can be suppressed by the insulating layer 213.

Figure 55:
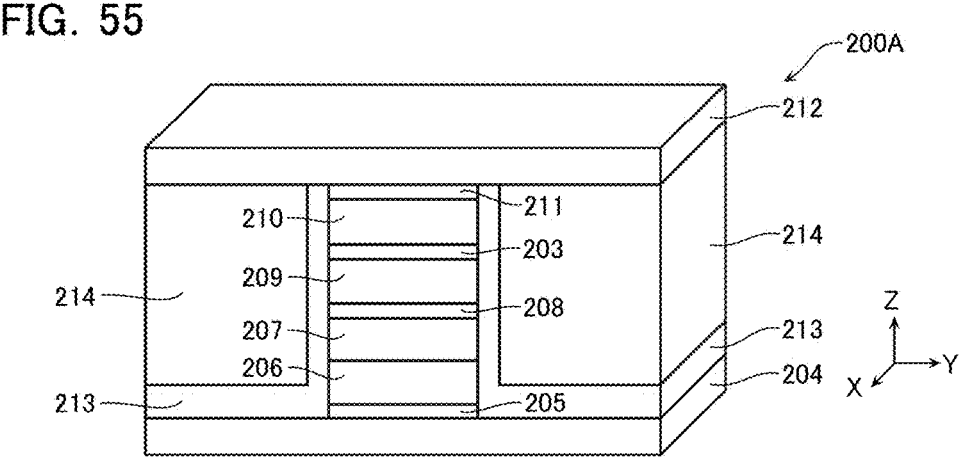
FIG. 55 is a schematic perspective view showing another configuration example of the same strain detection element.

FIG. 55 is a schematic perspective view showing another configuration example of the strain detection element 200A. As shown in FIG. 55, the strain detection element 200A may include: two hard bias layers (hard bias portions) 214 provided separated from each other between the lower electrode 204 and the upper electrode 212; and the insulating layer 213 filled between the lower electrode 204 and the hard bias layer 214.

The hard bias layer 214 sets the magnetization direction of the magnetization free layer 210 (first magnetic layer 201) to a desired direction by a magnetization of the hard bias layer 214. The hard bias layer 214 makes it possible to set the magnetization direction of the magnetization free layer 210 (first magnetic layer 201) to a desired direction in a state where a pressure from external is not applied to the membrane.

Employed in the hard bias layer 214 is, for example, a hard magnetic material of comparatively high magnetic anisotropy and coercivity such as Co—Pt, Fe—Pt, Co—Pd, Fe—Pd, and so on. Moreover, an alloy having an additional element further added to Co—Pt, Fe—Pt, Co—Pd, and Fe—Pd may be employed. Employable in the hard bias layer 214 is, for example, CoPt (where a percentage of Co is not less than 50 at. % and not more than 85 at. %), $(Co_xPt_{100-x})_{100-y}Cr_y$ (where x is not less than 50 at. % and not more than 85 at. %, and y is not less than 0 at. % and not more than 40 at. %), or FePt (where a percentage of Pt is not less than 40 at. % and not more than 60 at. %), and so on. When such materials are employed, applying the hard bias layer 214 with an external magnetic field whose coercivity is larger than that of the hard bias layer 214 makes it possible for a magnetization direction of the hard bias layer 214 to be set (fixed) in a direction of application of the external magnetic field. A thickness (for example, a length along a direction from the lower electrode 204 toward the upper electrode 212) of the hard bias layer 214 is, for example, not less than 5 nm and not more than 50 nm.

When the insulating layer 213 is disposed between the lower electrode 204 and the upper electrode 212, $SiO_x$ or $AlO_x$ may be employed as a material of the insulating layer 213. Furthermore, a under layer not illustrated may be provided between the insulating layer 213 and the hard bias layer 214. When a hard magnetic material of comparatively high magnetic anisotropy and coercivity such as Co—Pt, Fe—Pt, Co—Pd, Fe—Pd, and so on, is employed in the hard bias layer 214, the likes of Cr or Fe—Co may be employed as a material of the under layer for the hard bias layer 214. The above-described hard bias layer 214 may also be applied to any of the later-mentioned strain detection elements.

The hard bias layer 214 may have a structure of being stacked on a hard bias layer-dedicated pinning layer not illustrated. In this case, the magnetization direction of the hard bias layer 214 can be set (fixed) by exchange coupling between the hard bias layer 214 and the hard bias layer-dedicated pinning layer. In this case, employable in the hard bias layer 214 is a ferromagnetic material configured from at least one of Fe, Co, and Ni, or from an alloy including at least one kind of these metals. In this case, employable in the hard bias layer 214 is, for example, a $Co_xFe_{100-x}$ alloy (where x is not less than 0 at. % and not more than 100 at. %), a $Ni_xFe_{100-x}$ alloy (where x is not less than 0 at. % and not more than 100 at. %), or a material having a nonmagnetic element added to these alloys. Employable as the hard bias layer 214 is a material similar to that of the previously mentioned first magnetization fixed layer 209. Moreover, employable in the hard bias layer-dedicated pinning layer is a material similar to that of the previously mentioned pinning layer 206 in the strain detection element 200A. Moreover, when the hard bias layer-dedicated pinning layer is provided, a under layer of a similar material to that employed in the under layer 205 may be provided below the hard bias layer-dedicated pinning layer. Moreover, the hard bias layer-dedicated pinning layer may be provided to a lower portion of the hard bias layer, or may be provided to an upper portion of the hard bias layer. The magnetization direction of the hard bias layer 214 in this case can be determined by magnetic field-accompanied annealing, similarly to in the case of the pinning layer 206.

The above-described hard bias layer 214 and insulating layer 213 may also be applied to any of the strain detection elements 200 described in the present embodiment. Moreover, when the above-mentioned kind of stacked structure of the hard bias layer 214 and the hard bias layer-dedicated pinning layer is employed, an orientation of magnetization of the hard bias layer 214 can be easily maintained even when a large external magnetic field is instantaneously applied to the hard bias layer 214.

Figure 56:
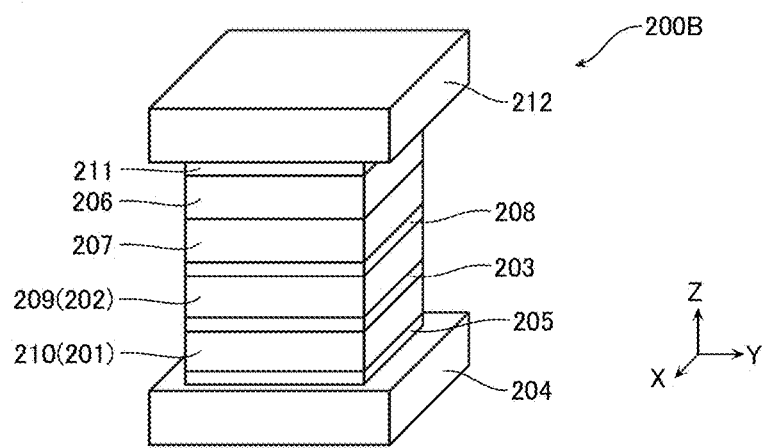
FIG. 56 is a schematic perspective view showing another configuration example of the same strain detection element.

FIG. 56 is a schematic perspective view showing another configuration example 200B of the strain detection element 200. The strain detection element 200B differs from the strain detection element 200A in having a top spin valve type structure. That is, as shown in FIG. 56, the strain detection element 200B is configured from: the lower electrode 204; the stacked body provided on this lower electrode 204; and the upper electrode 212 provided on this stacked body. The stacked body is configured having the following stacked sequentially therein in order of closeness to the lower electrode 204, namely: the under layer 205; the magnetization free layer 210 (first magnetic layer 201); the intermediate layer 203; the first magnetization fixed layer 209 (second magnetic layer 202); the magnetic coupling layer 208; the second magnetization fixed layer 207; the pinning layer 206; and the cap layer 211. The first magnetization fixed layer 209 corresponds to the second magnetic layer 202. The magnetization free layer 210 corresponds to the first magnetic layer 201. Note that a diffusion prevention layer not illustrated may be provided between the under layer 205 and the magnetization free layer 210.

Employed in the under layer 205 is, for example, Ta/Cu. A thickness (length in a Z axis direction) of a Ta layer thereof is, for example, 3 nm. A thickness of a Cu layer thereof is, for example, 5 nm. Employed in the magnetization free layer 210 is, for example, $Co_{40}Fe_{40}B_{20}$ having a thickness of 4 nm. Employed in the intermediate layer 203 is, for example, a MgO layer having a thickness of 1.6 nm. Employed in the first magnetization fixed layer 209 is, for example, $Co_{40}Fe_{40}B_{20}/Fe_{50}Co_{50}$. A thickness of a $Co_{40}Fe_{40}B_{20}$ layer thereof is, for example, 2 nm. A thickness of a $Fe_{50}Co_{50}$ layer thereof is, for example, 1 nm. Employed in the magnetic coupling layer 208 is, for example, a Ru layer having a thickness of 0.9 nm. Employed in the second magnetization fixed layer 207 is, for example, a $Co_{75}Fe_{25}$ layer having a thickness of 2.5 nm. Employed in the pinning layer 206 is, for example, an IrMn layer having a thickness of 7 nm. Employed in the cap layer 211 is, for example, Ta/Ru. A thickness of a Ta layer thereof is, for example, 1 nm. A thickness of a u layer thereof is, for example, 5 nm.

In the previously mentioned bottom spin valve type strain detection element 200A, the first magnetization fixed layer 209 (second magnetic layer 202) is formed more downwardly than (more in a −Z axis direction with respect to) the magnetization free layer 210 (first magnetic layer 201). In contrast, in the top spin valve type strain detection element 200B, the first magnetization fixed layer 209 (second magnetic layer 202) is formed more upwardly than (more in a +Z axis direction with respect to) the magnetization free layer 210 (first magnetic layer 201). Therefore, the materials of each of the layers included in the strain detection element 200A may be employed up-down inverted as materials of each of the layers included in the strain detection element 200B. Moreover, the above-mentioned diffusion prevention layer may be provided between the under layer 205 and the magnetization free layer 210 of the strain detection element 200B.

Figure 57:
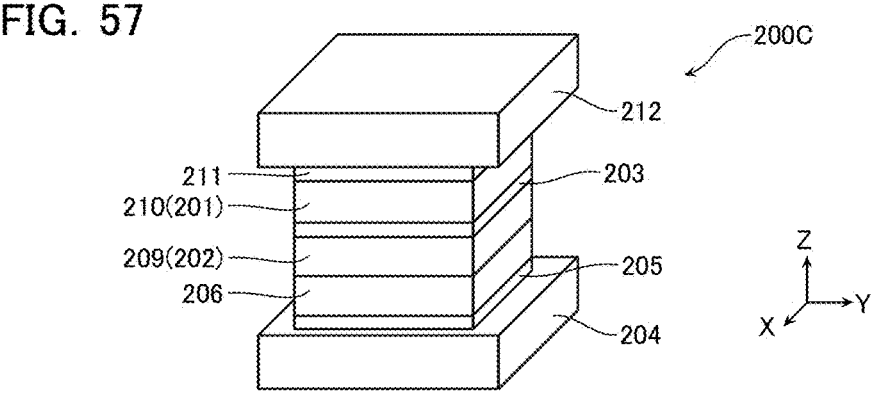
FIG. 57 is a schematic perspective view showing another configuration example of the same strain detection element.

FIG. 57 is a schematic perspective view showing another configuration example 200C of the strain detection element 200. The strain detection element 200C is applied with a single pin structure employing a single magnetization fixed layer. That is, as shown in FIG. 57, the strain detection element 200C is configured from: the lower electrode 204; the stacked body provided on this lower electrode 204; and the upper electrode 212 provided on this stacked body. The stacked body is configured having the following stacked sequentially therein in order of closeness to the lower electrode 204, namely: the under layer 205; the pinning layer 206; the first magnetization fixed layer 209 (second magnetic layer 202); the intermediate layer 203; the magnetization free layer 210 (first magnetic layer 201); and the cap layer 211. The first magnetization fixed layer 209 corresponds to the second magnetic layer 202. The magnetization free layer 210 corresponds to the first magnetic layer 201. Note that a diffusion prevention layer not illustrated may be provided between the magnetization free layer 210 and the cap layer 211.

Employed in the under layer 205 is, for example, Ta/Ru. A thickness (length in a Z axis direction) of a Ta layer thereof is, for example, 3 nm. A thickness of a Ru layer thereof is, for example, 2 nm. Employed in the pinning layer 206 is, for example, an IrMn layer having a thickness of 7 nm. Employed in the first magnetization fixed layer 209 is, for example, a $Co_{40}Fe_{40}B_{20}$ layer having a thickness of 3 nm. Employed in the intermediate layer 203 is, for example, a MgO layer having a thickness of 1.6 nm. Employed in the magnetization free layer 210 is, for example, $Co_{40}Fe_{40}B_{20}$ having a thickness of 4 nm. Employed in the cap layer 211 is, for example, Ta/Ru. A thickness of a Ta layer thereof is, for example, 1 nm. A thickness of a Ru layer thereof is, for example, 5 nm.

Materials similar to those of each of the layers of the strain detection element 200A may be employed as materials of each of the layers of the strain detection element 200C.

Figure 58:
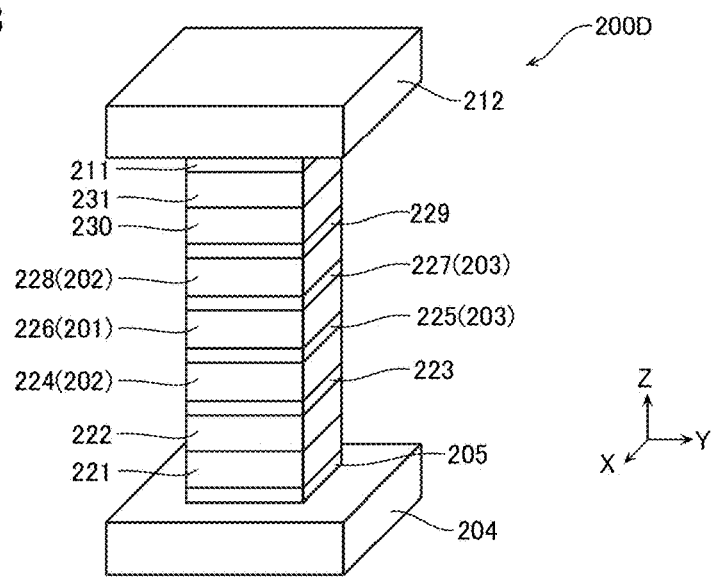
FIG. 58 is a schematic perspective view showing another configuration example of the same strain detection element.

FIG. 58 is a schematic perspective view showing another configuration example 200D of the strain detection element 200. As shown in FIG. 58, the strain detection element 200D is configured from: the lower electrode 204; the stacked body provided on this lower electrode 204; and the upper electrode 212 provided on this stacked body. The stacked body is configured having the following stacked sequentially therein in order of closeness to the lower electrode 204, namely: the under layer 205; a lower pinning layer 221; a lower second magnetization fixed layer 222; a lower magnetic coupling layer 223; a lower first magnetization fixed layer 224; a lower intermediate layer 225; a magnetization free layer 226; an upper intermediate layer 227; an upper first magnetization fixed layer 228; an upper magnetic coupling layer 229; an upper second magnetization fixed layer 230; an upper pinning layer 231; and the cap layer 211. The lower first magnetization fixed layer 224 and the upper first magnetization fixed layer 228 correspond to the second magnetic layer 202. The magnetization free layer 226 corresponds to the first magnetic layer 201.

Employed in the under layer 205 is, for example, Ta/Ru. A thickness (length in a Z axis direction) of a Ta layer thereof is, for example, 3 nanometers (nm). A thickness of a Ru layer thereof is, for example, 2 nm. Employed in the lower pinning layer 221 is, for example, an IrMn layer having a thickness of 7 nm. Employed in the lower second magnetization fixed layer 222 is, for example, a $Co_{75}Fe_{25}$ layer having a thickness of 2.5 nm. Employed in the lower magnetic coupling layer 223 is, for example, a Ru layer having a thickness of 0.9 nm. Employed in the lower first magnetization fixed layer 224 is, for example, a $Co_{40}Fe_{40}B_{20}$ layer having a thickness of 3 nm. Employed in the lower intermediate layer 225 is, for example, a MgO layer having a thickness of 1.6 nm. Employed in the magnetization free layer 226 is, for example, $Co_{40}Fe_{40}B_{20}$ having a thickness of 4 nm. Employed in the upper intermediate layer 227 is, for example, a MgO layer having a thickness of 1.6 nm. Employed in the upper first magnetization fixed layer 228 is, for example, $Co_{40}Fe_{40}B_{20}/Fe_{50}Co_{50}$. A thickness of a $Co_{40}Fe_{40}B_{20}$ layer thereof is, for example, 2 nm. A thickness of a $Fe_{50}Co_{50}$ layer thereof is, for example, 1 nm. Employed in the upper magnetic coupling layer 229 is, for example, a Ru layer having a thickness of 0.9 nm. Employed in the upper second magnetization fixed layer 230 is, for example, a $Co_{75}Fe_{25}$ layer having a thickness of 2.5 nm. Employed in the upper pinning layer 231 is, for example, an IrMn layer having a thickness of 7 nm. Employed in the cap layer 211 is, for example, Ta/Ru. A thickness of a Ta layer thereof is, for example, 1 nm. A thickness of a Ru layer thereof is, for example, 5 nm.

Materials similar to those of each of the layers of the strain detection element 200A may be employed as materials of each of the layers of the strain detection element 200D.

Next, another mode of the strain detection element 200 according to the present embodiment will be described with reference to FIG. 59. In the description thus far, a mode in which the second magnetic layer 202 is a magnetization fixed layer was described, but as mentioned above, the second magnetic layer 202 may be a magnetization free layer. Described below is the case where the second magnetic layer 202 is a magnetization free layer and the strain detection element 200 has a so-called two-layer free structure.

Figure 59A:
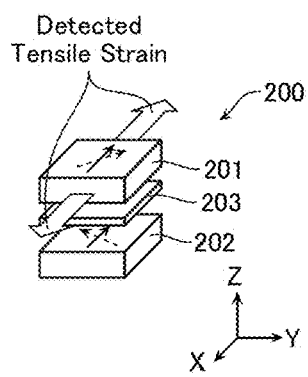
FIGS. 59A-59D are schematic views for explaining operation of another configuration example of the same strain detection element.
Figure 59B:
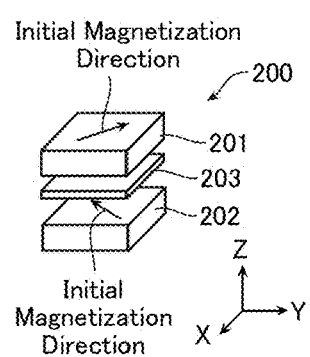
Figure 59C:
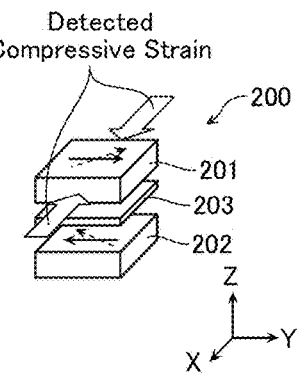

FIGS. 59A, 59B, and 59C are schematic perspective views respectively expressing situations of a state where a tensile strain occurs, a state where a strain does not occur, and a state where a compressive strain occurs, in the strain detection element 200. Moreover, in the example shown in FIGS. 59A, 59B, and 59C, the second magnetic layer 202 is assumed to be a magnetization free layer, and a direction of the strain occurring in the strain detection element 200 is assumed to be the X direction.

As shown in FIG. 59B, in the case where a strain does not occur in the strain detection element 200 according to the present embodiment, a relative angle between the magnetization direction of the first magnetic layer 201 and the magnetization direction of the second magnetic layer 202 is greater than 0° and less than 180°. In the example shown in FIG. 59B, the initial magnetization direction of the first magnetic layer 201 is 90° with respect to the initial magnetization direction of the second magnetic layer 202. Moreover, these initial magnetization directions are respectively 45° (135°) with respect to the direction in which the strain occurs.

As shown in FIG. 59A, when a tensile strain occurs in the X direction in the strain detection element 200, the reverse magnetostriction effect occurs in the first magnetic layer 201 and the second magnetic layer 202, and the magnetization directions of these magnetic layers change relatively. A ferromagnetic material having a positive magnetostriction constant is employed in the first magnetic layer 201 and the second magnetic layer 202 of the strain detection element 200. Therefore, as shown in FIG. 59A, the magnetization directions of the first magnetic layer 201 and the second magnetic layer 202 each come closer to being parallel to the direction of the tensile strain. Note that the magnetostriction constant of the first magnetic layer 201 may be negative. In the example shown in FIG. 59A, these magnetization directions change such that a mutual angular difference between them decreases.

On the other hand, as shown in FIG. 59C, when a compressive strain occurs in the X direction in the strain detection element 200, the reverse magnetostriction effect occurs in the first magnetic layer 201 and the second magnetic layer 202, and the magnetization directions of the first magnetic layer 201 and the second magnetic layer 202 each come closer to being perpendicular to the direction of the compressive strain. In the example shown in FIG. 59C, these magnetization directions change such that a mutual angular difference between them increases.

Figure 59D:
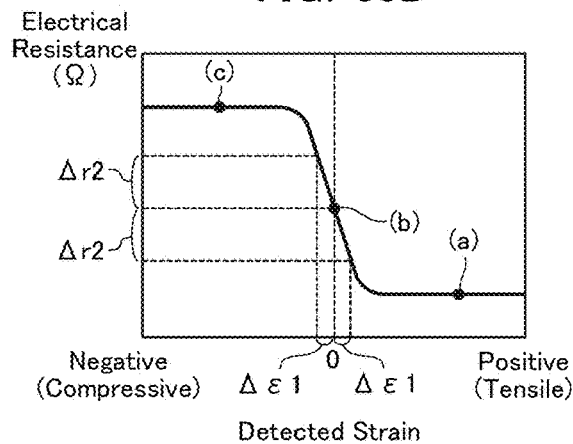

FIG. 59D is a schematic graph showing a relationship between electrical resistance of the strain detection element 200 and strain occurring in the strain detection element 200. Note that in FIG. 59D, a strain in a tensile direction is assumed to be a strain in a positive direction, and a strain in a compressive direction is assumed to be a strain in a negative direction.

As shown in FIG. 59D, the electrical resistance value of the strain detection element 200 according to the present embodiment decreases when a strain in a positive direction (tensile strain) has occurred, and increases when a strain in a negative direction (compressive strain) has occurred. Therefore, the strain detection element 200 can be directly employed in a device that responds to a positive/negative pressure, such as a microphone.

Moreover, when the strain of the strain detection element 200 is close to zero, a comparatively large resistance change $\Delta r2$ can be obtained both in the case where a minute strain $\Delta \varepsilon 1$ is applied in the positive direction (tensile direction) and in the case where a minute strain $\Delta \varepsilon 1$ is applied in the negative direction (compressive direction). That is, the strain detection element 200 according to the present embodiment is suitable for manufacture of a high sensitivity pressure sensor having a large gauge factor when a strain is extremely minute.

Figure 60:
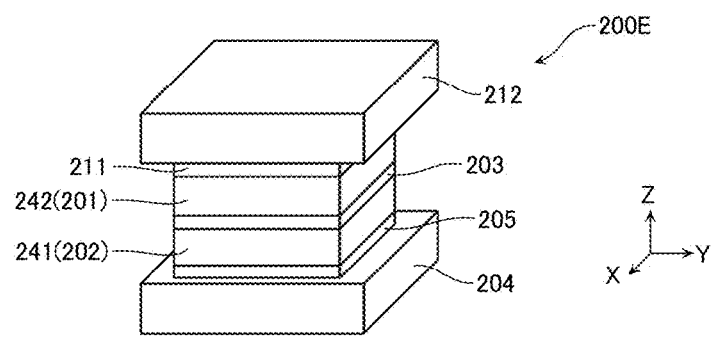
FIG. 60 is a schematic perspective view showing a configuration example of the same strain detection element.

Next, a configuration example of the strain detection element 200 using the second magnetic layer 202 as a magnetization free layer will be described with reference to FIG. 60. FIG. 60 is a schematic perspective view showing one configuration example 200E of the strain detection element 200. As shown in FIG. 60, the strain detection element 200E is configured from: the lower electrode 204; the stacked body provided on this lower electrode 204; and the upper electrode 212 provided on this stacked body. The stacked body is configured having the following stacked sequentially therein in order of closeness to the lower electrode 204, namely: the under layer 205; a first magnetization free layer 241 (the second magnetic layer 202); the intermediate layer 203; a second magnetization free layer 242 (the first magnetic layer 201); and the cap layer 211. The first magnetization free layer 241 corresponds to the second magnetic layer 202. The second magnetization free layer 242 corresponds to the first magnetic layer 201. Note that a diffusion prevention layer not illustrated may be provided to at least one of between the under layer 205 and the first magnetization free layer 241 and between the second magnetization free layer 242 and the cap layer 211.

Employed in the under layer 205 is, for example, Ta/Ru. A thickness (length in a Z axis direction) of a Ta layer thereof is, for example, 3 nm. A thickness of a Ru layer thereof is, for example, 5 nm. Employed in the first magnetization free layer 241 is, for example, $Co_{40}Fe_{40}B_{20}$ having a thickness of 4 nm. Employed in the intermediate layer 203 is, for example, a MgO layer having a thickness of 1.6 nm. Employed in the second magnetization free layer 242 is, for example, $Co_{40}Fe_{40}B_{20}$ having a thickness of 4 nm. Employed in the cap layer 211 is, for example, Ta/Ru. A thickness of a Ta layer thereof is, for example, 1 nm. A thickness of a Ru layer thereof is, for example, 5 nm. Moreover, when a diffusion prevention layer is provided to at least one of between the under layer 205 and the first magnetization free layer 241 and between the second magnetization free layer 242 and the cap layer 211, a MgO layer having a thickness of 1.5 nm, for example, is employed in the diffusion prevention layer.

Materials similar to those of each of the layers of the strain detection element 200A may be employed as materials of each of the layers of the strain detection element 200E. Moreover, a material similar to that of, for example, the magnetization free layer 210 of the strain detection element 200A (FIG. 10) may be employed as materials of the first magnetization free layer 241 and the second magnetization free layer 242.

2. Second Embodiment

Figure 61:
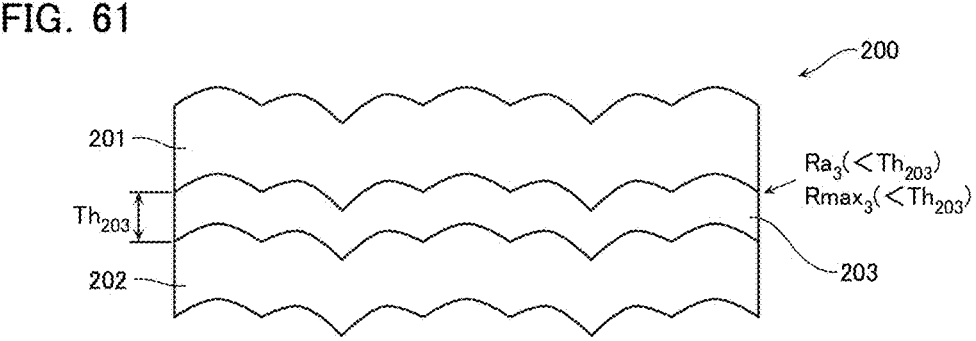
FIG. 61 is a schematic cross-sectional view showing a configuration of a strain detection element according to a second embodiment.

Next, a second embodiment will be described with reference to FIG. 61. FIG. 61 is a schematic cross-sectional view of part of a strain detection element 200 according to the second embodiment.

The strain detection element 200 according to the present embodiment is configured substantially similarly to the strain detection element according to the first embodiment. However, as shown in FIG. 61, in the strain detection element 200 according to the present embodiment, average roughness $Ra_3$ or maximum roughness $Rmax_3$ of the interface between the intermediate layer 203 and the first magnetic layer 201 can be set to less than or equal to a film thickness $Th_{203}$ of the intermediate layer 203. In addition, the average roughness $Ra_3$ is calculated by the Ra value explained with reference to parts (a) and (b) in FIG. 9, for example. Moreover, the maximum roughness $Rmax_3$ is calculated by the Rmax value explained with reference to part (c) in FIG. 9, for example.

That is, in the first embodiment, unevenness of the likes of the intermediate layer 203 or diffusion prevention layer 216 was reduced by reducing unevenness of the lower electrode 204. As a result, a thin portion was prevented from occurring in the likes of the intermediate layer 203 or diffusion prevention layer 216, and diffusion of an amorphizing promotion element and crystallization of the magnetization free layer 210 accompanying this diffusion were suppressed. However, it is not necessarily required to reduce unevenness of the upper surface of the lower electrode 204 in order to reduce unevenness of the likes of the intermediate layer 203 or diffusion prevention layer 216. In the present embodiment, similar advantages to those of the first embodiment are achieved by reducing the average roughness $Ra_3$ or maximum roughness $Rmax_3$ of the interface between the intermediate layer 203 and the first magnetic layer 201.

Moreover, as explained with reference to FIGS. 6 and 7, diffusion of the amorphizing promotion element is conceivably due to the thin portion ending up occurring in the intermediate layer 203 or the diffusion prevention layer 216. It is therefore conceivable that if, for example, a film thickness of the intermediate layer 203 or diffusion prevention layer is large, then a permissible magnitude of unevenness increases. It is therefore conceivable that defining unevenness of the interface between the intermediate layer 203 and the first magnetic layer 201 from a relationship to the film thickness of the intermediate layer 203 or diffusion prevention layer is suitable for preventing diffusion of the amorphizing promotion element.

Note that although not illustrated in FIG. 61, in the strain detection element 200 according to the present embodiment, it is also possible to provide the diffusion prevention layer on the intermediate layer 203, for example. In this case, the average roughness or maximum roughness of the interface between the diffusion prevention layer and the first magnetic layer 201 may be set smaller than the film thickness of the diffusion prevention layer. In addition, this average roughness is the Ra value explained with reference to FIG. 9 and is calculated by the Ra value explained with reference to parts (a) and (b) in FIG. 9, for example. Moreover, this maximum roughness is calculated by the Rmax value explained with reference to part (c) in FIG. 9, for example.

3. Third Embodiment

Figure 62:
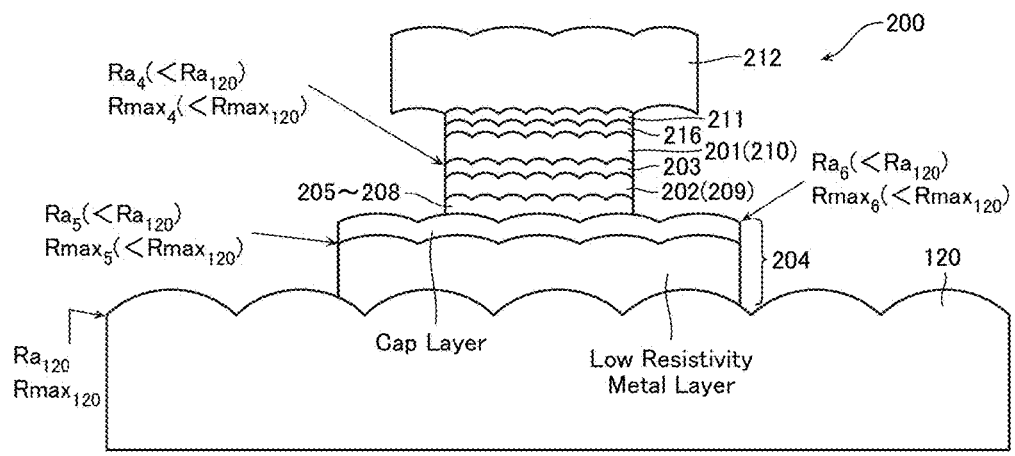
FIG. 62 is a schematic cross-sectional view showing a configuration of a strain detection element according to a third embodiment.

Next, a third embodiment will be described with reference to FIGS. 62 to 66. FIG. 62 is a schematic cross-sectional view of part of a strain detection element 200 according to the third embodiment.

The strain detection element 200 according to the present embodiment is configured substantially similarly to the strain detection element according to the first embodiment. However, as shown in FIG. 62, in the strain detection element 200 according to the present embodiment, unevenness of the interface between the intermediate layer 203 and the first magnetic layer 201 is smaller than unevenness of an upper surface of the membrane 120. For example, average roughness $Ra_4$ of the interface between the intermediate layer 203 and the first magnetic layer 201 is smaller than average roughness $Ra_{120}$ of the upper surface of the membrane 120. For example, maximum roughness $Rmax_4$ of the interface between the intermediate layer 203 and the first magnetic layer 201 is smaller than maximum roughness $Rmax_{120}$ of the upper surface of the membrane 120.

Moreover, as shown in FIG. 62, in the strain detection element 200 according to the present embodiment, unevenness of an upper surface of the low resistivity metal layer included in the lower electrode 204 may be set smaller than unevenness of the upper surface of the membrane 120. For example, average roughness Ba5 of the upper surface of the low resistivity metal layer included in the lower electrode 204 is smaller than average roughness $Ra_{120}$ of the upper surface of the membrane 120. For example, maximum roughness $Rmax_5$ of the upper surface of the low resistivity metal layer included in the lower electrode 204 is smaller than maximum roughness $Rmax_{120}$ of the upper surface of the membrane 120.

Moreover, as shown in FIG. 62, in the strain detection element 200 according to the present embodiment, unevenness of the upper surface of the lower electrode 204 may be set smaller than unevenness of the upper surface of the membrane 120. For example, average roughness $Ra_6$ of the upper surface of the lower electrode 204 is smaller than average roughness $Ra_{120}$ of the upper surface of the membrane 120. For example, maximum roughness $Rmax_6$ of the upper surface of the lower electrode 204 is smaller than maximum roughness $Rmax_{120}$ of the upper surface of the membrane 120.

These average roughnesses $Ra_4$, $Ra_5$, $Ra_6$, and $Ra_{120}$ are calculated by the Ra value explained with reference to parts (a) and (b) in FIG. 9, for example. Moreover, these maximum roughnesses $Rmax_4$, $Rmax_5$, $Rmax_6$, and $Rmax_{120}$ are calculated by the Rmax value explained with reference to part (c) in FIG. 9, for example.

That is, in the present embodiment, unevenness of the interface between the intermediate layer 203 and the first magnetic layer 201 or unevenness of the interface between the diffusion prevention layer 216 and the first magnetic layer 201 are sometimes also influenced by unevenness of the upper surface of the membrane 120. Accordingly, in the present embodiment, unevenness of the interface between the intermediate layer 203 and the first magnetic layer 201 and unevenness of the interface between the diffusion prevention layer 216 and the first magnetic layer 201 due to unevenness of the upper surface of the membrane 120 are suppressed, whereby a thin portion is prevented from occurring in the likes of the intermediate layer 203 or diffusion prevention layer 216, and diffusion of an amorphizing promotion element and crystallization of the magnetization free layer 210 accompanying this diffusion are suppressed.

Next, results of an experiment showing a relationship between unevenness of the upper surface of the membrane 120 and magnetic characteristics of the magnetization free layer 210 will be described with reference to FIGS. 63 to 66.

Figure 63:
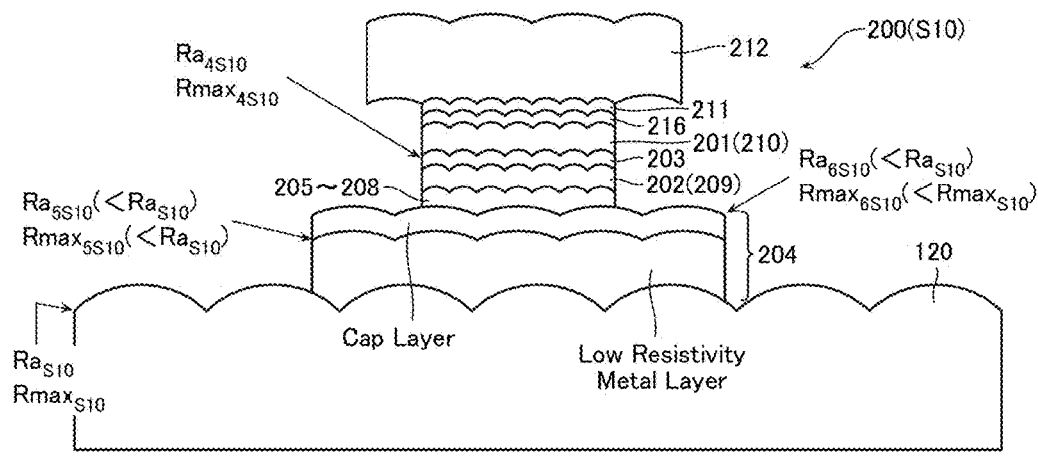
FIG. 63 is a schematic perspective view showing a configuration of an experiment sample of an experiment.
Figure 64:
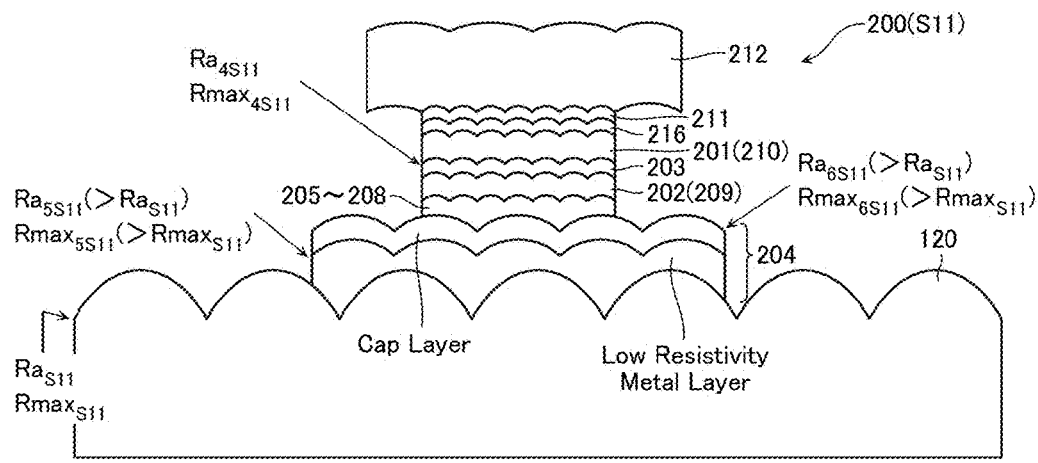
FIG. 64 is a schematic perspective view showing a configuration of another experiment sample of the same experiment.

First, a description of a tenth sample 310 and an eleventh sample S11 used in the present experiment will be given with reference to FIGS. 63 and 64. FIG. 63 is a schematic cross-sectional view showing a configuration of the tenth sample S10. FIG. 64 is a schematic cross-sectional view showing a configuration of the eleventh sample S11.

The tenth sample S10 and the eleventh sample S11 are configured similarly to the first sample S01 shown in FIG. 12, but have mutually different unevenness of the upper surfaces of the lower electrode 204 (or the upper surfaces of the low resistivity metal layer included in the lower electrode 204) That is, in the tenth sample S10, the Ra value Ra$_{5S10}$ and the Rmax value Rmax$_{5S10}$ of the upper surface of the low resistivity metal layer included in the lower electrode 204 and the Ra value Ra$_{6S10}$ and the Rmax$_{S10}$ value Rmax$_{6S10}$ of the upper surface of the lower electrode 204 are smaller than the Ra value Ra$_{S10}$ and the Rmax value Rmax$_{S10}$ of the upper surface of the membrane 120. On the other hand, in the eleventh sample S11, the Ra value Ra$_{5S11}$ and the Rmax value Rmax$_{5311}$ of the upper surface of the low resistivity metal layer included in the lower electrode 204 and the Ra value Ra$_{6S11}$ and the Rmax value Rmax$_{6S11}$ of the upper surface of the lower electrode 204 are larger than the Ra value Ra$_{311}$ and the Rmax value Rmax$_{S11}$ of the upper surface of the membrane 120.

The membrane 120 of the tenth sample S10 is configured from SiO$_x$ (600 nm)/a-Si (500 nm)/AlO$_x$ (80 nm). Moreover, the lower electrode 204 of the tenth sample 310 is configured from Ta (5 nm)/Cu$_{95}$Ag$_5$ (160 nm)/Ta (50 nm). Furthermore, in the tenth sample S10, surface smoothing processing by Ar ion irradiation was performed after deposition of the membrane 120, and CMP processing was performed after deposition of the lower electrode 204. On the other hand, the membrane 120 of the eleventh sample 311 is configured from SiO$_x$ (600 nm)/a-Si (500 nm)/AlO$_x$ (80 nm), similarly to that of the tenth sample 310. Moreover, the lower electrode 204 of the eleventh sample S11 is configured from Ta (5 nm)/Cu (160 nm)/Ta (50 nm). Furthermore, in the eleventh sample S11, surface smoothing processing by Ar ion irradiation was performed after deposition of the membrane 120.

Figure 65:
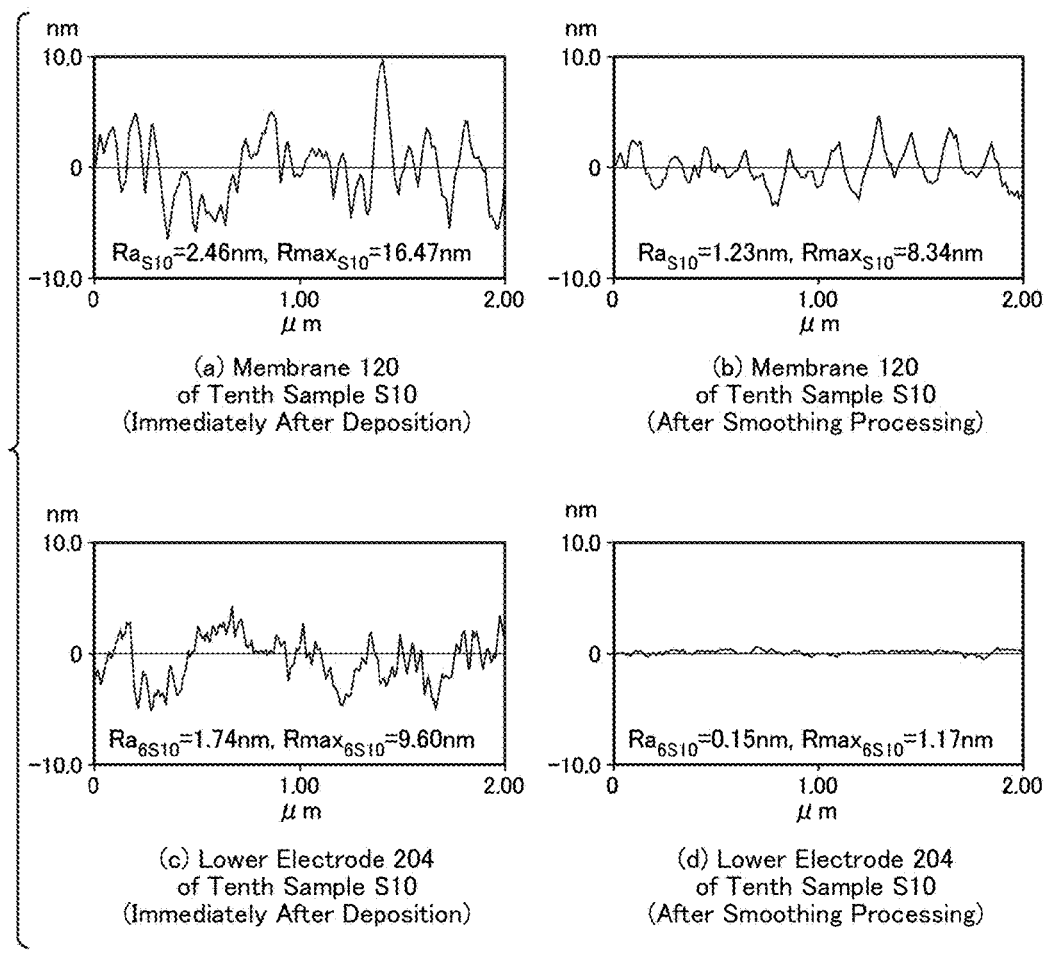
FIG. 65 is a graph showing a result of the same experiment.
Figure 66:
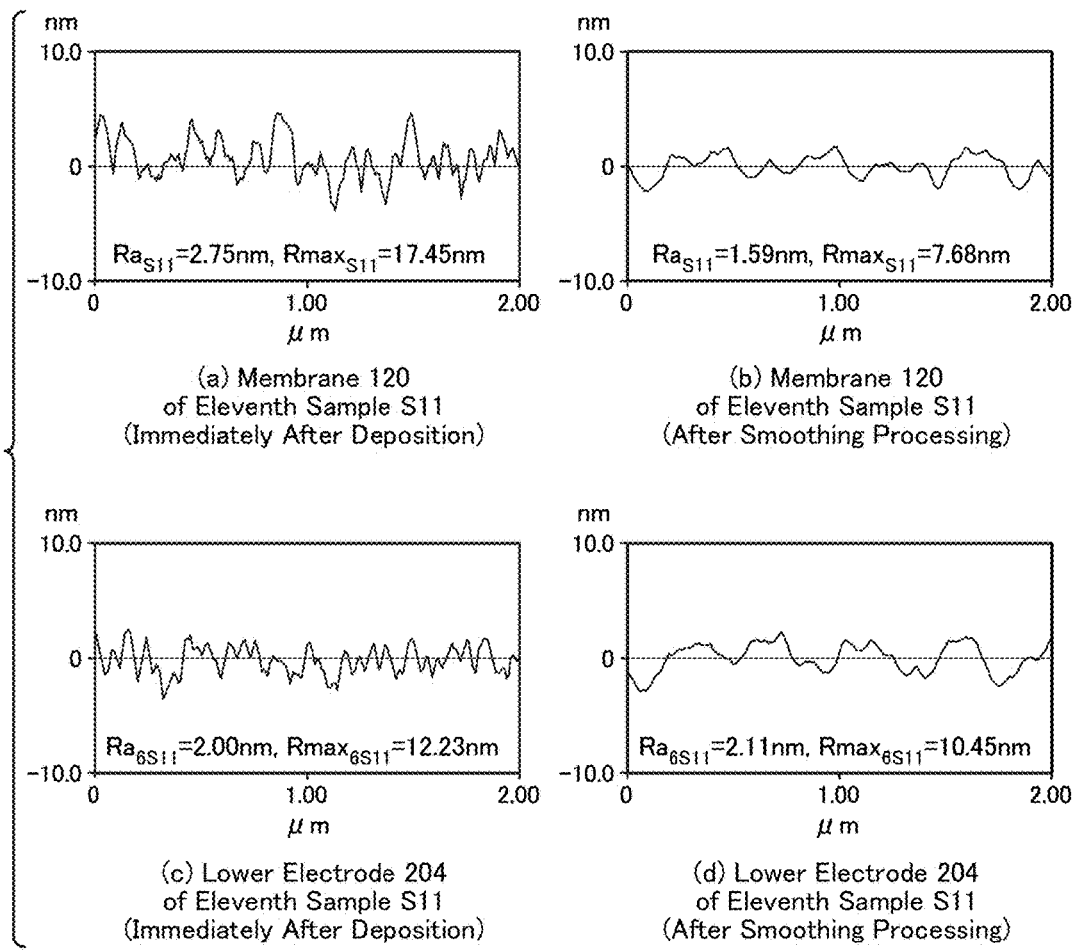
FIG. 66 is a graph showing another result of the same experiment.

Next, as shown in FIGS. 65 and 66, surface unevenness of the membrane 120 and the lower electrode 204 of the tenth sample S10 and the eleventh sample S11 was evaluated by an atomic force microscope. FIG. 65 is a graph showing a height after smoothing processing of the upper surfaces of the membrane 120 and the lower electrode 204 in the tenth sample S10. FIG. 66 is a graph showing a height after smoothing processing of the upper surfaces of the membrane 120 and the lower electrode 204 in the eleventh sample S11.

Part (a) in FIG. 65 is a graph showing the height immediately after deposition of the membrane 120 of the tenth sample S10. Immediately after deposition, the Ra value (Ra$_{S10}$) and the Rmax value (Rmax$_{S10}$) of the upper surface of the membrane 120 of the tenth sample S10 were 2.46 nm and 16.47 nm, respectively. Moreover, part (b) in FIG. 65 is a graph showing the height after smoothing processing of the membrane 120 of the tenth sample S10. After smoothing processing, the Ra value (Ra$_{S10}$) and the Rmax value (Rmax$_{S10}$) of the upper surface of the membrane 120 of the tenth sample S10 were 1.23 nm and 8.34 nm.

Part (c) in FIG. 65 is a graph showing the height immediately after deposition of the lower electrode 204 of the tenth sample 310. Immediately after deposition, the Ra value (Ra$_{6S10}$) and the Rmax value (Rmax$_{6S10}$) of the upper surface of the lower electrode 204 of the tenth sample S10 were 1.74 nm and 9.60 nm, respectively. Moreover, part (d) in FIG. 65 is a graph showing the height after smoothing processing of the lower electrode 204 of the tenth sample S10. After smoothing processing, the Ra value (Ra$_{6310}$) and the Rmax value (Rmax$_{6S10}$) of the upper surface of the lower electrode 204 of the tenth sample S10 were 0.15 nm and 1.17 nm.

It was found from the above that in the tenth sample S10, employing a Cu—Ag alloy in a material of the lower electrode 204 and performing CMP processing on the surface of the lower electrode 204 result in the Ra value and the Rmax value of the surface of the lower electrode 204 (and the upper surface of the low resistivity metal layer included in the lower electrode 204) being kept smaller than those of the membrane 120.

Part (a) in FIG. 66 is a graph showing the height immediately after deposition of the membrane 120 of the eleventh sample S11. Immediately after deposition, the Pa value (Ra$_{S11}$) and the Rmax value (Rmax$_{311}$) of the upper surface of the membrane 120 of the eleventh sample S11 were 2.75 nm and 17.45 nm, respectively. Moreover, part (b) in FIG. 66 is a graph showing the height after smoothing processing of the membrane 120 of the eleventh sample S11. After smoothing processing, the Pa value (Ra$_{311}$) and the Rmax value (Rmax$_{S11}$) of the upper surface of the membrane 120 of the eleventh sample S11 were 1.59 nm and 7.68 nm, respectively.

Part (c) in FIG. 66 is a graph showing the height immediately after deposition of the lower electrode 204 of the eleventh sample 311. Immediately after deposition, the Ra value (Ra$_{6S11}$) and the Rmax value (Rmax$_{6311}$) of the upper surface of the lower electrode 204 of the eleventh sample S11 were 2.00 nm and 12.23 nm, respectively. Moreover, part (d) in FIG. 66 is a graph showing the height after smoothing processing of the lower electrode 204 of the eleventh sample S11. After smoothing processing, the Ra value (Ra$_{6S11}$) and the Rmax value (Rmax$_{6S11}$) of the upper surface of the lower electrode 204 of the eleventh sample S11 were 2.11 nm and 10.45 nm, respectively.

It was found from the above that in the eleventh sample S11, the Ra value and the Rmax value of the surface of the lower electrode 204 become larger than those of the surface of the membrane 120, in spite of smoothing by Ar ion Irradiation being performed on the surface of the lower electrode 204.

Next, measurement of coercivity Hc and the gauge factor GF was performed for the tenth sample S10 and the eleventh sample S11. As a result, in the tenth sample S10 in which unevenness of the upper surface of the lower electrode 204 (or the upper surface of the low resistivity metal layer included in the lower electrode 204) is smaller than unevenness of the upper surface of the membrane 120, a low coercivity Hc of 3 Oe and a high gauge factor GF could be confirmed. On the other hand, in the eleventh sample S11 in which unevenness of the upper surface of the lower electrode 204 (or the upper surface of the low resistivity metal layer included in the lower electrode 204) is larger than unevenness of the upper surface of the membrane 120, a comparatively high coercivity Hc of 4.5 Oe and a low gauge factor GF were confirmed. This is conceivably due to the following kinds of reasons. That is, as explained with reference to FIGS. 65 and 66, magnitude of unevenness of the upper surface of the membrane 120 sometimes influences magnitude of unevenness of the upper surface of the lower electrode 204. Moreover, as explained in the first embodiment, magnitude of unevenness of the upper surface of the lower electrode 204 conceivably influences magnitude of unevenness of the interface between the intermediate layer 203 and the magnetization free layer 210. It is therefore conceivable that when unevenness of the upper surface of the lower electrode 204 (or the upper surface of the low resistivity metal layer included in the lower electrode 204) is large, unevenness of the interface between the intermediate layer 203 and the magnetization free layer 210 also increases, with an end result that diffusion of an amorphizing promotion element and acceleration of crystallization of the magnetization free layer 210 accompanying this diffusion, occur. In order to obtain a strain detection element 200 having a high gauge factor, the third embodiment suppresses surface unevenness of the membrane 120 by the lower electrode 204, and reduces the influence exerted by unevenness of the membrane 120 on unevenness of the interface between the intermediate layer 203 and the magnetization free layer 210.

4. Fourth Embodiment

Figure 67:
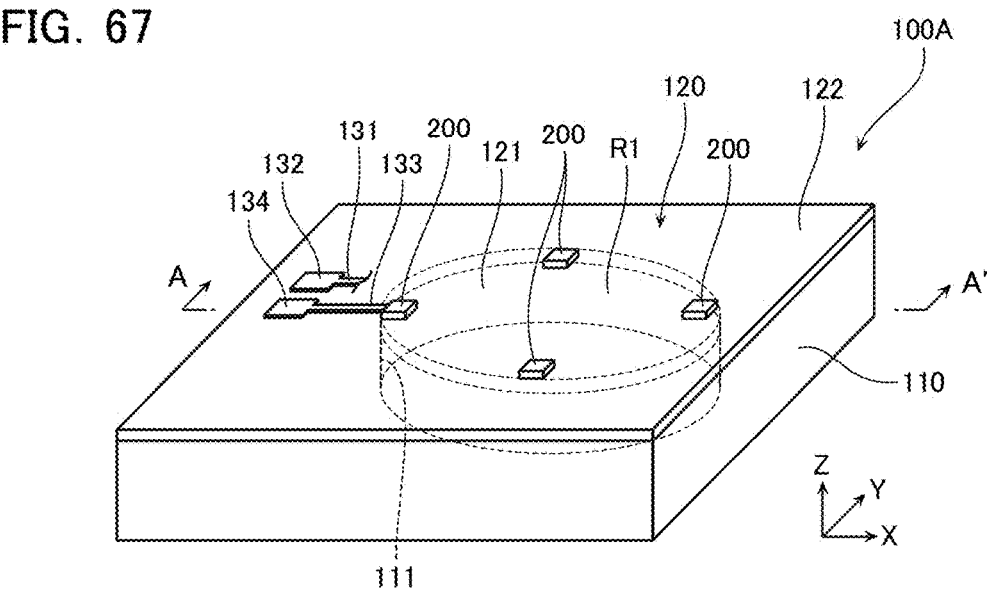
FIG. 67 is a schematic perspective view showing a configuration of a pressure sensor according to a fourth embodiment.
Figure 68:
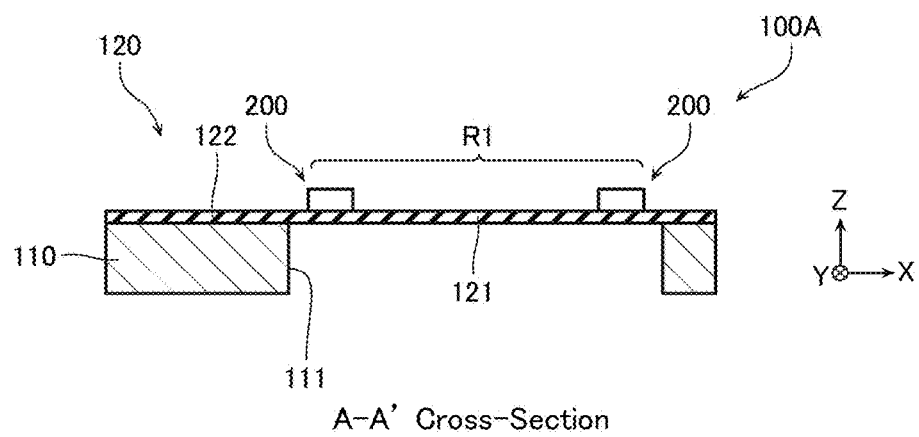
FIG. 68 is a schematic cross-sectional view showing the configuration of the same pressure sensor.

Next, configuration examples of a pressure sensor installed with the strain detection elements 200 according to the first through third embodiments will be described. FIG. 67 is a schematic perspective view showing a configuration of a pressure sensor 100 according to the present embodiment; FIG. 68 is a schematic cross-sectional view looking from the line A-A' of FIG. 67; and FIG. 69 is a schematic plan view showing the configuration of the pressure sensor 100.

As shown in FIG. 67, the pressure sensor 100 includes: a substrate 110; a membrane 120 provided to one of surfaces of the substrate 110; and a strain detection element 200 provided above the membrane 120. The strain detection element 200 is the strain detection element 200 according to the first or second embodiment. The strain detection element 200 is provided above the membrane 120 to a part thereof. Moreover, the membrane 120 has provided thereon a wiring line 131, a pad 132, a wiring line 133, and a pad 134 connected to the strain detection element 200.

As shown in FIG. 68, the substrate 110 is a plate-like substrate including a hollow portion 111, and functions as a support supporting the membrane 120 such that the membrane 120 is deformed in response to an external pressure. In the present embodiment, the hollow portion 111 is a cylindrical hole penetrating the substrate 110. The substrate 110 is configured from, for example, a semiconductor material such as silicon, a conductive material such as a metal, or an insulating material. Moreover, the substrate 110 may include the likes of silicon oxide or silicon nitride, for example.

The inside of the hollow portion 111 is designed to allow the membrane 120 to be bent. For example, the inside of the hollow portion 111 may be in a decompressed state or a vacuum state. Moreover, the inside of the hollow portion 111 may be filled with a gas such as air, or a liquid. Furthermore, the hollow portion 111 may be in communication with external.

As shown in FIG. 68, the membrane 120 is formed thinly compared to the substrate 110. Moreover, the membrane 120 includes: a vibrating portion 121 that is positioned directly above the hollow portion 111 and that is deformed in response to an external pressure; and a supported portion 122 that is formed integrally with the vibrating portion 121 and that is supported by the substrate 110. As shown in, for example, FIG. 69A, the supported portion 122 surrounds the vibrating portion 121. Hereafter, a region positioned directly above the hollow portion 111 of the membrane 120 will be called a first region R1.

Figure 69A:
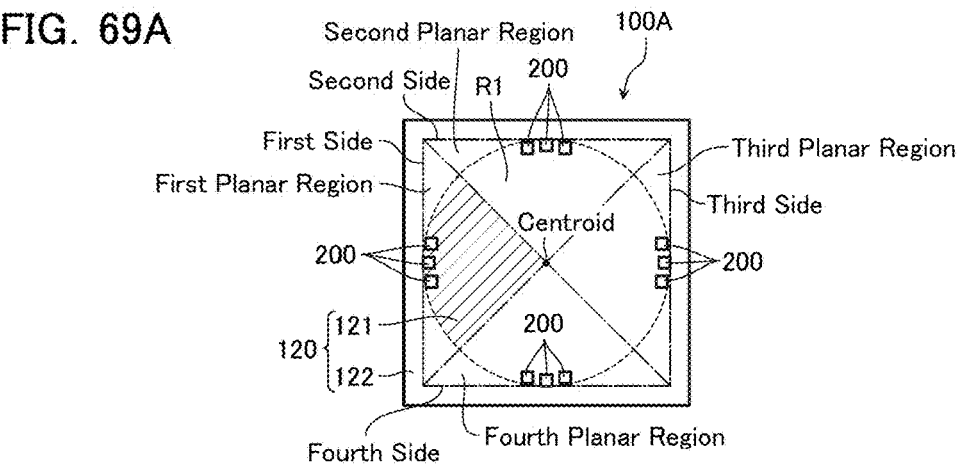
FIGS. 69A-69F are schematic plan views showing the configuration of the same pressure sensor.
Figure 69B:
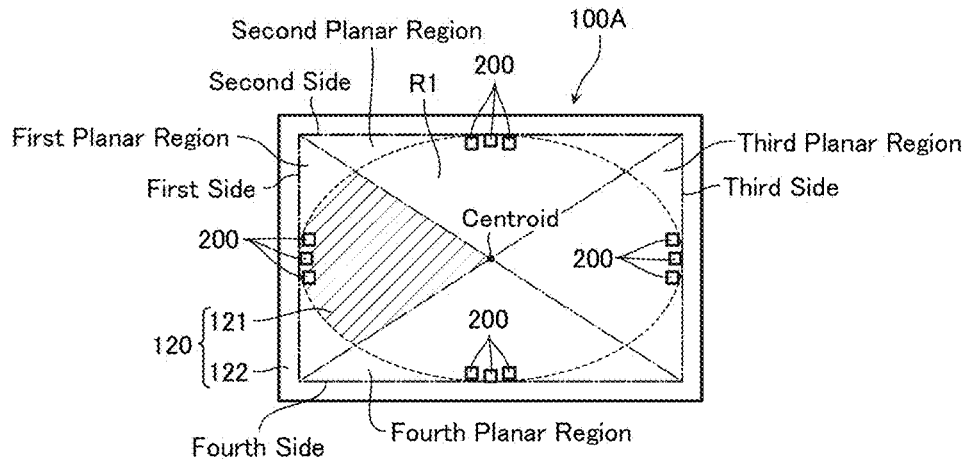
Figure 69C:
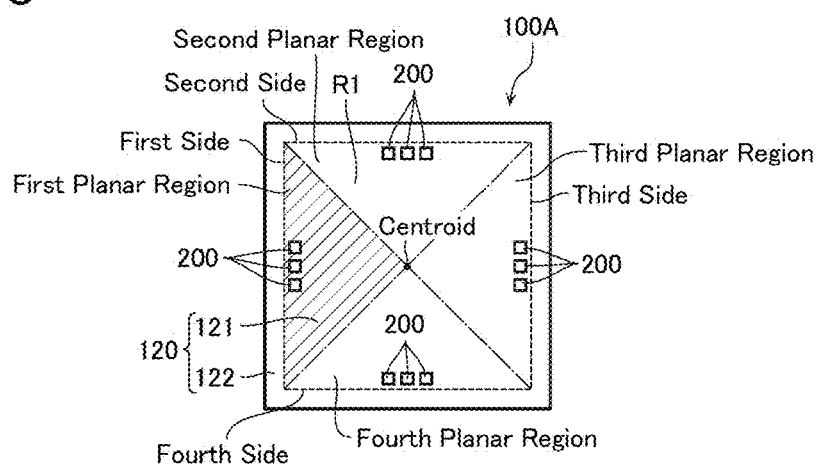
Figure 69D:
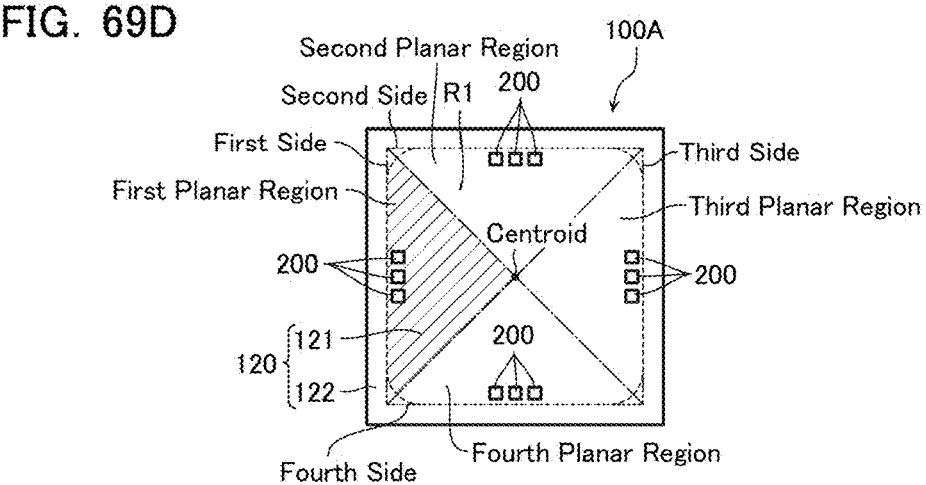
Figure 69E:
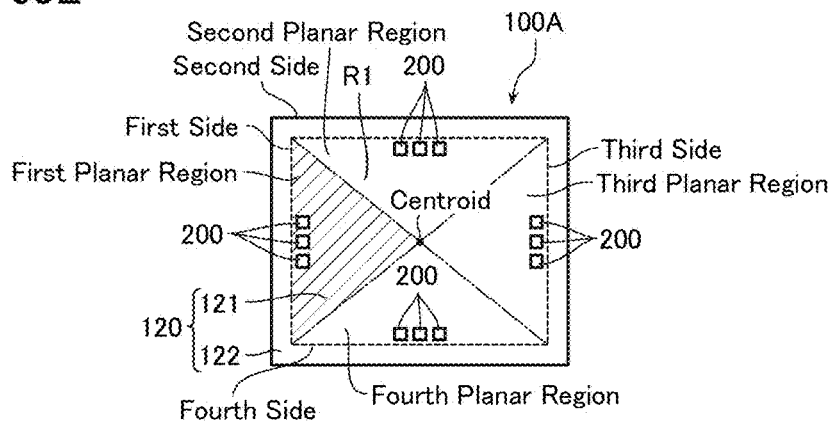
Figure 69F:
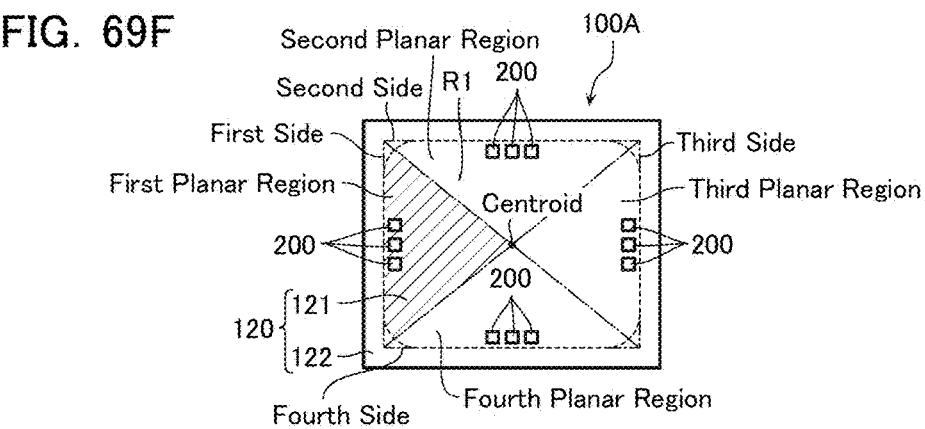

The first region R1 may be formed in a variety of forms. For example, the first region R1 may be formed in a substantially perfectly circular shape as shown in FIG. 69A, may be formed in an elliptical shape (for example, a flattened circular shape) as shown in FIG. 69B, may be formed in a substantially square shape as shown in FIG. 69C, or may be formed in a rectangular shape as shown in FIG. 69E. Moreover, in the case where, for example, the first region R1 is formed in a substantially square shape or a substantially rectangular shape, the four corner portions may also be formed rounded as shown in FIG. 69D or 69F. Furthermore, the first region R1 may also be formed as a polygon or regular polygon.

Employable in a material of the membrane 120 is, for example, an insulating material such as $SiO_x$ or $SiN_x$, a flexible plastic material of the likes of a polyimide or paraxylene system polymer, and so on. Moreover, at least one of, for example, silicon oxide, silicon nitride, and silicon oxynitride may be included in the material of the membrane 120. Additionally employable in the material of the membrane 120 are, for example, a semiconductor material such as silicon, or a metal material such as Al.

The membrane 120 is formed thinly compared to the substrate 110. A thickness (width in the Z direction) of the membrane 120 is, for example, not less than 0.1 micrometers (μm) and not more than 3 μm. The thickness of the membrane 120 is preferably not less than 0.2 μm and not more than 1.5 μm. Employable in the membrane 120 is, for example, a stacked body of a silicon oxide film having a thickness of 0.2 nm and a silicon film having a thickness of 0.4 μm. A diameter (planar dimension) of the membrane 120 may be set to equal to or not less than 50 μm and equal to or not more than 1000 μm.

As shown in FIG. 69, a plurality of the strain detection elements 200 can be disposed within the first region R1 above the membrane 120. Moreover, the strain detection elements 200 are each disposed along an outer periphery of the first region R1. That is, in the examples shown in FIG. 69, distances (shortest distances Lmin) between each of the plurality of strain detection elements 200 and the outer periphery of the first region R1 are the same as each other. The number of strain detection elements 200 disposed within the first region R1 above the membrane 120 may be one.

As shown in, for example, FIGS. 69A and 69B, when the outer periphery of the first region R1 is a curve, the strain detection elements 200 are disposed along that curve. Moreover, as shown in, for example, FIGS. 69C and 69D, when the outer periphery of the first region R1 is a straight line, the strain detection elements 200 are disposed linearly along that straight line.

Moreover, although mentioned in detail later, in FIG. 69, a rectangle circumscribed above the membrane 120 (the rectangle formed by a first side through a fourth side in the drawings, hereafter called "minimum circumscribed rectangle") and diagonal lines of this rectangle are shown by dotted-and-dashed lines. Assuming that regions above the membrane 120 divided by these minimum circumscribed rectangle and dotted-and-dashed lines are called first through fourth planar regions, the plurality of strain detection element 200 are disposed along the outer periphery of the first region R1 within the first through fourth planar regions.

The strain detection element 200 is connected to the pad 132 via the wiring line 131 and to the pad 134 via the wiring line 133, shown in FIG. 67. When detection of pressure is performed by the pressure sensor 100, a voltage is applied to the strain detection element 200 via these pads 132 and 134 and the electrical resistance value of the strain detection element 200 is measured. Note that an inter-layer insulating layer may be provided between the wiring line 131 and the wiring line 133.

When, for example, a configuration including the lower electrode 204 and the upper electrode 212 such as in the strain detection element 200A shown in FIG. 4, is adopted as the strain detection element 200, the wiring line 131 is connected to the lower electrode 204 and the wiring line 133 is connected to the upper electrode 212, for example. On the other hand, when, for example, adopting a configuration that includes two lower electrodes 204 and does not include an upper electrode or a configuration that includes two upper electrodes 212 and does not include a lower electrode, the wiring line 131 is connected to one of the lower electrodes 204 or upper electrodes 232 and the wiring line 133 is connected to the other of the lower electrodes 204 or upper electrodes 212. Note that the plurality of strain detection elements 200 may be connected in series or in parallel via a wiring line not illustrated. As a result, SN ratio can be increased.

A size of the strain detection element 200 may be extremely small. Area in an XY plane of the strain detection element 200 may be set sufficiently smaller than area of the first region P1. For example, area of the strain detection element 200 may be set to 1/5 or less of area of the first region R1. For example, area of the first magnetic layer 201 included in the strain detection element 200 may be set to 1/5 or less of area of the first region R1. Connecting the plurality of strain detection elements 200 in series or in parallel makes it possible to achieve a high gauge factor or a high SN ratio even when a strain detection element 200 which is sufficiently smaller than area of the first region R1 is employed.

When, for example, the diameter of the first region R1 is about 60 µm, a first dimension of the strain detection element 200 (or the first magnetic layer 201) may be set to 12 µm or less. When, for example, the diameter of the first region R1 is about 600 µm, the dimension of the strain detection element 200 (or the first magnetic layer 201) may be set to 120 µm or less. If processing accuracy, and so on, of the strain detection element 200 is considered, there is no need for the dimension of the strain detection element 200 (or the first magnetic layer 201) to be set excessively small. Therefore, the dimension of the strain detection element 200 (or the first magnetic layer 201) may be set to, for example, not less than 0.05 µm and not more than 30 µm.

Note that in the examples shown in FIGS. 67 to 69, the substrate 110 and the membrane 120 are configured as separate bodies, but the membrane 120 may be formed integrally with the substrate 110. Moreover, the membrane 120 may employ the same material as that of the substrate 110 or may employ a different material from that of the substrate 110. When the membrane 120 is formed integrally with the substrate 110, a thinly formed portion of the substrate 110 becomes the membrane 120 (the vibrating portion 121). Furthermore, the vibrating portion 121 may be supported continuously along the outer periphery of the first region R1 as shown in FIGS. 67 to 69, or may be supported by part of the outer periphery of the first region R1.

Moreover, in the examples shown in FIG. 69, a plurality of the strain detection elements 200 are provided above the membrane 120, but, for example, only one strain detection element 200 may be provided above the membrane 120.

Next, results of a simulation performed for the pressure sensor 100 will be described with reference to FIGS. 70 to 72. In this simulation, the strain ε at each position above the membrane 120 is calculated when a pressure is applied to the membrane 120. This simulation is performed by dividing the surface of the membrane 120 into a plurality by finite element analysis and applying Hooke's law to each divided element.

Figure 70:
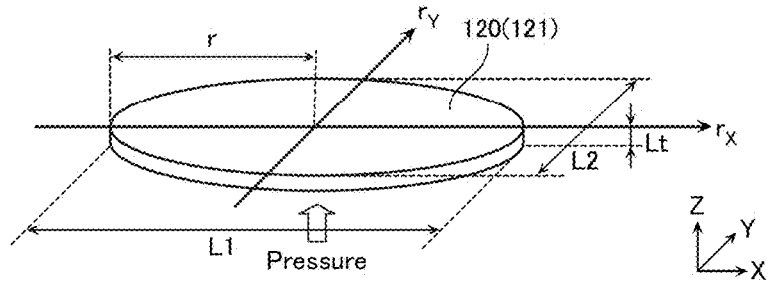
FIG. 70 is a schematic perspective view for explaining the configuration of the same pressure sensor.

FIG. 70 is a schematic perspective view for explaining a model employed in the simulation. As shown in FIG. 70, in the simulation, the vibrating portion 121 of the membrane 120 was assumed to be circular. Moreover, a diameter L1 (diameter L2) of the vibrating portion 121 was assumed to be 50 µm, and a thickness Lt of the membrane 120 was assumed to be 2 µm. Furthermore, the outer periphery of the vibrating portion 121 was assumed to be a completely restricted fixed end.

Note that in the simulation, silicon is assumed as the material of the membrane 120. Therefore, the membrane 120 was assumed to have a Young's modulus of 165 GPa and a Poisson's ratio of 0.22.

Furthermore, as shown in FIG. 70, the pressure was assumed to be applied from a lower surface of the membrane 120, a magnitude of the pressure was assumed to be 13.33 kPa, and the pressure was assumed to be applied uniformly to the vibrating portion 121. In the finite element method, the vibrating portion 121 was divided with a mesh size of 5 µm in the XY plane and was divided with a spacing of 2 µm in the Z direction.

Next, results of the simulation will be described with reference to FIGS. 71 and 72. FIG. 71 is a graph showing results of the simulation, the vertical axis indicating the strain ε and the horizontal axis indicating a value rx/r which is a distance rx from a center of the vibrating portion 121 standardized by a radius r. Note that in FIG. 71, a strain in the tensile direction is assumed to be a strain in a positive direction, and a strain in the compressive direction is assumed to be a strain in a negative direction.

Figure 71:
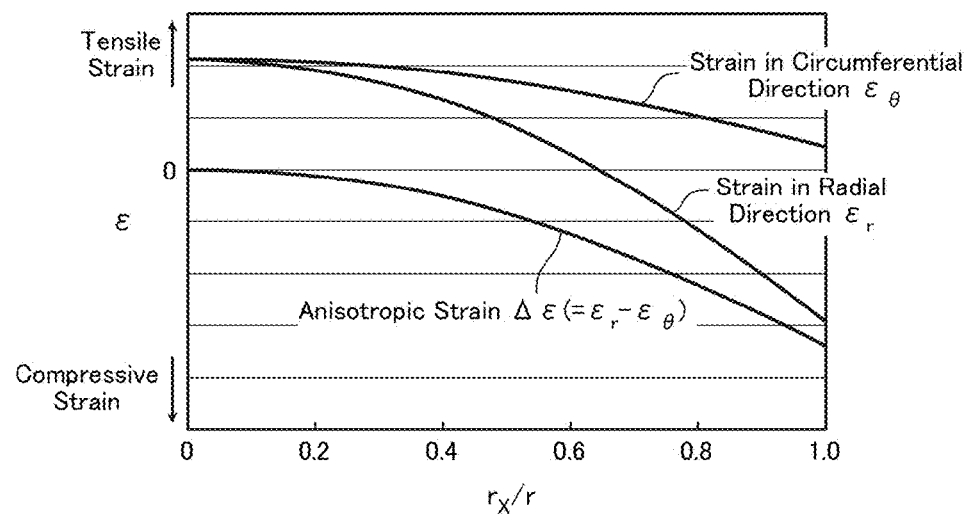
FIG. 71 is a graph for explaining the configuration of the same pressure sensor.

FIG. 71 shows a strain $\varepsilon_r$ in a radial direction (X direction), a strain $\varepsilon_\theta$ in a circumferential direction, and an anisotropic strain $\Delta\varepsilon$ ($=\varepsilon_r-\varepsilon_\theta$) which is a difference between these strains. Note that the change in the magnetization direction of the first magnetic layer 201 due to the reverse magnetostriction effect of the kind described with reference to FIG. 3 is contributed to by this anisotropic strain $\Delta\varepsilon$.

As shown in FIG. 71, close to a center of the vibrating portion 121 deformed in a convex shape, the strain $\varepsilon_r$ in the radial direction and the strain $\varepsilon_\theta$ in the circumferential direction are tensile strains. In contrast, close to an outer periphery deformed in a concave shape, the strain $\varepsilon_r$ in the radial direction and the strain $\varepsilon_\theta$ in the circumferential direction are compressive strains. Close to the center, the anisotropic strain $\Delta\varepsilon$ is zero, that is, the anisotropic strain $\Delta\varepsilon$ is an isotropic strain. Close to the outer periphery, the anisotropic strain $\Delta\varepsilon$ shows a compressive value, and immediately adjacent to the outer periphery, a largest anisotropic strain is obtained. In the circular vibrating portion 121, this anisotropic strain $\Delta\varepsilon$ is always similarly obtained with respect to the radial direction from the center. Therefore, disposing the strain detection element 200 close to the outer periphery of the vibrating portion 121 makes it possible to perform detection of strain with good sensitivity. Thus, the strain detection element 200 can be disposed at a part close to the outer periphery of the vibrating portion 121.

Figure 72:
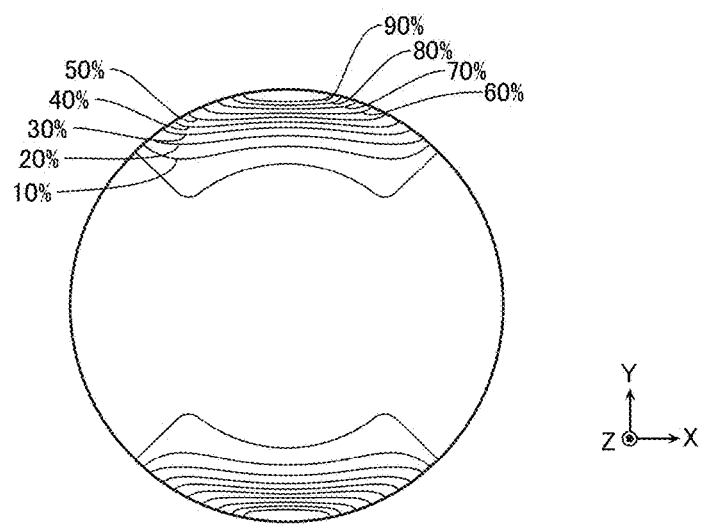
FIG. 72 is a contour diagram for explaining the configuration of the same pressure sensor.

FIG. 72 is a contour diagram showing a distribution in the XY plane of the anisotropic strain $\Delta\varepsilon$ occurring in the vibrating portion 121. FIG. 72 exemplifies a result of converting the anisotropic strain $\Delta\varepsilon$ ($\Delta\varepsilon_{r\text{-}\theta}$) in a polar coordinate system shown in FIG. 71 to an anisotropic strain $\Delta\varepsilon$ ($\Delta\varepsilon_{X\text{-}Y}$) in a Cartesian coordinate system, and analyzing on an entire surface of the vibrating portion 121.

In FIG. 72, lines shown by the characters "90%" to "10%" indicate positions where anisotropic strains $\Delta\varepsilon$ that are respectively 90% to 10% of a value (absolute value) of the largest anisotropic strain $\Delta\varepsilon_{X\text{-}Y}$ immediately adjacent to the outer periphery of the vibrating portion 121, are obtained. As shown in FIG. 72, anisotropic strains $\Delta\varepsilon_{X\text{-}Y}$ of similar magnitude are obtained in a limited region.

Now, when a plurality of the strain detection elements 200 are provided above the membrane 120 as shown in, for example, FIG. 69A, the magnetization directions of the magnetization fixed layers are aligned in a magnetic field-accompanied annealing direction aimed at pin fixation, hence are directed in an identical direction. Therefore, the strain detection elements 200 are desirably disposed within a range where anisotropic strain of a substantially uniform magnitude occurs.

In this regard, the strain detection element 200 shown in the first embodiment can achieve a high gauge factor (strain detection sensitivity) even when made comparatively small. Therefore, the strain detection element 200 can be disposed within a range where anisotropic strain of a substantially uniform magnitude occurs, and a high gauge factor can be obtained, even when the dimension of the membrane 120 is small. Moreover, when a plurality of the strain detection elements 200 are disposed above the membrane 120 and it is attempted to obtain a similar change in electrical resistance (for example, polarity, and so on) with respect to pressure, the strain detection elements 200 are preferably disposed closely adjacently in a region close to the outer periphery where a similar anisotropic strain $\Delta\varepsilon_{X-Y}$ is obtained as shown in FIG. 72. Because the strain detection element 200 shown in the first embodiment can achieve a high gauge factor (strain detection sensitivity) even when made comparatively small, it becomes possible for a large number of the strain detection elements 200 to be disposed in the region close to the outer periphery where a similar anisotropic strain $\Delta\varepsilon_{X-Y}$ is obtained.

A plurality of junctions of the strain detection element 200 configured from the first magnetic layer 201/intermediate layer 203/second magnetic layer 202 can be set and these junctions connected in series. When the number of strain detection elements 200 of the plurality of strain detection elements 200 connected in series is assumed to be N, an electrical signal obtained is N times that obtained when the number of strain detection elements 200 is one. On the other hand, thermal noise and Schottky noise are $N^{1/2}$ times. That is, SN ratio (signal-noise ratio: SNR) is $N^{1/2}$ times. Increasing the number N of strain detection elements 200 connected in series makes it possible to improve SN ratio without increasing size of the vibrating portion 121 of the membrane 120. When a plurality of junctions of the strain detection element 200 configured from the first magnetic layer 201/intermediate layer 203/second magnetic layer 202 are disposed and connected above the membrane 120, disposing the plurality of junctions closely adjacently in the region close to the outer periphery where a similar anisotropic strain $\Delta\varepsilon_{X-Y}$ is obtained makes it possible to align signal-to-pressure of the plurality of strain detection elements 200, hence making it possible to achieve a pressure sensor with a high SN ratio from the previously mentioned effects.

Now, as described with reference to FIG. 69, a plurality of the strain detection elements 200 according to the present embodiment are disposed along the outer periphery of the first region R1 within the first through fourth planar regions. Therefore, a uniform strain can be detected by the plurality of strain detection elements 200 disposed within the first through fourth planar regions.

Moreover, in the specification of the present application, disposing detection elements "closely adjacently" refers to the following kinds of cases.

FIGS. 69A to 69F are schematic views showing examples of disposition of the strain detection element 200 above the membrane 120, and exemplify element disposition regions in the case where a plurality of the strain detection elements 200 are disposed closely adjacently.

As expressed in FIG. 69A, when the first region R1 is projected on a plane (for example, the X-Y plane) parallel to the membrane 120, the above-mentioned minimum circumscribed rectangle can be formed. The minimum circumscribed rectangle circumscribes the shape of the vibrating portion 121. The shape of the first region R1 is, for example, a shape having the outer periphery of the vibrating portion 121 shown by a dotted line in FIG. 69 projected on the surface parallel to the membrane 120. In this example, a planar shape of the first region R1 is circular. Therefore, the minimum circumscribed rectangle is a square.

As shown in FIG. 69A, the minimum circumscribed rectangle includes the first side, the second side, the third side, and the fourth side. The second side separates from the first side. The third side is connected to one end of the first side and one end of the second side. The fourth side is connected to the other end of the first side and the other end of the second side, and separates from the third side. Moreover, the minimum circumscribed rectangle has a centroid. For example, the centroid overlaps a centroid of the vibrating portion 121.

As mentioned above, the minimum circumscribed rectangle includes the first planar region, the second planar region, the third planar region, and the fourth planar region. The first planar region is a region surrounded by a line segment joining the centroid and one end of the first side, a line segment joining the centroid and the other end of the first side, and the first side. The second planar region is a region surrounded by a line segment joining the centroid and one end of the second side, a line segment joining the centroid and the other end of the second side, and the second side. The third planar region is a region surrounded by a line segment joining the centroid and one end of the third side, a line segment joining the centroid and the other end of the third side, and the third side. The fourth planar region is a region surrounded by a line segment joining the centroid and one end of the fourth side, a line segment joining the centroid and the other end of the fourth side, and the fourth side.

As expressed in FIG. 69A, a portion overlapping the first planar region of the first region R1 (a portion shown by slanting lines in the drawing) has a plurality of the strain detection elements 200 provided thereon. For example, positions of each of at least two of the plurality of strain detection elements 200 provided in the region overlapping the first planar region of the first region R1 are different from each other in a direction parallel to the first side of the minimum circumscribed rectangle. Disposing in this way makes it possible to dispose a large number of strain detection elements 200 in the region of the outer periphery where a similar anisotropic strain $\Delta\varepsilon_{X-Y}$ is obtained.

The minimum circumscribed rectangle can also be defined when the planar shape of the vibrating portion 121 is a flattened circle as in FIG. 69B. The minimum circumscribed rectangle can also be defined when the planar shape of the vibrating portion 121 is a square as in FIG. 69C. In this case, a planar shape of the minimum circumscribed rectangle is the same square as the membrane. The minimum circumscribed rectangle can also be defined when a curved (or linear) corner portion is provided in the vibrating portion 121 in the case that the planar shape of the vibrating portion 121 is a square, as in FIG. 69D. The minimum circumscribed rectangle can also be defined when the planar shape of the vibrating portion 121 is a rectangle as in FIG. 69E. In this case, the planar shape of the minimum circumscribed rectangle is the same rectangle as the supported portion 122. The minimum circumscribed rectangle can also be defined when a curved (or linear) corner portion is provided in the vibrating portion 121 in the case that the planar shape of the vibrating portion 121 is a rectangle, as in FIG. 69F. Then, the first planar region through fourth planar region can be defined.

Disposing the strain detection elements 200 closely adjacently in the above-mentioned kinds of regions makes it possible to dispose a large number of strain detection elements 200 in the region close to the outer periphery where a similar anisotropic strain $\Delta\varepsilon_{X-Y}$ is obtained.

Next, other configuration examples of the pressure sensor 100 will be described with reference to FIG. 73. FIG. 73 includes plan views showing the other configuration examples of the pressure sensor 100. The pressure sensors 100 shown in FIG. 73 are configured substantially similarly to the pressure sensors 100 shown in FIG. 69, but differ in that the first magnetic layer 201 included in the strain detection element 200 is formed in a substantially rectangular shape, not in a substantially square shape.

Figure 73A:
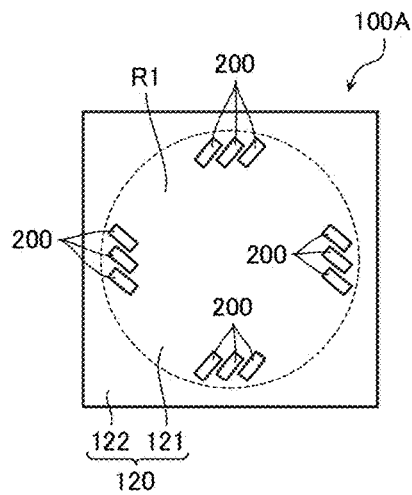
FIGS. 73A-73E are schematic plan views showing the configuration of the same pressure sensor.
Figure 73B:
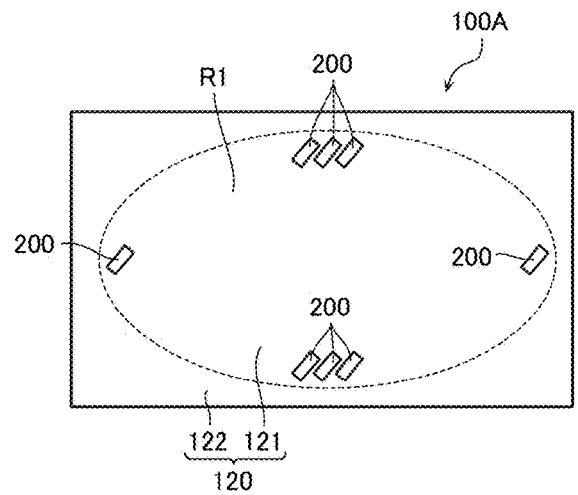

FIG. 73A shows a mode in which the vibrating portion 121 of the membrane 120 has a substantially circular shape; FIG. 73B shows a mode in which the vibrating portion 121 of the membrane 120 has a substantially elliptical shape; FIG. 73D shows a mode in which the vibrating portion 121 of the membrane 120 has a substantially square shape; and FIG. 73E shows a mode in which the vibrating portion 121 of the membrane 120 has a substantially rectangular shape. Moreover, FIG. 73C is an enlarged view of part of FIG. 73B.

Figure 73C:
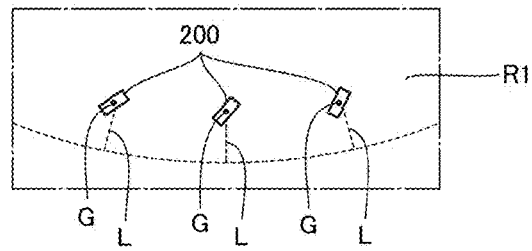
Figure 73D:
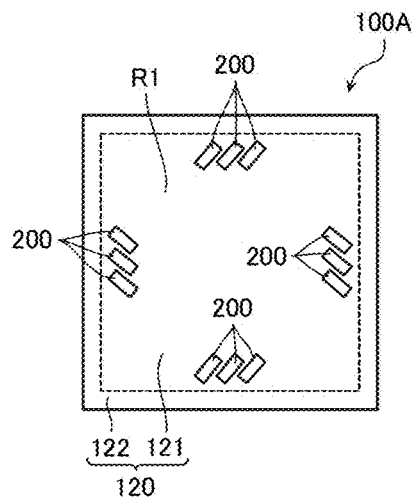
Figure 73E:
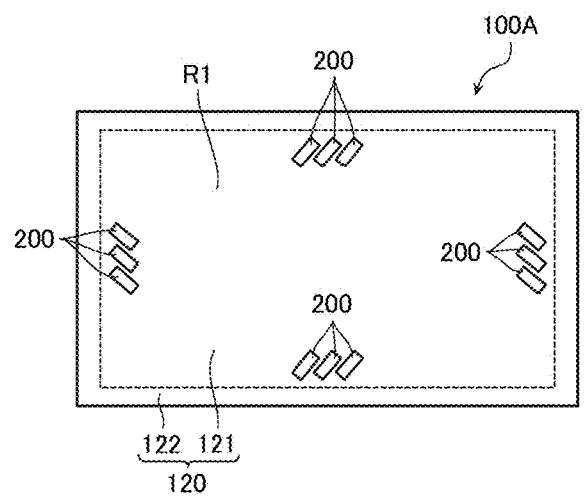

As shown in FIG. 73C, the membrane 120 has a plurality of the strain detection elements 200 disposed thereon along the outer periphery of the first region R1. Now, if a straight line joining a centroid G of the strain detection element 200 and the outer periphery of the first region P1 by a shortest distance is assumed to be a straight line L, then an angle between a direction of this straight line L and a longer direction of the first magnetic layer 201 included in the strain detection element 200 is set to be greater than 0° and less than 90°.

As mentioned above, when the first magnetic layer 201 included in the strain detection element 200 has been made in a shape having magnetic shape anisotropy, such as a rectangular shape or an elliptical shape, the initial magnetization direction of the magnetization free layer 210 can be set to the longer direction. Moreover, the direction of the straight line L shown in FIG. 73C indicates the direction of the strain occurring in the strain detection element 200. Therefore, setting the angle between the direction of this straight line L and the longer direction of the first magnetic layer 201 included in the strain detection element 200 greater than 0° and less than 90 makes it possible to adjust the initial magnetization direction of the magnetization free layer 210 and the direction of the strain occurring in the strain detection element 200, and thereby manufacture a pressure sensor responsive to positive/negative pressure. Note that this angle is more preferably not less than 30° and not more than 60°.

Moreover, if a difference between a maximum value and a minimum value of the above-mentioned angle is set to be 5° or less, for example, then similar pressure-electrical resistance characteristics can be obtained by the plurality of strain detection elements 200.

Note that in the examples shown in FIG. 73, the pressure sensors 100 include a plurality of strain detection elements 200, but may include only one.

Figure 74A:
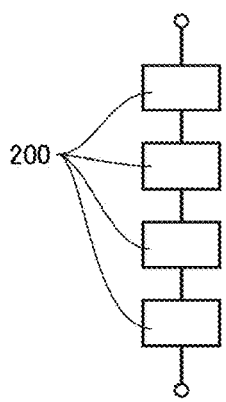
FIGS. 74A-74D are schematic circuit diagrams showing the configuration of the same pressure sensor.
Figure 74B:
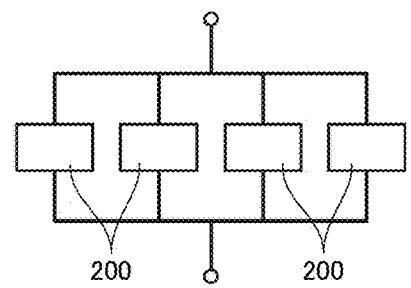
Figure 74C:
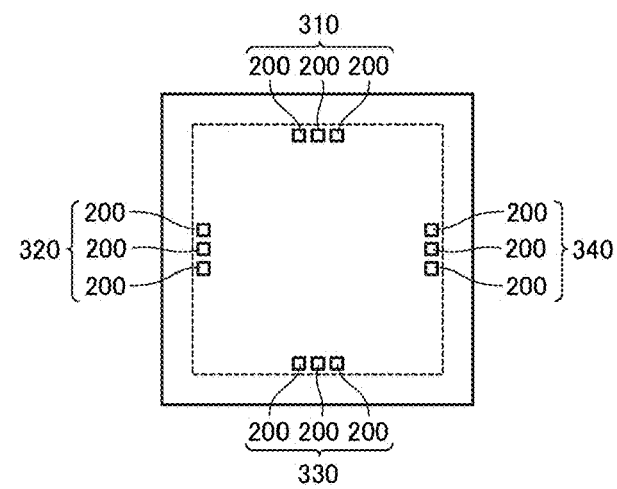
Figure 74D:
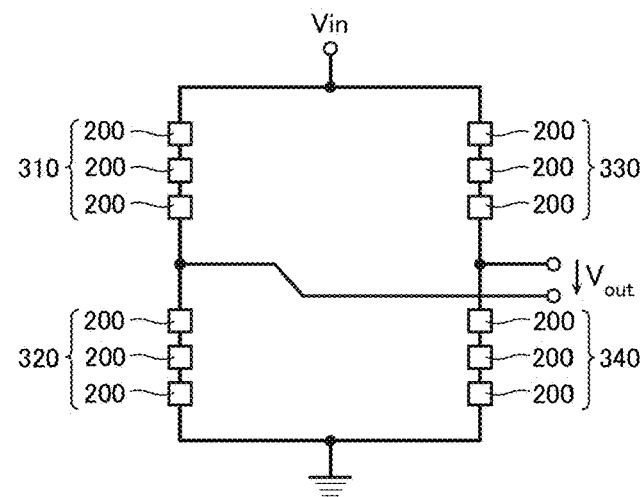

Next, a wiring line pattern of the strain detection element 200 will be described with reference to FIG. 74. FIGS. 74A, 74B, and 74D are circuit diagrams for explaining the wiring line pattern of the strain detection element 200. Moreover, FIG. 74C is a schematic plan view for explaining the wiring line pattern of the strain detection element 200.

When a plurality of strain detection elements 200 are provided in the pressure sensor 100, all of the strain detection elements 200 may be connected in series as shown in FIG. 74A, for example. Now, a bias voltage of the strain detection element 200 is, for example, not less than 50 millivolts (mV) and not more than 150 mV. When N strain detection elements 200 are connected in series, the bias voltage becomes not less than 50 mV×N and not more than 150 mv×N. For example, when the number N of strain detection elements connected in series is 25, the bias voltage is not less than 1 V and not more than 3.75 V.

If a value of the bias voltage is 1 V or more, then design of an electrical circuit processing an electrical signal obtained from the strain detection element 200 becomes easy, which is preferable practically. On the other hand, if the bias voltage (inter-terminal voltage) exceeds 10 V, it is not desirable for the electrical circuit processing the electrical signal obtained from the strain detection element 200. In the present embodiment, the number N of the strain detection elements 200 connected in series and the bias voltage are set for there to be an appropriate voltage range.

For example, the voltage when a plurality of the strain detection elements 200 are electrically connected in series is preferably not less than 1. V and not more than 10 V. For example, the voltage applied between terminals (between a terminal at one end and a terminal at the other end) of a plurality of the strain detection elements 200 electrically connected in series is not less than 1 V and not more than 10 V.

In order to generate this voltage, when the bias voltage applied to one strain detection element 200 is 50 mV, the number N of strain detection elements 200 connected in series is preferably not less than 20 and not more than 200. When the bias voltage applied to one strain detection element 200 is 150 mV, the number N of strain detection elements 200 connected in series is preferably not less than 7 and not more than 66.

Note that as shown in, for example, FIG. 74B, the plurality of strain detection elements 200 may all be connected in parallel.

Moreover, when, for example, the first through fourth planar regions described with reference to FIG. 69 each have a plurality of strain detection elements 200 disposed therein, and these are assumed to be first through fourth strain detection element groups 310, 320, 330, and 340 as shown in FIG. 74C, a Wheatstone bridge circuit may be configured by the first through fourth strain detection element groups 310, 320, 330, and 340 as shown in FIG. 74D. Now, strain-electrical resistance characteristics of the same polarity are obtained for the first strain detection element group 310 and the third strain detection element group 330 shown in FIG. 74D, and strain-electrical resistance characteristics of the reverse polarity to those of the first strain detection element group 310 and the third strain detection element group 330 can be obtained for the second strain detection element group 320 and the fourth strain detection element group 340 shown in FIG. 74D. Note that the number of strain detection elements 200 included in the first through fourth strain detection element groups 310, 320, 330, and 340 may be one. As a result, temperature compensation of detection characteristics can be performed, for example.

Next, a manufacturing method of the pressure sensor 100 according to the present embodiment will be described with reference to FIG. 75. FIG. 75 is a schematic perspective view showing the manufacturing method of the pressure sensor 100.

Figure 75A:
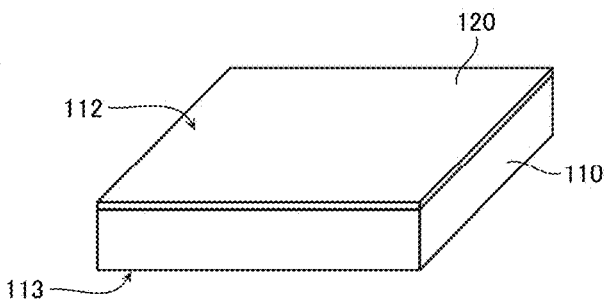
FIGS. 75A-75E are schematic perspective view showing a manufacturing method of the same pressure sensor.

In the manufacturing method of the pressure sensor 100 according to the present embodiment, as shown in FIG. 75A, the membrane 120 is formed on one surface 112 of the substrate 110. When, for example, the substrate 110 is a Si substrate, a thin film of $SiO_x/Si$ may be deposited by sputtering, as the membrane 120.

Note that when, for example, a SOI (Silicon on Insulator) substrate is adopted as the substrate 110, a stacked film of $SiO_2/Si$ on the Si substrate may also be employed as the membrane 120. In this case, formation of the membrane 120 is a bonding of the Si substrate and the stacked film of $SiO_2/Si$.

Figure 75B:
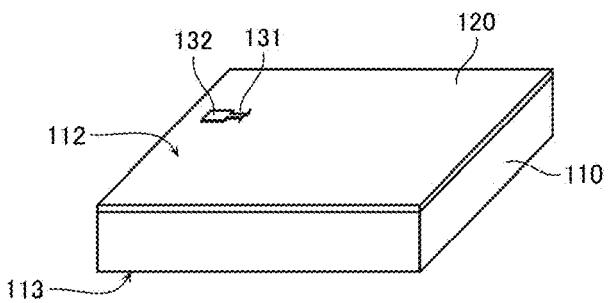

Next, as shown in FIG. 75B, the wiring line portion 131 and the pad 132 are formed on the one surface 112 of the substrate 110. That is, a conductive film that is to be the wiring line portion 131 and the pad 132 is deposited and that conductive film is removed leaving part thereof. In this process, photolithography and etching may be employed, or lift-off may be employed.

Moreover, a periphery of the wiring line portion 131 and the pad 132 may be filled in by an insulating film not illustrated. In this case, lift-off may be employed, for example. In the lift-off, for example, after etching of a pattern of the wiring line portion 131 and the pad 132 and before peeling off a resist, the insulating film not illustrated is deposited on an entire surface, and then the resist is removed.

Figure 75C:
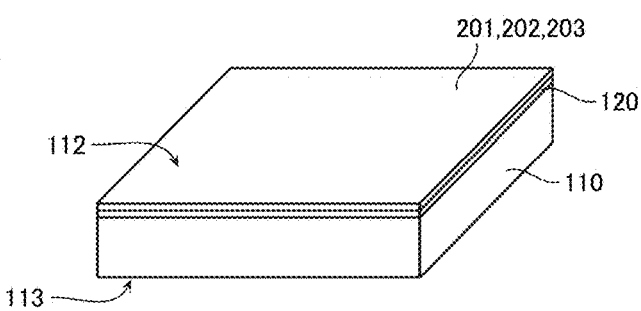

Next, as shown in FIG. 75C, the first magnetic layer 201, the second magnetic layer 202, and the intermediate layer 203 positioned between the first magnetic layer 201 and the second magnetic layer 202 are deposited on the one surface 112 of the substrate 310.

Figure 75D:
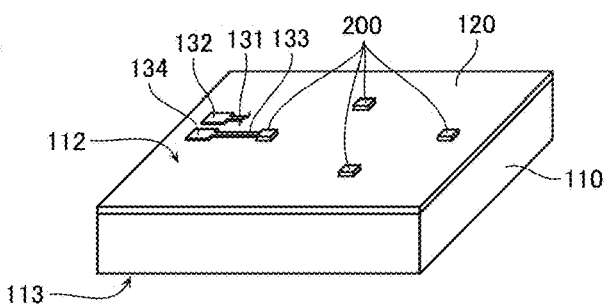

Next, as shown in FIG. 75D, the first magnetic layer 201, the second magnetic layer 202, and the intermediate layer 203 are removed leaving part thereof to form the strain detection element 200. In this process, photolithography and etching may be employed, or lift-off may be employed.

Moreover, a periphery of the strain detection element 200 may be filled in by an insulating film not illustrated. In this case, lift-off may be employed, for example. In the lift-off, for example, after etching of a pattern of the strain detection element 200 and before peeling off a resist, the insulating film not illustrated is deposited on an entire surface, and then the resist is removed.

Next, as shown in FIG. 75D, the wiring line portion 133 and the pad 134 are formed on the one surface 112 of the substrate 110. That is, a conductive film that is to be the wiring line portion 133 and the pad 134 is deposited and that conductive film is removed leaving part thereof. In this process, photolithography and etching may be employed, or lift-off may be employed.

Moreover, a periphery of the wiring line portion 133 and the pad 134 may be filled in by an insulating film not illustrated. In this case, lift-off may be employed, for example. In the lift-off, for example, after etching of a pattern of the wiring line portion 133 and the pad 134 and before peeling off a resist, the insulating film not illustrated is deposited on an entire surface, and then the resist is removed.

Figure 75E:
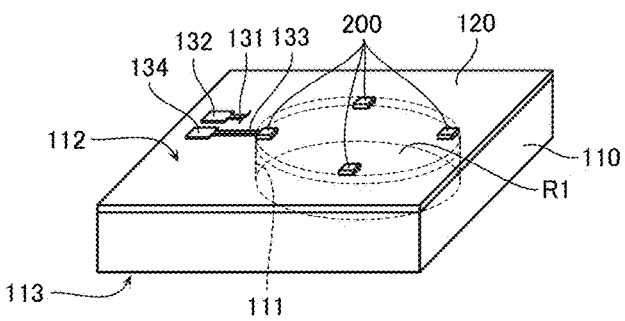

Next, as shown in FIG. 75E, part of the substrate 110 is removed from the other surface 113 of the substrate 110 to form the hollow portion 111 in the substrate 110. A region removed in this process is a portion corresponding to the first region R1 of the substrate 110. Note that in the present embodiment, the portion positioned inside the first region R1 of the substrate 110 is all removed, but it is also possible for part of the substrate 110 to be left. For example, when the membrane 120 and the substrate are formed integrally, the substrate 110 may be partially removed to be formed in to a thin film and this portion formed into a thin film may be adopted as the membrane 120.

In the present embodiment, etching is employed in the process shown in FIG. 75E. When, for example, the membrane 120 is a stacked film of $SiO_2/Si$, the process may be performed by deep-dig processing from the other surface 113 of the substrate 110. Moreover, a dual-side aligner lithography device can be employed in the present process. As a result, patterning of a hole pattern of a resist can be performed on the other surface 113 in alignment with a position of the strain detection element 200.

Moreover, employable in the etching is, for example, a Bosch process employing RIE. The Bosch process repeats, for example, an etching process employing a $SF_6$ gas and a deposition process employing a $C_4F_8$ gas. As a result, etching is selectively performed in a depth direction (Z axis direction) of the substrate 110 while suppressing etching of a sidewall of the substrate 110. A $SiO_x$ layer, for example, is employed as an endpoint of the etching. That is, the etching is finished using the $SiO_x$ layer whose etching selection ratio is different from that of Si. The $SiO_x$ layer functioning as an etching stopper layer may be employed as part of the membrane 110. After the etching, the $SiO_x$ layer may be removed by a treatment of the likes of anhydrous hydrofluoric acid and alcohol, and so on. Etching of the substrate 110 may be performed by anisotropic etching by a wet process or etching employing a sacrifice layer, besides being performed by the Bosch process.

Next, a configuration example 440 of the pressure sensor 100 according to the present embodiment will be described with reference to FIGS. 76 to 78.

Figure 76:
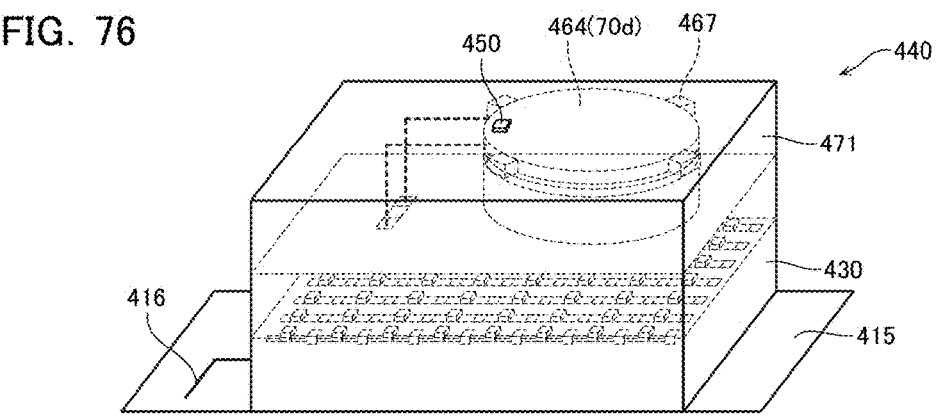
FIG. 76 is a schematic perspective view showing a configuration example of the same pressure sensor.

FIG. 76 is a schematic perspective view showing a configuration of a pressure sensor 440. FIGS. 77 and 78 are block diagrams exemplifying the pressure sensor 440.

Figure 77:
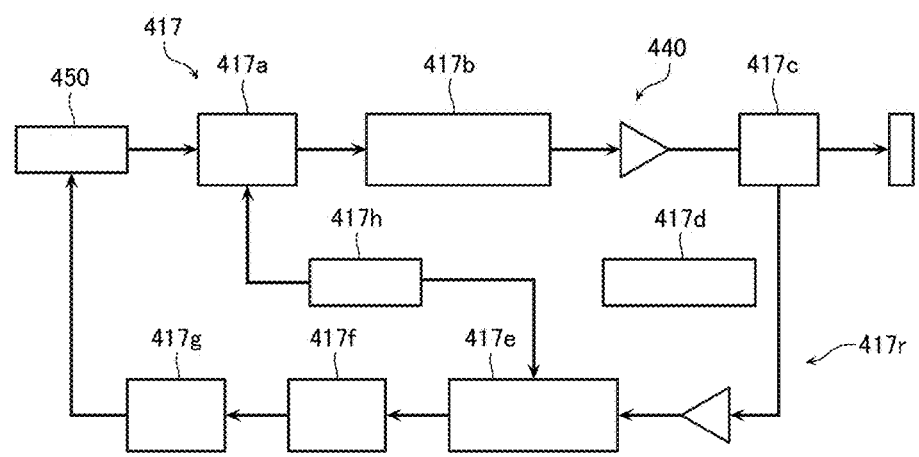
FIG. 77 is a functional block diagram showing a configuration example of the same pressure sensor.

As shown in FIGS. 76 and 77, the pressure sensor 440 is provided with: a base 471; a detection portion 450; a semiconductor circuit portion 430; an antenna 415; an electrical wiring line 416; a transmitting circuit 417; and a receiving circuit 417r. Note that the detection portion 450 according to the present embodiment is, for example, the strain detection element 200 according to the first or second embodiment.

The antenna 415 is electrically connected to the semiconductor circuit portion 430 via the electrical wiring line 416.

The transmitting circuit 417 transmits data based on an electrical signal flowing in the detection portion 450, wirelessly. At least part of the transmitting circuit 417 can be provided in the semiconductor circuit portion 430.

The receiving circuit 417r receives a control signal from an electronic device 418d. At least part of the receiving circuit 417r can be provided in the semiconductor circuit portion 430. Configuring to provide the receiving circuit 417r makes it possible, for example, to control operation of the pressure sensor 440 by operating the electronic device 418d.

As shown in FIG. 77, the transmitting circuit 417 can be provided with, for example: an AD converter 417a connected to the detection portion 450; and a Manchester encoding portion 417b. A switching portion 417c can be provided and configured to switch transmitting and receiving. In this case, a timing controller 417d can be provided and switching in the switching portion 417c controlled by the timing controller 417d. Furthermore, a data correction portion 417e, a synchronization portion 417f, a determination portion 417g, and a voltage controlled oscillator (VCO) 417h can be provided.

Figure 78:
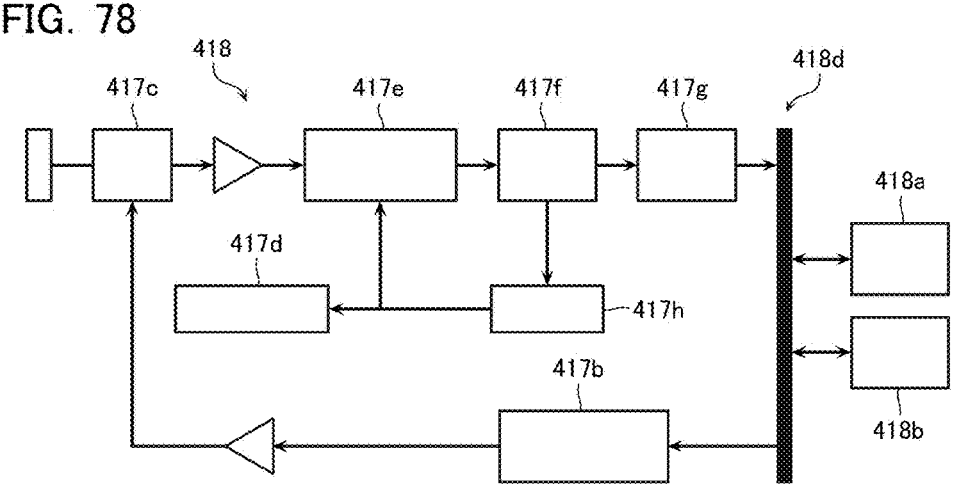
FIG. 78 is a functional block diagram showing a configuration example of part of the same pressure sensor.

As shown in FIG. 78, the electronic device 418d employed in combination with the pressure sensor 440 is provided with a receiving portion 418. An electronic device such as a portable terminal, for example, may be exemplified as the electronic device 418d.

In this case, the pressure sensor 440 including the transmitting circuit 417 and the electronic device 418d including the receiving portion 418 can be employed in combination.

The electronic component 418d can be provided with: the Manchester encoding portion 417b; the switching portion 417c; the timing controller 417d; the data correction portion 417e; the synchronization portion 417f; the determination portion 417g; the voltage controlled oscillator 417h; a storage portion 418a; and a central processing unit (CPU) 418b.

In this example, the pressure sensor 440 further includes a fixing portion 467. The fixing portion 467 fixes a membrane 464 (70d) to the base 471. The fixing portion 467 can have its thickness dimension set thicker than that of the membrane 464 so as not to be deformed easily even when applied with an external pressure.

The fixing portions 467 can be provided evenly spaced on an outer periphery of the membrane 464. The fixing portion 467 can also be provided so as to continuously surround the entire periphery of the membrane 464 (70d). The fixing portion 467 can be formed from the same material as a material of the base 471, for example. In this case, the fixing portion 467 can be formed from the likes of silicon, for example. The fixing portion 467 can also be formed from the same material as a material of the membrane 464 (70d), for example.

Next, a manufacturing method of the pressure sensor 440 will be exemplified with reference to FIGS. 79 to 90. FIGS. 79 to 90 each include a schematic plan view and cross-sectional view exemplifying the manufacturing method of the pressure sensor 440.

Figure 79A:
FIGS. 79A-79B are views showing the manufacturing method of the same pressure sensor.
Figure 79B:
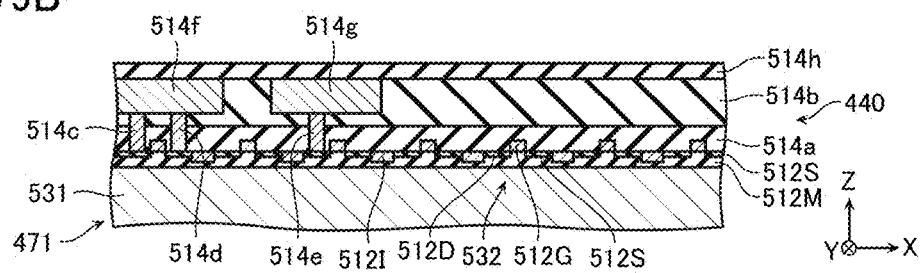

As shown in FIGS. 79A and 79B, a semiconductor layer 512M is formed on a surface portion of a semiconductor substrate 531. Then, an element isolation insulating layer 512I is formed in an upper surface of the semiconductor layer 512M. Then, a gate 512G is formed on the semiconductor layer 512M via an insulating layer not illustrated. Then, a source 512S and a drain 512D are formed on both sides of the gate 512G, whereby a transistor 532 is formed. Then, an inter-layer insulating film 514a is formed and an inter-layer insulating film 514b is further formed thereon.

Then, in a region which is to be a non-hollow portion, a trench and a hole are formed in part of the inter-layer insulating films 514a and 514b. Then, a conductive material is filled into the hole to form connection pillars 514c to 514e. In this case, for example, the connection pillar 514c is electrically connected to the source 512S and the connection pillar 514d is electrically connected to the drain 512D of one transistor 532. For example, the connection pillar 514c is electrically connected to the source 512S of another transistor 532. Then, a conductive material is filled into the trench to form wiring line portions 514f and 514g. The wiring line portion 514f is electrically connected to the connection pillar 514c and the connection pillar 514d. The wiring line portion 514g is electrically connected to the connection pillar 514e. Then, an inter-layer insulating film 514h is formed on the inter-layer insulating film 514b.

Figure 80A:
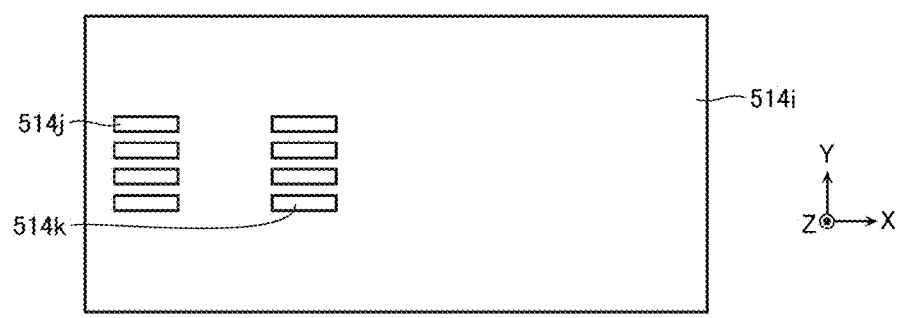
FIGS. 80A-80B are views showing the manufacturing method of the same pressure sensor.
Figure 80B:
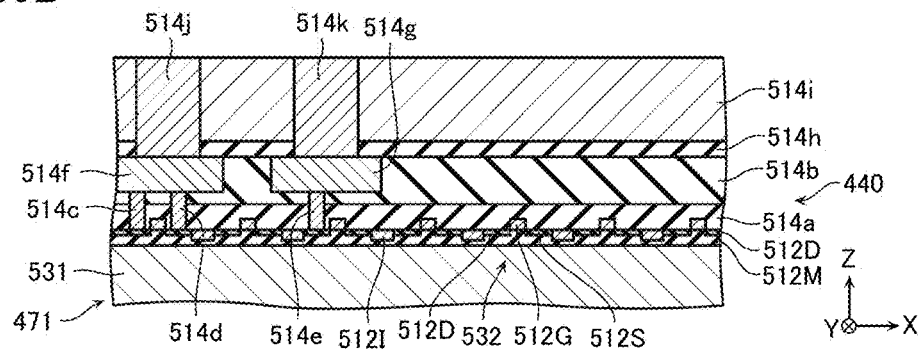

As shown in FIGS. 80A and 80B, an inter-layer insulating film 514i configured from silicon oxide ($SiO_2$) is formed on the inter-layer insulating film 514h using a CVD (Chemical Vapor Deposition) method, for example. Then, a hole is formed at a certain position of the inter-layer insulating film 514i, a conductive material (for example, a metal material) is implanted, and an upper surface is planarized using a CMP (Chemical Mechanical Polishing) method. As a result, a connection pillar 514j connected to the wiring line portion 514f and a connection pillar 514k connected to the wiring line portion 514g, are formed.

Figure 81A:
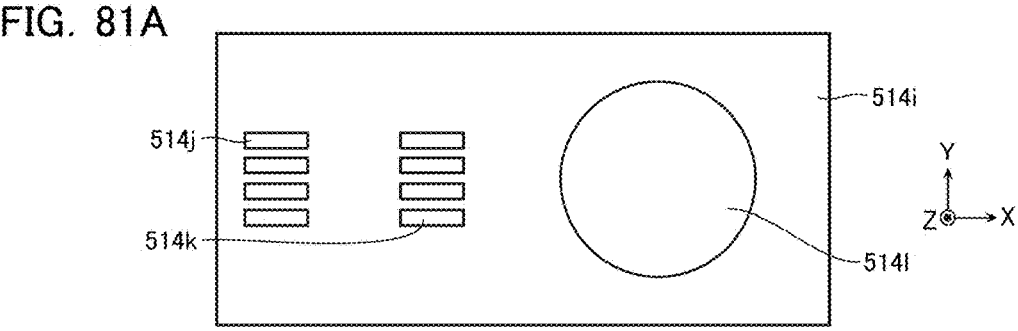
FIGS. 81A-81B are views showing the manufacturing method of the same pressure sensor.
Figure 81B:
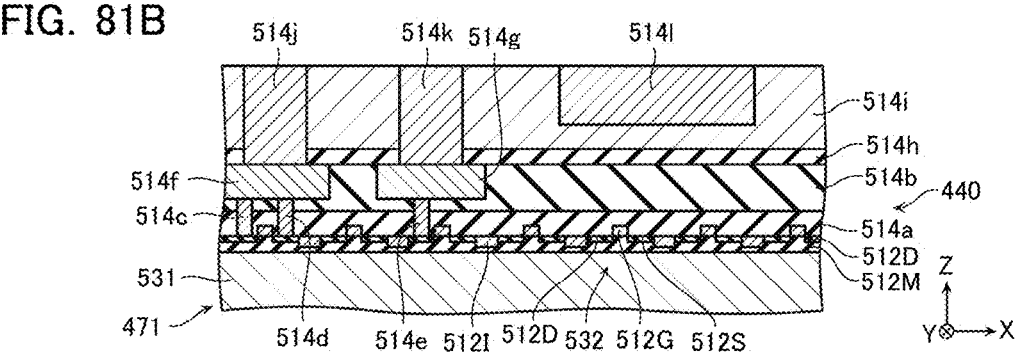

As shown in FIGS. 81A and 81B, a region which is to be a hollow portion 570 of the inter-layer insulating film 514i has a concave portion formed therein, and a sacrifice layer 514l is implanted in this concave portion. The sacrifice layer 514l can be formed using, for example, a material capable of film formation at a low temperature. The material capable of film formation at a low temperature is, for example, silicon germanium (SiGe), or the like.

Figure 82A:
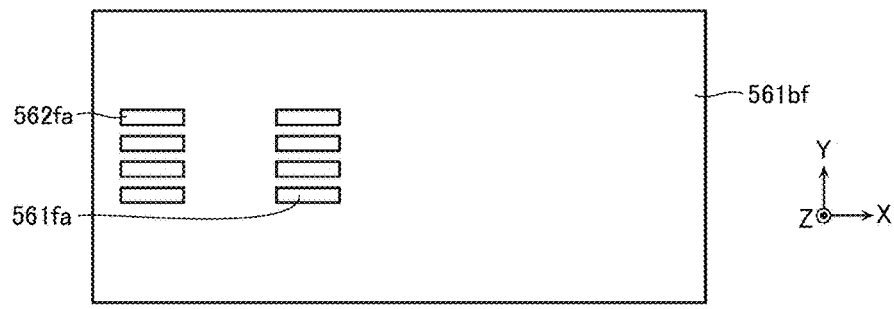
FIGS. 82A-82B are views showing the manufacturing method of the same pressure sensor.
Figure 82B:
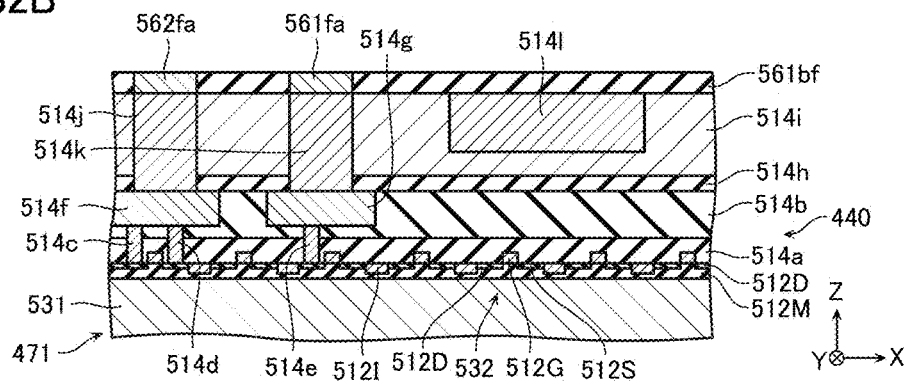

As shown in FIGS. 82A and 82B, an insulating film 561bf which is to be a membrane 564 (70d) is formed on the inter-layer insulating film 514i and the sacrifice layer 514l. The insulating film 561bf can be formed using, for example, silicon oxide ($SiO_2$), and so on. A plurality of holes are provided in the insulating film 561bf, a conductive material (for example, a metal material) is filled into the plurality of holes, and a connection pillar 561fa and a connection pillar 562fa are formed. The connection pillar 561fa is electrically connected to the connection pillar 514k, and the connection pillar 562fa is electrically connected to the connection pillar 514j.

Figure 83A:
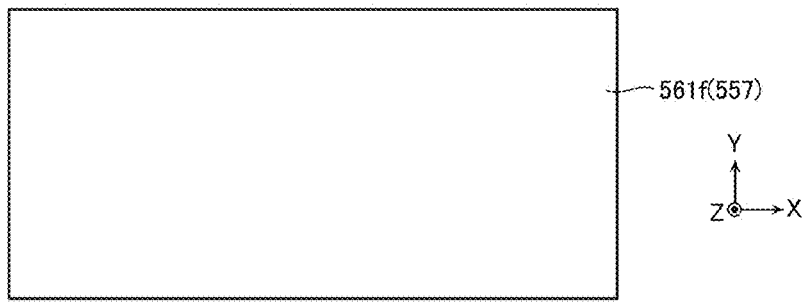
FIGS. 83A-83B are views showing the manufacturing method of the same pressure sensor.
Figure 83B:
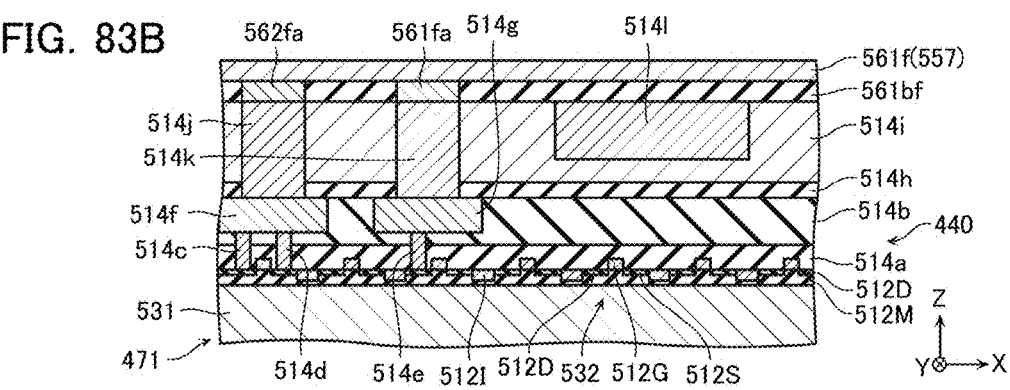

As shown in FIGS. 83A and 83B, a conductive layer 561f which is to be a wiring line 557 is formed on the insulating film 561bf, the connection pillar 561fa, and the connection pillar 562fa.

Figure 84A:
FIGS. 84A-84B are views showing the manufacturing method of the same pressure sensor.
Figure 84B:
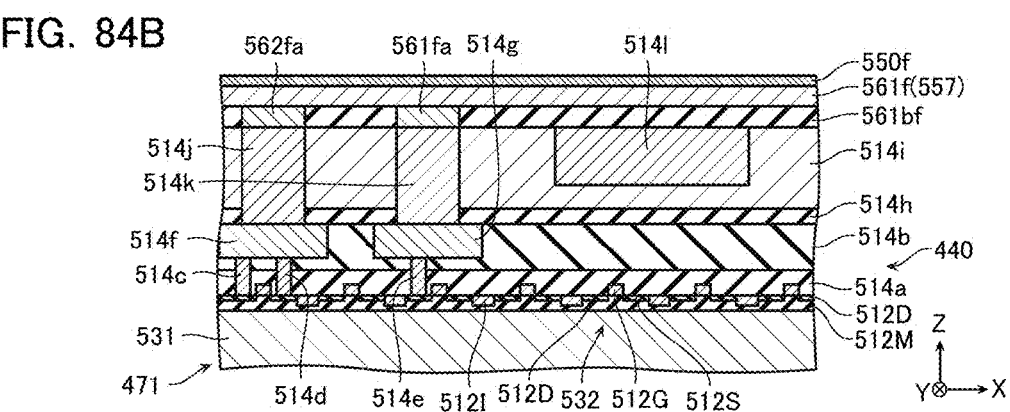

As shown in FIGS. 84A and 84B, a stacked film 550f is formed on the conductive layer 561f.

Figure 85A:
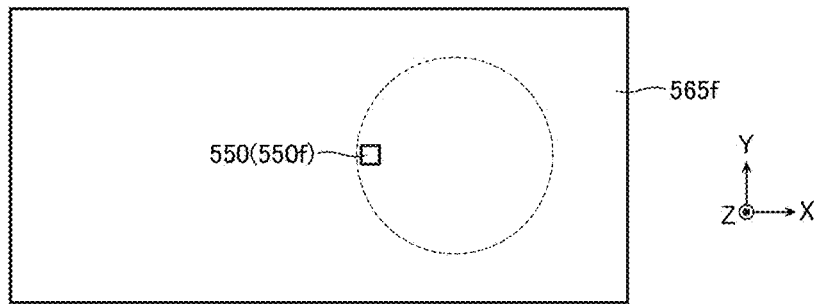
FIGS. 85A-85B are views showing the manufacturing method of the same pressure sensor.
Figure 85B:
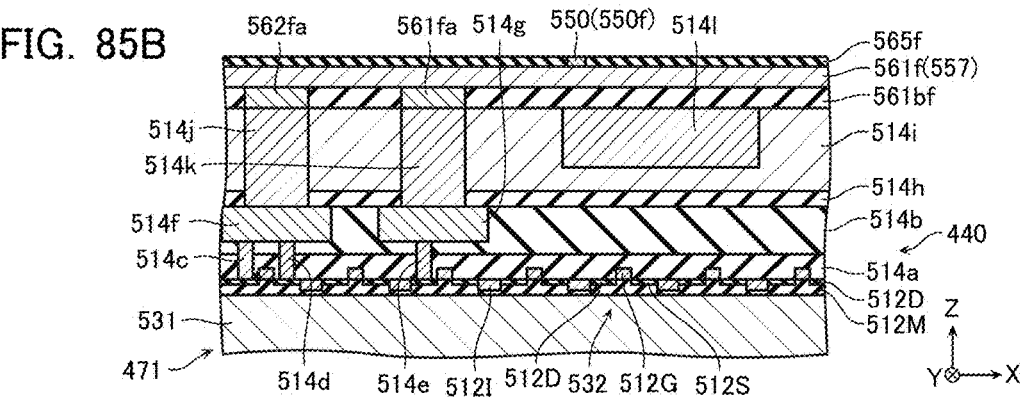

As shown in FIGS. 85A and 85B, the stacked film 550f is patterned into a certain shape, and an insulating film 565f which is to be an insulating layer 565 is formed thereon. The insulating film 565f can be formed using, for example, silicon oxide ($SiO_2$), and so on.

Figure 86A:
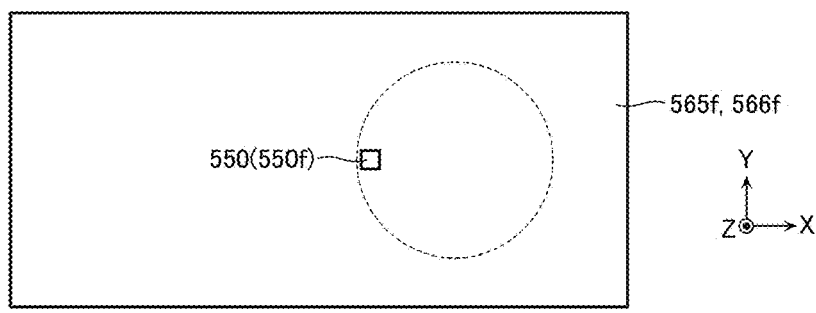
FIGS. 86A-86B are views showing the manufacturing method of the same pressure sensor.
Figure 86B:
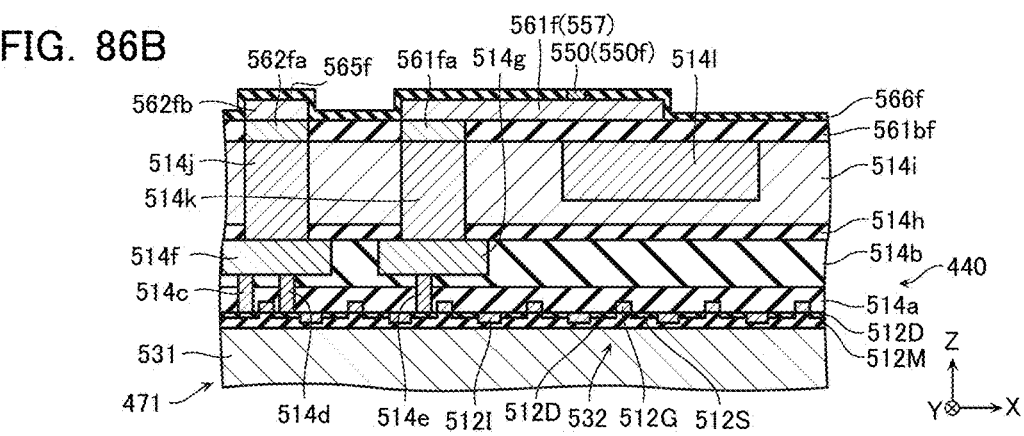

As shown in FIGS. 86A and 86B, part of the insulating film 565f is removed, and the conductive layer 561f is patterned into a certain shape. As a result, the wiring line 557 is formed. At this time, part of the conductive layer 561f becomes a connection pillar 562fb which is electrically connected to the connection pillar 562fa. Furthermore, an insulating film 566f which is to be an insulating layer 566 is formed thereon.

Figure 87A:
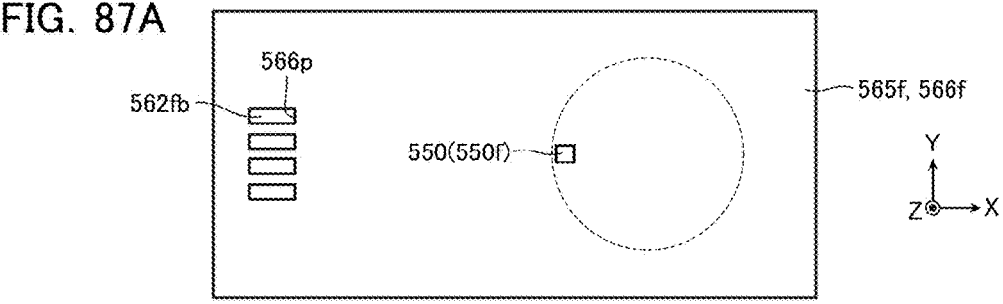
FIGS. 87A-87B are views showing the manufacturing method of the same pressure sensor.
Figure 87B:
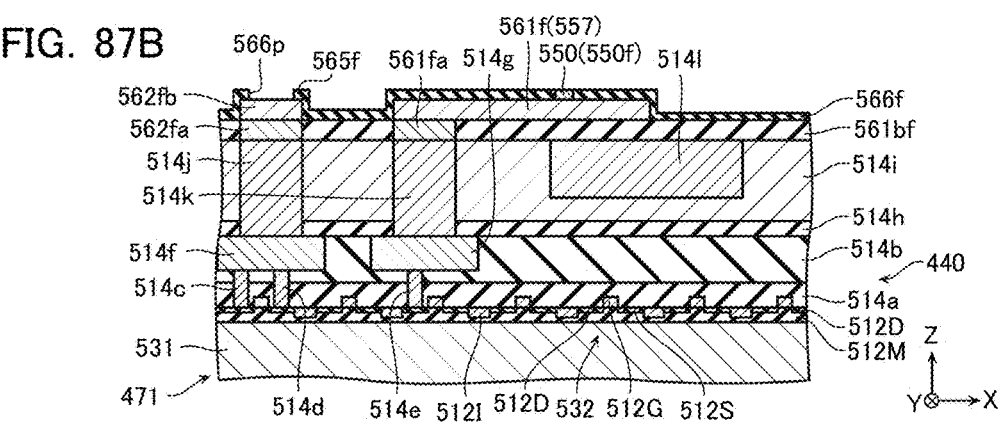

As shown in FIGS. 87A and 87B, an opening 566p is formed in the insulating film 565f. As a result, the connection pillar 562fb is exposed.

Figure 88A:
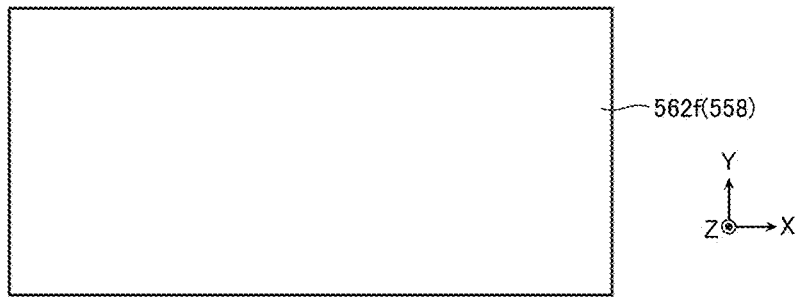
FIGS. 88A-88B are views showing the manufacturing method of the same pressure sensor.
Figure 88B:
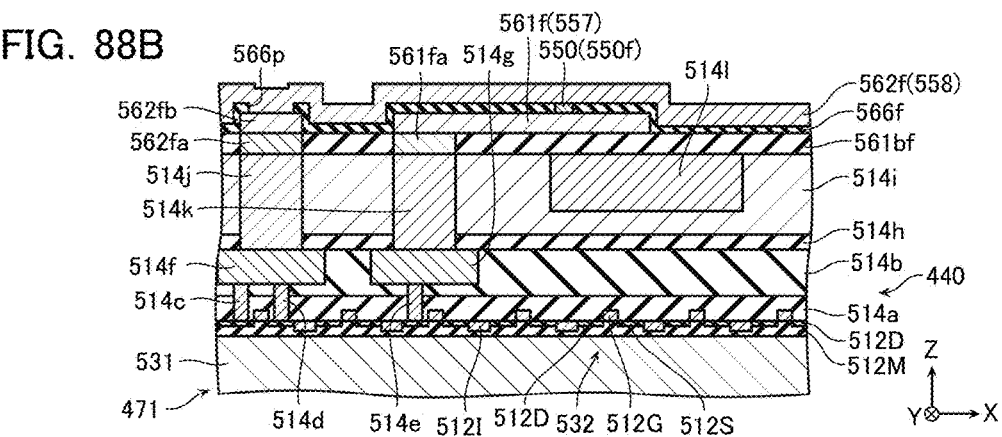

As shown in FIGS. 88A and 88B, a conductive layer 562f which is to be a wiring line 558 is formed on an upper surface. Part of the conductive layer 562f is electrically connected to the connection pillar 562fb.

Figure 89A:
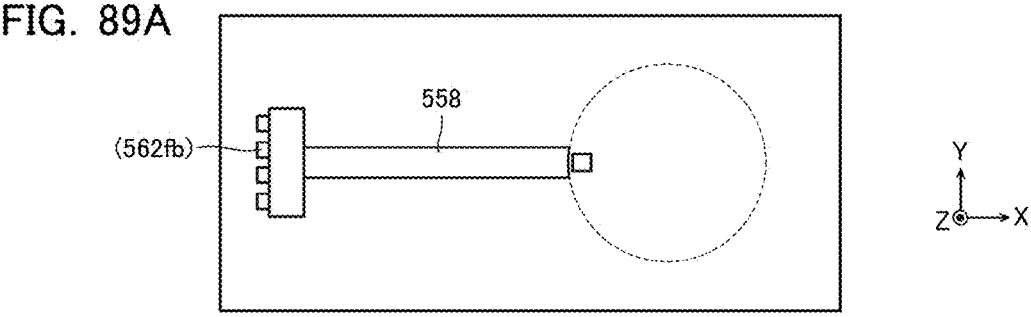
FIGS. 89A-89B are views showing the manufacturing method of the same pressure sensor.
Figure 89B:
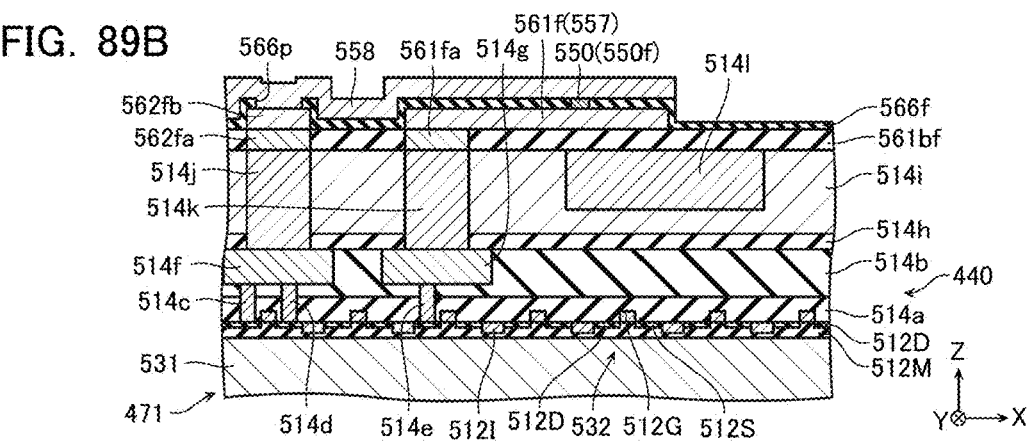

As shown in FIGS. 89A and 89B, the conductive layer 562f is patterned into a certain shape. As a result, the wiring line 558 is formed. The wiring line 558 is electrically connected to the connection pillar 562fb.

Figure 90A:
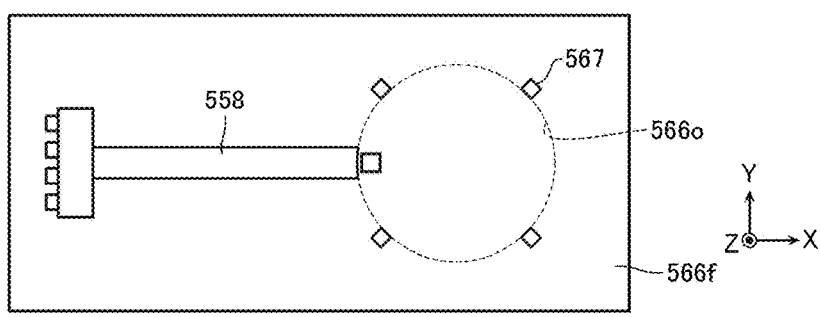
FIGS. 90A-90B are views showing the manufacturing method of the same pressure sensor.
Figure 90B:
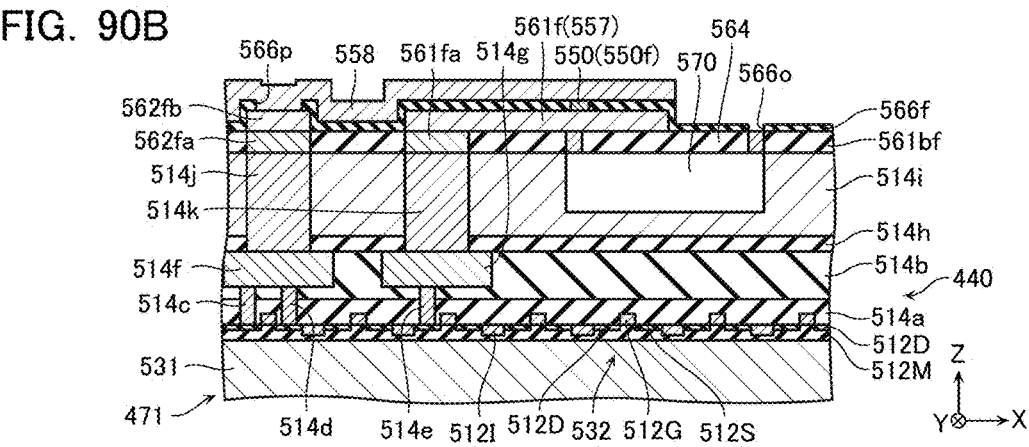

As shown in FIGS. 90A and 90B, an opening 5660 of a certain shape is formed in the insulating film 566f. The insulating film 561bf is patterned via the opening 566o, and furthermore, the sacrifice layer 514l is removed via the opening 5660. As a result, the hollow portion 570 is formed.

Removal of the sacrifice layer 514l can be performed using, for example, a wet etching method.

Note that when a fixed portion 567 is configured in a ring shape, an insulating film is filled between, for example, an edge of the non-hollow portion upward of the hollow portion 570, and the membrane 564.

The pressure sensor 440 is formed in the above way.

5. Fifth Embodiment

Figure 91:
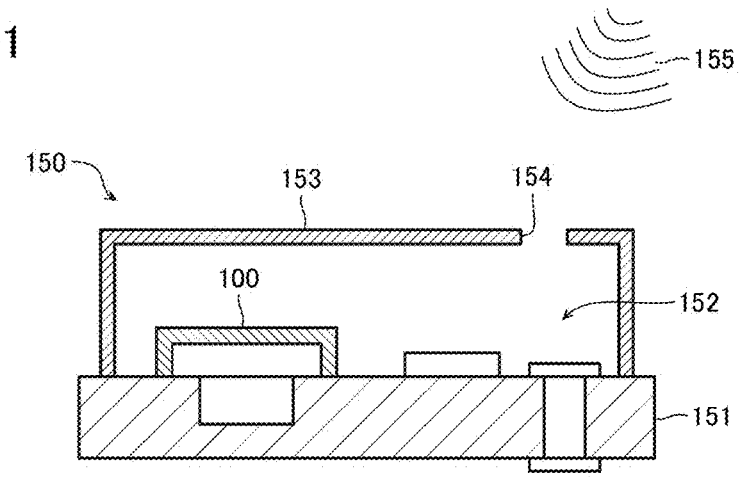
FIG. 91 is a schematic cross-sectional view showing a configuration of a microphone according to a fifth embodiment.

Next, a fifth embodiment will be described with reference to FIG. 91. FIG. 91 is a schematic cross-sectional view showing a configuration of a microphone 150 according to the present embodiment. The pressure sensor 100 installed with the strain detection element 200 according to the first through third embodiments can be installed in a microphone, for example.

The microphone 150 according to the present embodiment includes: a printed board 151 installed with the pressure sensor 100; an electronic circuit 152 installed with the printed board 151; and a cover 153 covering the pressure sensor 100 and the electronic circuit 152 along with the printed board 151. The pressure sensor 100 is a pressure sensor installed with the strain detection element 200 according to the first through third embodiments.

The cover 153 is provided with an acoustic hole 154 from which a sound wave 155 enters. When the sound wave 155 enters inside the cover 153, the sound wave 155 is detected by the pressure sensor 100. The electronic circuit 152 passes a current through the strain detection element installed in the pressure sensor 100 and detects a change in resistance value of the pressure sensor 100, for example. Moreover, the electronic circuit 152 may amplify this current value by an amplifier circuit, and so on.

The pressure sensor installed with the strain detection element 200 according to the first through third embodiments has high sensitivity, hence the microphone 150 installed therewith can perform detection of the sound wave 155 with good sensitivity.

6. Sixth Embodiment

Figure 92:
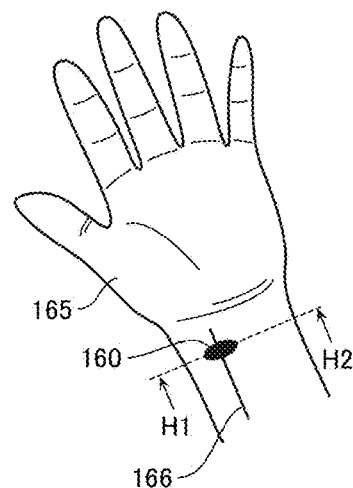
FIG. 92 is a schematic view showing a configuration of a blood pressure sensor according to a sixth embodiment.
Figure 93:
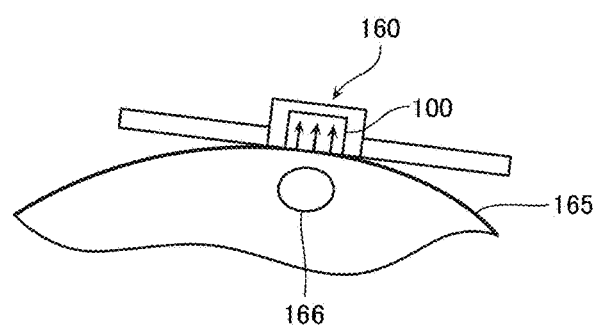
FIG. 93 is a schematic cross-sectional view of the same blood pressure sensor as seen from the line H1-H2 shown in FIG. 92.

Next, a sixth embodiment will be described with reference to FIGS. 92 and 93. FIG. 92 is a schematic view showing a configuration of a blood pressure sensor 160 according to the sixth embodiment. FIG. 93 is a schematic cross-sectional view of the blood pressure sensor 160 as seen from the line H1-H2 shown in FIG. 92. The pressure sensor 100 installed with the strain detection element 200 according to the first through third embodiments can be installed in the blood pressure sensor 160.

As shown in FIG. 92, the blood pressure sensor 160 is affixed over an artery 166 of an arm 165 of a human, for example. Moreover, as shown in FIG. 93, the blood pressure sensor 160 is installed with the pressure sensor 100 installed with the strain detection element 200 according to the first through third embodiments, whereby blood pressure can be measured.

The pressure sensor 100 installed with the strain detection element 200 according to the first through third embodiments has high sensitivity, hence the blood pressure sensor 160 installed therewith can perform detection of blood pressure continuously with good sensitivity.

7. Seventh Embodiment

Figure 94:
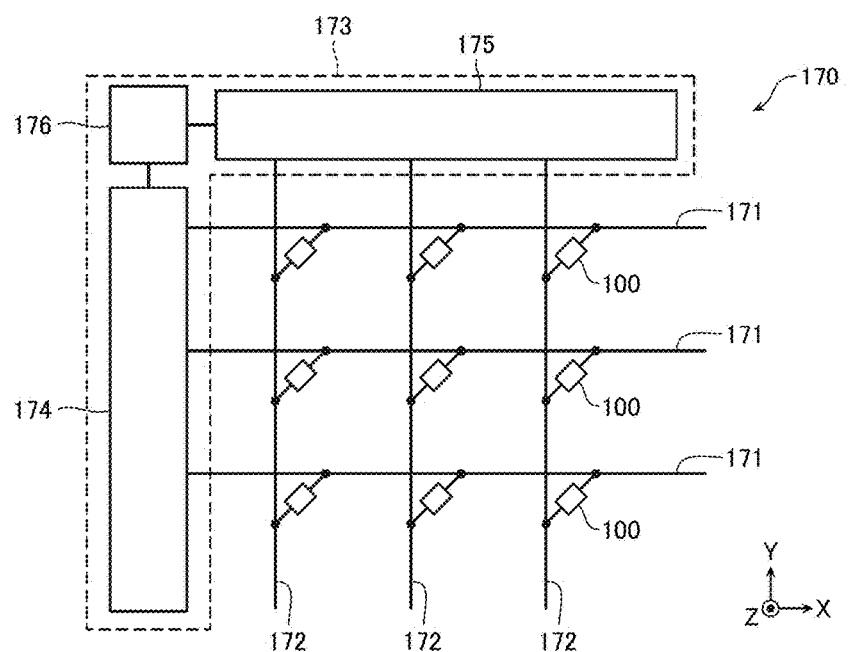
FIG. 94 is a schematic circuit diagram showing a configuration of a touch panel according to a seventh embodiment.

Next, a seventh embodiment will be described with reference to FIG. 94. FIG. 94 is a schematic circuit diagram showing a configuration of a touch panel 170 according to the seventh embodiment. The touch panel 170 is installed in at least one of an inside or an outside of a display not illustrated.

The touch panel 170 includes: a plurality of pressure sensors 100 disposed in a matrix; a plurality of first wiring lines 171 disposed in plurality in a Y direction and respectively connected to one ends of a plurality of the pressure sensors 100 disposed in an X direction; a plurality of second wiring lines 172 disposed in plurality in the X direction and respectively connected to the other ends of a plurality of the pressure sensors 100 disposed in the Y direction; and a control unit 173 that controls the plurality of first wiring lines 171 and the plurality of second wiring lines 172.

Moreover, the control unit 173 includes: a first control circuit 174 that controls the first wiring line 171; a second control circuit 175 that controls the second wiring line 172; and a third control, circuit 176 that controls the first control circuit 174 and the second control circuit 175.

For example, the control unit 173 passes a current through the pressure sensor 100 via the plurality of first wiring lines 171 and the plurality of second wiring lines 172. Now, when a touch surface not illustrated is pressed, the pressure sensor 100 has a resistance value of its strain detection element changed according to that pressure. The control unit 173 specifies a position of the pressure sensor 100 where a pressure due to pressing was detected, by detecting this change in resistance value.

The pressure sensor 100 installed with the strain detection element 200 according to the first through third embodiments has high sensitivity, hence the touch panel 170 installed therewith can perform detection of pressure due to pressing with good sensitivity. Moreover, the pressure sensor 100 is miniature, and a high resolution touch panel 170 can be manufactured.

Note that the touch panel 170 may include a detection element for detecting touch, other than the pressure sensor 100.

8. Other Application Examples

Application examples of the pressure sensor 100 installed with the strain detection element 200 according to the first through third embodiments were described above with reference to specific examples. However, the pressure sensor 100 can be applied to a variety of pressure sensor devices, such as an atmospheric pressure sensor or tire air pressure sensor, and so on, in addition to the fourth through seventh embodiments shown.

Moreover, regarding specific configurations of each element such as the membrane, the strain detection element, the first magnetic layer, the second magnetic layer, and the intermediate layer included in the strain detection element 200, the pressure sensor 100, the microphone 150, the blood pressure sensor 160, and the touch panel 170, such specific configurations are included in the scope of the present invention provided they can be similarly performed by a person skilled in the art by appropriately selecting from a publicly-known scope and provided that they allow similar advantages to be obtained.

Moreover, combinations in a technically possible range of two or more elements of each of the specific examples are also included in the scope of the present invention provided that they fall within the spirit of the present invention.

In addition, all strain detection elements, pressure sensors 100, microphones 150, blood pressure sensors 160, and touch panels 170 capable of being performed by appropriate design change by a person skilled in the art based on the strain detection element, pressure sensor 100, microphone 150, blood pressure sensor 160, and touch panel 170 mentioned above as embodiments of the present invention also belong to the scope of the present invention provided that they fall within the spirit of the present invention.

9. Other Embodiments

That concludes description of embodiments of the present invention, but the present invention may be performed also by the following kinds of modes.

[Mode 1]

A strain detection element provided above a deformable membrane, the strain detection element comprising:
an electrode; and
a stacked body provided above the electrode and including a first magnetic layer, a second magnetic layer, and an intermediate layer, the first magnetic layer having its magnetization direction being variable according to a deformation of the membrane, and the intermediate layer being provided between the first magnetic layer and the second magnetic layer, and
at least part of the first magnetic layer is amorphous, and the electrode includes a metal layer configured from a Cu—Ag alloy.

[Mode 2]

The strain detection element according to mode 1, wherein a crystal grain size of the metal layer configured from the Cu—Ag alloy is 0.50 nm or less.

[Mode 3]

The strain detection element according to modes 1 or 2, wherein
the electrode includes the metal layer configured from a $Cu_{1-x}Ag_x$ alloy (1 at. %≤x≤20 at. %).

[Mode 4]

A strain detection element provided above a deformable membrane, the strain detection element comprising:
an electrode; and
a stacked body provided on the electrode and including a first magnetic layer, a second magnetic layer, and an intermediate layer, the first magnetic layer having its magnetization direction being variable according to a deformation of the membrane, and the intermediate layer being provided between the first magnetic layer and the second magnetic layer, and
at least part of the first magnetic layer is amorphous, the electrode includes a metal layer that includes at least one element selected from the group consisting of Cu, Al, Au, Ag, Ni, Fe, and Co, and
a crystal grain size of the metal layer is 50 nm or less.

[Mode 5]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer,
at least part of the first magnetic layer being amorphous, and
assuming that a direction in which the first magnetic layer, the second magnetic layer, and the intermediate layer are stacked is a height direction, and that an interface between the intermediate layer and the first magnetic layer is a first interface, an Ra value of the first interface expressed by the following formulas (1) and (2) being 0.3 nm or less.

$$Z_C = \frac{1}{n}\sum_i^n Z(i) \qquad \text{Formula (1)}$$

$$Ra = \frac{1}{n}\sum_i^n |Z(i) - Z_C| \qquad \text{Formula (2)}$$

(Zc is a mean value of a position of the first interface in the height direction, and Z(i) is the position of the first interface in the height direction)

[Mode 6]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer,
at least part of the first magnetic layer being amorphous, and
assuming that a direction in which the first magnetic layer, the second magnetic layer, and the intermediate layer are stacked is a height direction, and that an interface between the intermediate layer and the first magnetic layer is a first interface, an Rmax value of the first interface expressed by the following formula (3) being 2.5 nm or less.

$$R_{max} = \max(Z(i)) - \min(Z(i)) \qquad \text{Formula (3)}$$

(Z(i) is a position of the first interface in the height direction, max(Z(i)) is a maximum value of Z(i), and min (Z(i)) is a minimum value of Z(i))

[Mode 7]

A strain detection element provided above a deformable membrane, the strain detection element comprising:
an electrode; and
a stacked body provided on the electrode and including a first magnetic layer, a second magnetic layer, and an intermediate layer, the first magnetic layer having its magnetization direction changed depending on a deformation of the membrane, and the intermediate layer being provided between the first magnetic layer and the second magnetic layer, and
at least part of the first magnetic layer is amorphous, the electrode includes a metal layer that includes at least one element selected from the group consisting of Cu, Al, Au, Ag, Ni, Fe, and Co, and
assuming that a direction in which the first magnetic layer, the second magnetic layer, and the intermediate layer are stacked is a height direction, and that a surface facing the stacked body of the metal layer is a metal layer upper surface, an Ra value of the metal layer upper surface expressed by the following formulas (1) and (2) being 2 nm or less.

$$Z_C = \frac{1}{n}\sum_i^n Z(i) \qquad \text{Formula (1)}$$

-continued $$Ra = \frac{1}{n}\sum_{i}^{n}|Z(i) - Z_C| \qquad \text{Formula (2)}$$

(Zc is a mean value of a position of the metal layer upper surface in the height direction, and Z(i) is the position of the metal layer upper surface in the height direction)

[Mode 8]

A strain detection element provided above a deformable membrane, the strain detection element comprising:
an electrode; and
a stacked body provided on the electrode and including a first magnetic layer, a second magnetic layer, and an intermediate layer, the first magnetic layer having its magnetization direction changed depending on a deformation of the membrane, and the intermediate layer being provided between the first magnetic layer and the second magnetic layer, and
at least part of the first magnetic layer is amorphous,
the electrode includes a metal layer that includes at least one element selected from the group consisting of Co, Al, Au, Ag, Ni, Fe, and Co, and
assuming that a direction in which the first magnetic layer, the second magnetic layer, and the intermediate layer are stacked is a height direction, and that a surface facing the stacked body of the metal layer is a metal layer upper surface, an Rmax value of the metal layer upper surface expressed by the following formula (3) being 10 nm or less.

$$R_{max} = \max(Z(i)) - \min(Z(i)) \qquad \text{Formula (3)}$$

(Z(i) is a position of the metal layer upper surface in the height direction, max(Z(i)) is a maximum value of Z(i), and min(Z(i)) is a minimum value of Z(i))

[Mode 9]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer, and
at least part of the first magnetic layer is amorphous, and
assuming that a direction in which the first magnetic layer, the second magnetic layer, and the intermediate layer are stacked is a height direction, and that an interface between the intermediate layer and the first magnetic layer is a first interface, an Ra value of the first interface expressed by the following formulas (1) and (2) being less than a film thickness of the intermediate layer.

$$Z_C = \frac{1}{n}\sum_{i}^{n}Z(i) \qquad \text{Formula (1)}$$

$$Ra = \frac{1}{n}\sum_{i}^{n}|Z(i) - Z_C| \qquad \text{Formula (2)}$$

(Zc is a mean value of a position of the first interface in the height direction, and Z(i) is the position of the first interface in the height direction)

[Mode 10]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer, and
at least part of the first magnetic layer is amorphous, and
assuming that a direction in which the first magnetic layer, the second magnetic layer, and the intermediate layer are stacked is a height direction, and that an interface between the intermediate layer and the first magnetic layer is a first interface, an Rmax value of the first interface expressed by the following formula (3) being less than a film thickness of the intermediate layer.

$$R\max = \max(Z(i)) - \min(Z(i)) \qquad \text{Formula (3)}$$

(Z(i) is a position of the first interface in the height direction, max(Z(i)) is a maximum value of Z(i), and min(Z(i)) is a minimum value of Z(i))

[Mode 1]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer, and
at least part of the first magnetic layer is amorphous, and
assuming that a direction in which the first magnetic layer, the second magnetic layer, and the intermediate layer are stacked is a height direction, that an interface between the intermediate layer and the first magnetic layer is a first interface, and that a surface facing the stacked body of the membrane is a membrane upper surface, an Ra value of the first interface expressed by the following formulas (1) and (2) being less than an Ra value of the membrane upper surface.

$$Z_C = \frac{1}{n}\sum_{i}^{n}Z(i) \qquad \text{Formula (1)}$$

$$Ra = \frac{1}{n}\sum_{i}^{n}|Z(i) - Z_C| \qquad \text{Formula (2)}$$

(Zc is a mean value of a position of the first interface in the height direction, and Z(i) is the position of the first interface in the height direction)

[Mode 12]

A strain detection element provided above a deformable membrane, the strain detection element comprising:
a first magnetic layer whose magnetization direction being variable according to a deformation of the membrane;
a second magnetic layer; and
an intermediate layer provided between the first magnetic layer and the second magnetic layer, and
at least part of the first magnetic layer is amorphous, and
assuming that a direction in which the first magnetic layer, the second magnetic layer, and the intermediate layer are stacked is a height direction, that an interface between the intermediate layer and the first magnetic layer is a first interface, and that a surface facing the stacked body of the membrane is a membrane upper surface, an Rmax value of the first interface expressed by the following formula (3) being less than an Rmax value of the membrane upper surface.

$$R_{max}=\max(Z(i))-\min(Z(i)) \quad \text{Formula (3)}$$

(Z(i) is a position of the first interface in the height direction, max(Z(i)) is a maximum value of Z(i), and min(Z(i)) is a minimum value of Z(i))

[Mode 13]

A strain detection element provided above a deformable membrane, the strain detection element comprising:
an electrode; and
a stacked body provided on the electrode and including a first magnetic layer, a second magnetic layer, and an intermediate layer, the first magnetic layer having its magnetization direction changed depending on a deformation of the membrane, and the intermediate layer being provided between the first magnetic layer and the second magnetic layer, and
at least part of the first magnetic layer is amorphous,
the electrode includes a metal layer that includes at least one element selected from the group consisting of Cu, Al, Au, Ag, Ni, Fe, and Co, and
assuming that a direction in which the first magnetic layer, the second magnetic layer, and the intermediate layer are stacked is a height direction, that a surface facing the stacked body of the metal layer is a metal layer upper surface, and that a surface facing the stacked body of the membrane is a membrane upper surface, an Ra value of the metal layer upper surface expressed by the following formulas (1) and (2) being less than an Ra value of the membrane upper surface.

$$Z_C = \frac{1}{n}\sum_i^n Z(i) \quad \text{Formula (1)}$$

$$Ra = \frac{1}{n}\sum_i^n |Z(i) - Z_C| \quad \text{Formula (2)}$$

(Zc is a mean value of a position of the metal layer upper surface in the height direction, and Z(i) is the position of the metal layer upper surface in the height direction)

[Mode 14]

A strain detection element provided above a deformable membrane, the strain detection element comprising:
an electrode; and
a stacked body provided on the electrode and including a first magnetic layer, a second magnetic layer, and an intermediate layer, the first magnetic layer having its magnetization direction changed depending on a deformation of the membrane, and the intermediate layer being provided between the first magnetic layer and the second magnetic layer, and
at least part of the first magnetic layer is amorphous,
the electrode including a metal layer that includes at least one element selected from the group consisting of Cu, Al, Au, Ag, Ni, Fe, and Co, and
assuming that a direction in which the first magnetic layer, the second magnetic layer, and the intermediate layer are stacked is a height direction, that a surface facing the stacked body of the metal layer is a metal layer upper surface, and that a surface facing the stacked body of the membrane is a membrane upper surface, an Rmax value of the metal layer upper surface expressed by the following formula (3) is less than an Rmax value of the membrane upper surface.

$$R_{max}=\max(Z(i))-\min(Z(i)) \quad \text{Formula (3)}$$

(Z(i) is a position of the metal layer upper surface in the height direction, max(Zi)) is a maximum value of Z(i), and min(Z(i)) is a minimum value of Z(ii)

[Mode 15]

A strain detection element provided above a deformable membrane, the strain detection element comprising:
a first magnetic layer whose magnetization direction being variable according to a deformation of the membrane;
a second magnetic layer;
an intermediate layer provided between the first magnetic layer and the second magnetic layer; and
a diffusion prevention layer provided on a surface opposite to a surface facing the intermediate layer, of the first magnetic layer, and
at least part of the first magnetic layer is amorphous, and
assuming that a direction in which the first magnetic layer, the second magnetic layer, and the intermediate layer are stacked is a height direction, and that an interface between the intermediate layer and the first magnetic layer is a first interface, an Ra value of the first interface expressed by the following formulas (1) and (2) being 0.3 nm or less.

$$Z_C = \frac{1}{n}\sum_i^n Z(i) \quad \text{Formula (1)}$$

$$Ra = \frac{1}{n}\sum_i^n |Z(i) - Z_C| \quad \text{Formula (2)}$$

(Zc is a mean value of a position of the first interface in the height direction, and Z(i) is the position of the first interface in the height direction)

[Mode 16]

A strain detection element provided above a deformable membrane, the strain detection element comprising:
a first magnetic layer whose magnetization direction being variable according to a deformation of the membrane;
a second magnetic layer;
an intermediate layer provided between the first magnetic layer and the second magnetic layer; and
a diffusion prevention layer provided on a surface opposite to a surface facing the intermediate layer, of the first magnetic layer, and
at least part of the first magnetic layer is amorphous, and
assuming that a direction in which the first magnetic layer, the second magnetic layer, and the intermediate layer are stacked is a height direction, and that an interface between the intermediate layer and the first magnetic layer is a first interface, an Rmax value of the first interface expressed by the following formula (3) being 2.5 nm or less.

$$R_{max}=\max(Z(i))-\min(Z(i)) \quad \text{Formula (3)}$$

(Z(i) is a position of the first interface in the height direction, max(Z(i)) is a maximum value of Z(i), and min(Z(i)) is a minimum value of Z(i))

[Mode 17]

A strain detection element provided above a deformable membrane, the strain detection element comprising:

an electrode; and a stacked body provided on the electrode and including a first magnetic layer, a second magnetic layer, an intermediate layer, and a diffusion prevention layer, the first magnetic layer having its magnetization direction changed depending on a deformation of the membrane, the intermediate layer being provided between the first magnetic layer and the second magnetic layer, and the diffusion prevention layer being provided on a surface opposite to a surface facing the intermediate layer, of the first magnetic layer, and at least part of the first magnetic layer is amorphous, the electrode including a metal layer that includes at least one element selected from the group consisting of Cu, Al, Au, Ag, Ni, Fe, and Co, and assuming that a direction in which the first magnetic layer, the second magnetic layer, and the intermediate layer are stacked is a height direction, and that a surface facing the stacked body of the metal layer is a metal layer upper surface, an Ra value of the metal layer upper surface expressed by the following formulas (1) and (2) being 2 nm or less.

$$Z_C = \frac{1}{n}\sum_{i}^{n} Z(i) \qquad \text{Formula (1)}$$

$$Ra = \frac{1}{n}\sum_{i}^{n} |Z(i) - Z_C| \qquad \text{Formula (2)}$$

(Zc is a mean value of a position of the metal layer upper surface in the height direction, and Z(i) is the position of the metal layer upper surface in the height direction)

[Mode 18]

A strain detection element provided above a deformable membrane, the strain detection element comprising:

an electrode; and a stacked body provided on the electrode and including a first magnetic layer, a second magnetic layer, an intermediate layer, and a diffusion prevention layer, the first magnetic layer having its magnetization direction changed depending on a deformation of the membrane, the intermediate layer being provided between the first magnetic layer and the second magnetic layer, and the diffusion prevention layer being provided on a surface opposite to a surface facing the intermediate layer, of the first magnetic layer, and at least part of the first magnetic layer is amorphous, the electrode including a metal layer that includes at least one element selected from the group consisting of Cu, Al, Au, Ag, Ni, Fe, and Co, and assuming that a direction in which the first magnetic layer, the second magnetic layer, and the intermediate layer are stacked is a height direction, and that a surface facing the stacked body of the metal layer is a metal layer upper surface, an Rmax value of the metal layer upper surface expressed by the following formula (3) being 10 nm or less.

$$R_{max} = \max(Z(i)) - \min(Z(i)) \qquad \text{Formula (3)}$$

(Z(i) is a position of the metal, layer upper surface in the height direction, max (Z(i)) is a maximum value of Z(i), and min(Z(i)) is a minimum value of Z(i))

[Mode 19]

A strain detection element provided above a deformable membrane, the strain detection element comprising:

an electrode; and a stacked body provided on the electrode and including a first magnetic layer, a second magnetic layer, an intermediate layer, and a diffusion prevention layer, the first magnetic layer having its magnetization direction changed depending on a deformation of the membrane, the intermediate layer being provided between the first magnetic layer and the second magnetic layer, and the diffusion prevention layer being provided on a surface opposite to a surface facing the intermediate layer, of the first magnetic layer, and at least part of the first magnetic layer is amorphous, the electrode including a metal layer that includes at least one element selected from the group consisting of Cu, Al, Au, Ag, Ni, Fe, and Co, and the electrode including a metal layer configured from a Cu—Ag alloy.

[Mode 20]

The strain detection element according to any of modes 15 to 19, wherein the diffusion prevention layer includes an oxide or a nitride.

[Mode 21]

The strain detection element according to any of modes 15 to 19, wherein the diffusion prevention layer includes magnesium oxide.

[Mode 22]

A pressure sensor, comprising:

a support;

a deformable membrane supported by the support; and the strain detection element described in any of modes 1 to 21, provided above the membrane.

[Mode 23]

The pressure sensor according to mode 22, wherein a plurality of the strain detection elements are provided on the substrate.

[Mode 24]

The pressure sensor according to mode 23, wherein at least two of the plurality of strain detection elements are provided closely adjacently.

[Mode 25]

The pressure sensor according to mode 23, wherein the membrane includes a vibrating portion that is deformed in response to an external pressure, a minimum circumscribed rectangle circumscribing a shape of the vibrating portion includes:

a first side;

a second side separating from the first side;

a third side connected to one end of the first side and one end of the second side;

a fourth side connected to the other end of the first side and the other end of the second side; and a centroid of the minimum circumscribed rectangle, the minimum circumscribed rectangle includes a first planar region surrounded by:

a line segment joining the centroid and the one end of the first side;

a line segment joining the centroid and the other end of the first side; and the first side, and at least two of the plurality of strain detection elements are provided on a portion overlapping the first planar region of the membrane.

[Mode 26]
The pressure sensor according to mode 25, wherein
positions of each of at least two of the plurality of strain detection elements are different from each other in a direction parallel to the first side.

[Mode 27]
The pressure sensor according to any of modes 22 to 26, wherein
a planar dimension of the membrane is not less than 50 μm and not more than 1000 μm.

[Mode 28]
The pressure sensor according to any of modes 22 to 27, wherein
a film thickness of the membrane is not less than 0.1 μm and not more than 3 μm.

[Mode 29]
A blood pressure sensor, comprising:
the pressure sensor described in any of modes 22 to 28.

[Mode 30]
A touch panel, comprising:
the pressure sensor described in any of modes 22 to 28.

10. Other

In addition, various kinds of altered examples and modified examples conceivable by a person skilled in the art within the concept of the present invention are also understood to belong to the scope of the present invention.

Moreover, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stacked structure comprising:
a metal layer including a $Cu_{1-x}Ag_x$ alloy (1 at. % ≤ x ≤ 20 at. %);
a first magnetic layer;
a second magnetic layer provided between the metal layer and the first magnetic layer; and
an intermediate layer provided between the first magnetic layer and the second magnetic layer,
an electrical resistance of the strain detection element being configured to change in accordance with a strain of the membrane.

2. The stacked structure according to claim 1, wherein a crystal grains size of the metal layer is 50 nm or less.

3. The stacked structure according to claim 1, wherein
the intermediate layer has a first interface opposing the first magnetic layer, and
an Ra value of the first interface is 0.3 nm or less,
the Ra value is expressed by the following formulas (1) and (2), $$Z_C = \frac{1}{n}\sum_{i}^{n} Z(i) \qquad \text{Formula (1)}$$

$$Ra = \frac{1}{n}\sum_{i}^{n} |Z(i) - Z_C| \qquad \text{Formula (2)}$$

wherein Zc is a mean value of a position of the first interface in a height direction from the metal layer toward the first magnetic layer, and Z(i) is the position of the first interface in the height direction.

4. The stacked structure according to claim 1, wherein
the intermediate layer has a first interface opposing the first magnetic layer, and
an Rmax value of the first interface is 2.5 nm or less,
the Rmax value is expressed by the following formula (3), $$R_{max} = \max(Z(i)) - \min(Z(i)) \qquad \text{Formula (3)}$$

wherein Z(i) is a position of the first interface in a height direction from the metal layer toward the first magnetic layer, max(Z(i)) is a maximum value of Z(i), and min(Z(i)) is a minimum value of Z(i).

5. The stacked structure according to claim 1, wherein the metal layer has a first face opposing the second magnetic layer, and
an Ra value of the first face is 2 nm or less,
the Ra value is expressed by the following formulas (1) and (2), $$Z_C = \frac{1}{n}\sum_{i}^{n} Z(i) \qquad \text{Formula (1)}$$

$$Ra = \frac{1}{n}\sum_{i}^{n} |Z(i) - Z_C| \qquad \text{Formula (2)}$$

wherein Zc is a mean value of a position of the first face in a height direction from the metal layer toward the first magnetic layer, and Z(i) is the position of the first face in the height direction.

6. The stacked structure according to claim 1, wherein the metal layer has a first face opposing the second magnetic layer, and
an Rmax value of the first face is 10 nm or less,
the Rmax value is expressed by the following formula (3), $$R_{max} = \max(Z(i)) - \min(Z(i)) \qquad \text{Formula (3)}$$

wherein Z(i) is a position of the first face in a height direction from the metal layer toward the first magnetic layer, max (Z(i)) is a maximum value of Z(i), and min(Z(i)) is a minimum value of Z(i).

7. The stacked structure according to claim 1, wherein the first magnetic layer includes boron.

8. The stacked structure according to claim 7, wherein a concentration of boron in at least part of the first magnetic layer is not less than 5 atomic percent and not more than 35 atomic percent.

9. The stacked structure according to claim 7, wherein
the first magnetic layer includes a first portion and a second portion,
the first portion is located between the intermediate layer and the second portion, and
a concentration of boron in the first portion is lower than a concentration of boron in the second portion.

10. The stacked structure according to claim 1, wherein the first magnetic layer includes a first portion and a second portion, the first portion is located between the intermediate layer and the second portion, at least part of the first portion is crystalline, and at least part of the second portion is amorphous.

11. The stacked structure according to claim 1, wherein the intermediate layer includes at least one selected from the group consisting of an oxide and a nitride.

12. A pressure sensor, comprising:

a membrane being deformable;

a supporting part supporting the membrane; and a strain detection element comprising the stacked structure according to claim 1 and an electrode provided thereon, the strain detection element being fixed to the membrane and an electrical resistance of the strain detection element being configured to change in accordance with a strain of the membrane.

13. The pressure sensor according to claim 12, wherein the strain detection element is provided in a plurality.

14. A microphone, comprising:

the pressure sensor according to claim 12.

15. The stacked structure according to claim 1, further comprising:

a first layer provided between the metal layer and the first magnetic layer, the first layer including at least one selected from Ta, Ti, and TiN, the second magnetic layer being provided between the first layer and the first magnetic layer, the metal layer having a first face opposing the first layer, the first layer having a second face opposing the second magnetic layer, and the first face being rougher than the second face.

16. The stacked structure according to claim 15, wherein at least part of the first magnetic layer is amorphous.

17. A stacked structure comprising:

a metal layer including at least one selected from the group consisting of Cu, Al, Au, Ag, Ni, Fe, and Co;

a first magnetic layer;

a second magnetic layer provided between the metal layer and the first magnetic layer; and an intermediate layer being provided between the first magnetic layer and the second magnetic layer, a crystal grain size of the metal layer being 50 nm or less, and an electrical resistance of the strain detection element being configured to change in accordance with a strain of the membrane.

18. The stacked structure according to claim 17, further comprising:

a first layer provided between the metal layer and the first magnetic layer, the first layer including at least one selected from Ta, Ti, and TiN, the second magnetic layer being provided between the first layer and the first magnetic layer, the metal layer having a first face opposing the first layer, the first layer having a second face opposing the second magnetic layer, and the first face being rougher than the second face.

19. The stacked structure according to claim 18, wherein at least part of the first magnetic layer is amorphous.

* * * * *